US012786514B2

(12) United States Patent
Lee

(10) Patent No.: US 12,786,514 B2
(45) Date of Patent: Nov. 3, 2026

(54) IMPLEMENTATIONS AND METHODS FOR PROCESSING NEURAL NETWORK IN SEMICONDUCTOR HARDWARE

(71) Applicant: Uniquify IP Holdings, LLC, New York, NY (US)

(72) Inventor: Joshua Jungho Lee, San Jose, CA (US)

(73) Assignee: Uniquify IP Holdings, LLC, New York, NY (US)

( * ) Notice: Subject to any disclaimer, the term of this patent is extended or adjusted under 35 U.S.C. 154(b) by 544 days.

(21) Appl. No.: 18/288,153

(22) PCT Filed: Apr. 29, 2022

(86) PCT No.: PCT/US2022/027035

§ 371 (c)(1),
(2) Date: Oct. 24, 2023

(87) PCT Pub. No.: WO2022/235517

PCT Pub. Date: Nov. 10, 2022

(65) Prior Publication Data

US 2024/0202509 A1 Jun. 20, 2024

Related U.S. Application Data

(60) Provisional application No. 63/184,576, filed on May 5, 2021, provisional application No. 63/184,630, filed on May 5, 2021.

(51) Int. Cl.
*G06N 3/0495* (2023.01)
*G06N 3/063* (2023.01)
(Continued)

(52) U.S. Cl.
CPC ....... *H04N 21/4622* (2013.01); *G06N 3/0495* (2023.01); *G06N 3/063* (2013.01);
(Continued)

(58) Field of Classification Search
CPC ............ H04N 21/4622; H04N 21/232; H04N 21/435; H04N 21/44008; H04N 21/4666;
(Continued)

(56) References Cited

U.S. PATENT DOCUMENTS

| | | |
|---|---|---|
| 5,416,731 A | 5/1995 | Dang et al. |
| 5,777,918 A | 7/1998 | Chan et al. |

(Continued)

FOREIGN PATENT DOCUMENTS

| | | |
|---|---|---|
| EP | 3 671 439 A1 | 6/2020 |
| WO | 2016/182671 A1 | 11/2016 |

(Continued)

OTHER PUBLICATIONS

Kietzmann, et al., “Deepfakes: Trick or treat?”, Business Horizons (2020) 63, 135-146, Elsevier, Dec. 24, 2019, in 12 pages.

(Continued)

*Primary Examiner* — Mohamed Abou El Seoud

(57) ABSTRACT

Aspects of the present disclosure involve systems, methods, computer instructions, and artificial intelligence processing elements (AIPEs) involving a shifter circuit or equivalent circuitry/hardware/computer instructions thereof configured to intake shiftable input derived from input data for a neural network operation; intake a shift instruction derived from a corresponding log quantized parameter of a neural network or a constant value; and shift the shiftable input in a left direction or a right direction according to the shift instruction to form shifted output representative of a multiplication of the input data with the corresponding log quantized parameter of the neural network.

19 Claims, 91 Drawing Sheets

(51) Int. Cl.

| | |
|---|---|
| ***H04N 21/232*** | (2011.01) |
| ***H04N 21/435*** | (2011.01) |
| ***H04N 21/44*** | (2011.01) |
| ***H04N 21/462*** | (2011.01) |
| ***H04N 21/466*** | (2011.01) |
| ***H04N 21/854*** | (2011.01) |

(52) U.S. Cl.
CPC ......... *H04N 21/232* (2013.01); *H04N 21/435* (2013.01); *H04N 21/44008* (2013.01); *H04N 21/4666* (2013.01); *H04N 21/854* (2013.01)

(58) Field of Classification Search
CPC ............. H04N 21/854; H04N 21/2187; H04N 21/23418; H04N 21/242; H04N 21/2542; H04N 21/4316; H04N 21/8133; H04N 21/234; H04N 21/25; H04N 21/437; H04N 21/4408; H04N 21/2223; H04N 21/4341; H04N 21/4348; G06N 3/0495; G06N 3/063; G06N 3/04; G06N 3/0442; G06N 3/0455; G06N 3/045; G06N 3/0464; G06N 3/044; G06N 3/048; G06N 3/065; G06N 3/09; G06N 3/08; G06N 3/0895; G06N 3/091; G06N 3/092; G06N 3/094; G06N 3/096; G06N 3/098; G06N 3/0985; G06V 20/42; G06V 40/10; G06V 10/764; G06V 10/82; G06V 40/16; H03M 7/28; G06F 15/7807
See application file for complete search history.

(56) References Cited

U.S. PATENT DOCUMENTS

| | | | | |
|---|---|---|---|---|
| 8,655,030 | B2 | 2/2014 | Li et al. | |
| 9,409,081 | B2 | 8/2016 | Jensen et al. | |
| 2013/0343483 | A1 | 12/2013 | Bai | |
| 2014/0089363 | A1 | 3/2014 | Yasuda | |
| 2017/0286830 | A1 | 10/2017 | El-Yaniv et al. | |
| 2018/0307950 | A1 | 10/2018 | Nealis et al. | |
| 2019/0180182 | A1 | 6/2019 | Loh | |
| 2019/0266485 | A1 | 8/2019 | Singh et al. | |
| 2020/0077147 | A1 | 3/2020 | Hattery et al. | |
| 2021/0117678 | A1 | 4/2021 | Farre Guiu et al. | |
| 2021/0357736 | A1 | 11/2021 | Lu et al. | |
| 2023/0379531 | A1 | 11/2023 | Azoulas et al. | |
| 2024/0220769 | A1* | 7/2024 | Kosuge .................... | G06N 3/04 |

FOREIGN PATENT DOCUMENTS

| | | | |
|---|---|---|---|
| WO | 2019/191082 | A3 | 10/2019 |
| WO | 2020/204472 | A1 | 10/2020 |
| WO | 2020/258527 | A1 | 12/2020 |
| WO | 2020/258841 | A1 | 12/2020 |
| WO | 2021/077028 | A1 | 4/2021 |

OTHER PUBLICATIONS

Search Report and Written Opinion received in corresponding Dutch Application No. NL2038446, dated Feb. 11, 2025, in 13 pages.

Notice of Allowance received in corresponding JP App. No. 2023-565626, dated May 21, 2024, in 5 pages, with translation.

Elhoushi, Mostafa et al.: "DeepShift: Towards Multiplication-Less Neural Networks", arxiv.org, Cornell University Library, 201 Olin Library Cornell University Ithaca, NY 14853, May 30, 2019 (May 30, 2019) , XP081579615, in 9 pages.

Lee, Edward H. et al.: "LogNet: Energy-efficient neural networks using logarithmic computation", 2017 IEEE International Conference On Acoustics, Speech and Signal Processing (Icassp), IEEE, 5 maart 2017 (2017-03-05), bladzijden 5900-5904 , XP033259542, Doi: 10.1109/ICASSP.2017.7953288, in 5 pages.

Liang, Tailin et al.: "Pruning and Quantization for Deep Neural Network Acceleration: A Survey", 1-20 arxiv.org, Cornell University Library, 201 Olin Library Cornell University Ithaca, NY 14853, Mar. 11, 2021 (Mar. 11, 2021), XP081901775, in 39 pages.

Search Report and Written Opinion received in corresponding Dutch Application No. NL2034738, dated Apr. 19, 2024, in 14 pages.

Search Report and Written Opinion received in corresponding Dutch Application No. NL2035521, dated Apr. 24, 2024, in 18 pages.

Non-Final Office Action received in corresponding U.S. Appl. No. 18/288,159, dated Dec. 30, 2024, in 28 pages.

International Search Report and Written Opinion received in corresponding International Application No. PCT/US2022/027035, mailed Oct. 25, 2022, in 9 pages.

Liang, Tailin, et al., "Pruning and Quantization for Deep Neural Network Acceleration: A Survey", arxiv.org, Cornell University Library, 201 Olin Library Cornell University Ithaca, NT 14853, Mar. 11, 2021, XP081901775, in 41 pages.

Preliminary Search Report and Written Opinion received in corresponding French Application No. FR2204225, dated Feb. 8, 2023, in 9 pages.

Search Report and Written Opinion received in corresponding Dutch Application No. NL2031777, dated Mar. 1, 2023, in 10 pages.

Liu, Shiya, et al., "Efficient Neural Networks for Edge Devices", Preprint submitted to Journal of LATEX Templates Feb. 4, 2021, published by Elsevier 2021, in 24 pages.

Marchesi, Michele, et al., "Fast Neural Networks Without Multipliers", Article in IEEE Transactions of Neural Networks, Feb. 1993, vol. 4, No. 1, Jan. 1993, pp. 53-62, in 11 pages.

Miyashita, Daisuke, et al., "Convolutional Neural Networks using Logarithmic Data Representation", arXiv:1603.01025v2 [cs.NE], Mar. 17, 2016, in 10 pages.

Search Report and Written Opinion received in corresponding Dutch Application No. NL2038031, dated Feb. 11, 2025, in 12 pages.

* cited by examiner

Quantization (n) = round(n/qv)*qv
Example of quantizing integers from 0 to 104 by qv=10

Log Quantization (+-n) = $+-2^{round(log2(n))}$
Example of quantizing integers from 2 to 180

Parameter update for normal floating point

$$w_{new} = w_{old} - r_{learn}\left(\frac{\partial e(x,y,w)}{\partial w}\right)$$

Current weight value:

$$w_{old} = 0.235$$

Calculate gradient:

$$gradient_{weight} = \frac{\partial e(x,y,w)}{\partial w} = -1.2$$

Apply learning rate:

$$r_{learn} = 0.01$$

Update new weight value:
0.235-0.01*(-1.2)=0.247

FIG. 14A

Parameter update using log-quantization (gradient)

$$w_{new} = w_{old} - r_{learn}\left(\frac{\partial e(x,y,w)}{\partial w}\right)$$

Current weight value:

$$w_{old} = 0.235$$

Calculate gradient:

$$gradient_{weight} = \frac{\partial e(x,y,w)}{\partial w} = -1.2$$

Apply UNN learning rate:

$$r_{learn} = 0.0125$$

Update new weight value:
$0.235-0.0125*(-1.2)=0.250=2^{-2}$
=>"shift right by 2" operation in hardware

FIG. 14B

Parameter update using log-quantization (weight)

$$\mathbf{w}_{new} = \mathbf{w}_{old} - r_{learn}\left(\frac{\partial e(\mathbf{x},\mathbf{y},\mathbf{w})}{\partial \mathbf{w}}\right)$$

Old weight value:
$\mathbf{w}_{old} = 0.235$

Calculate the gradient for $\mathbf{w}_{old}$:
$$\mathbf{gradient}_{weight} = \frac{\partial e(\mathbf{x},\mathbf{y},\mathbf{w})}{\partial \mathbf{w}} = -1.2$$

learning rate:
$r_{learn} = 0.01$

Update new weight value:
$0.235 - 0.01 * -1.2 = 0.247$

Log Quantize the weight value:
$2^{round(Log2(0.247))} = 0.250 = 2^{-2}$
where round() operation is rounding operation.

After the Log Quantization step above, in inference mode, input multiplied by weight operation can be replaced by binary shifting input by the weight value operation.

FIG. 14C

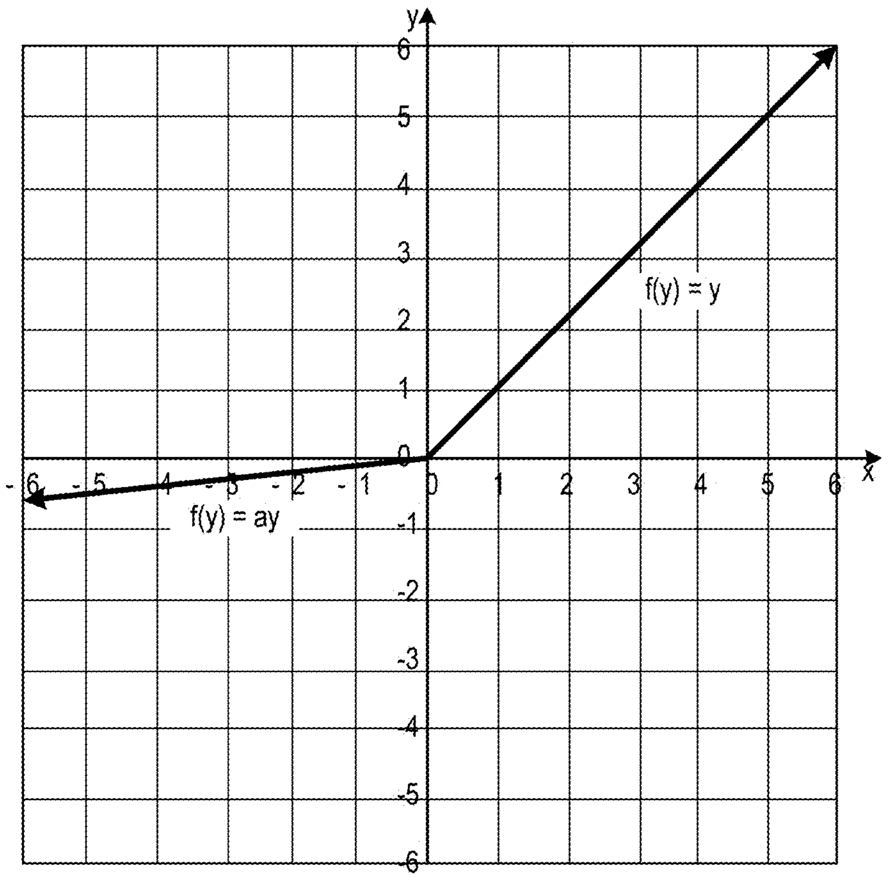
Applies elementwise function
LeakyReLU(x) = max(0,x) + negative_slope * min(0,x)
$$\text{LeakyRELU}(x) = \begin{cases} x, & \text{if } x \geq 0 \\ \text{negative\_slope} * x, & \text{otherwise} \end{cases}$$
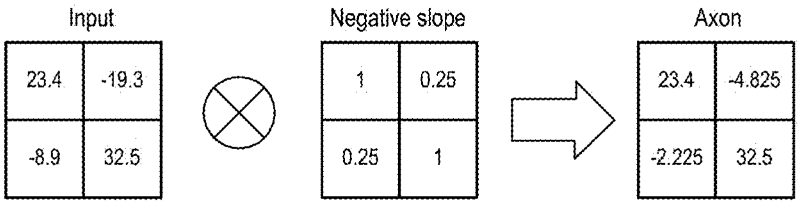
FIG. 29

Input Layer (Dense) Neuron

Input data: floating point numbers scaled by a factor ($2^{24}$) and truncate $x1 = 1.0 \times 2^{24} = 16777216$
$x2 = 0.8 \times 2^{24} = 13421772$
$x3 = 0.5 \times 2^{24} = 8388608$
...
$xn = 0.3 \times 2^{24} = 5033164$ Bias scaling:
$b = 0.35 \times 2^{24} = 5872025$

Convolution Forward Pass

Batch Normailzation Equation Converted to NN 2.0

$$BN(x) = \gamma\left(\frac{x - mean}{\sqrt{var + \epsilon}}\right) + \beta \quad (1)$$

$$= \left(\frac{\gamma}{\sqrt{var + \epsilon}}\right) \cdot x + \left(\beta - \gamma \cdot \left(\frac{mean}{\sqrt{var + \epsilon}}\right)\right) \quad (2)$$

$$= W \cdot x + B \quad (3)$$

$$W = \frac{\gamma}{\sqrt{var + \epsilon}} \quad (4)$$

$$B = \beta - \gamma \cdot \left(\frac{mean}{\sqrt{var + \epsilon}}\right) \quad (5)$$

FIG. 43A

Batch Normalization NN 2.0 Inference

Input

| | | | |
|---|---|---|---|
| 5E5 | 3E5 | 9E5 | 1.5E6 |
| 6E5 | 9E5 | 1.4E6 | 3E5 |
| 1E5 | 5E5 | 3E5 | 1.2E6 |

⊗ Element-wise shifting

Weight

| | | | |
|---|---|---|---|
| +(-2) | +(+3) | -(-3) | +(+1) |
| -(-4) | +(-2) | +(-1) | -(-5) |
| +(-6) | +(+2) | -(-1) | -(-2) |

⊕ Element-wise Add

Bias

| | | | |
|---|---|---|---|
| 1E6 | 1.5E6 | 8E6 | 2E6 |
| 1.8E6 | 2E6 | 2.5E6 | 1.4E6 |
| 7E6 | 3E6 | 1E6 | 1.9E6 |

⇒

Axon

| | | | |
|---|---|---|---|
| 1125000 | 3900000 | 7887500 | 5000000 |
| 1762500 | 2225000 | 3200000 | 1390625 |
| 7001562 | 5000000 | 850000 | 1600000 |

FIG. 43B

Graphs of all 3 functions

ReLU

ReLU(x) = (x)+ max(0,x) if x ≥ 0 (solid arrow); otherwise (dashed arrow)

LeakyReLU

LeakyReLU(x) = max(0,x) + negative_slope * min(0,x)

$$\text{LeakyRELU}(x) = \begin{cases} x, & \text{if } x \geq 0 \\ \text{negative\_slope} * x, & \text{otherwise} \end{cases}$$

PReLU

PReLU(x) = max(0,x) + a * min(0,x)

$$\text{PReLU}(x) = \begin{cases} x, & \text{if } x \geq 0 \\ \alpha x, & \text{otherwise} \end{cases}$$

convolution
data: X1, X2, ... X9
parameter: K1, K2, ... K9
bias: b
shift instruction: SH1, SH2, ... SH9
con2d = b + X1*K1+X2*K2+...X9*K9 data = X
parameter = γ,β batch_norm $= \gamma \frac{(X-n)}{\sigma+\varepsilon} - \beta$
$= \frac{\gamma}{\sigma+\varepsilon} X - \frac{\gamma}{\sigma+\varepsilon} n - \beta$
$= aX + b$

Batch Normalization shift instruction: SH derived from log-quantized (a)
bias: b data = X
parameter = a Parametric ReLu Parameteric ReLu: Y = X if X ≥ 0
Y = a*X if X < 0

IMPLEMENTATIONS AND METHODS FOR PROCESSING NEURAL NETWORK IN SEMICONDUCTOR HARDWARE

CROSS REFERENCE TO RELATED APPLICATION(S)

This application is a U.S. national stage application of International Application No. PCT/US2022/027035, filed Apr. 29, 2022, which claims the benefit of and priority to U.S. Provisional Application Ser. No. 63/184,576, entitled “Systems and Methods Involving Artificial Intelligence and Cloud Technology for Edge and Server SOC” and filed on May 5, 2021, and U.S. Provisional Application Ser. No. 63/184,630, entitled “Systems and Methods Involving Artificial Intelligence and Cloud Technology for Edge and Server SOC” and filed on May 5, 2021, the disclosures of which are expressly incorporated by reference herein in its entirety.

BACKGROUND

Field

The present disclosure is generally directed to artificial intelligence systems, and more specifically, to neural network and artificial intelligence (AI) processing in hardware and software.

Related Art

A neural network is a network or circuit of artificial neurons which is represented by multiple neural network layers, each of which are instantiated by a collection of parameters. Neural network layers are represented by two types of neural network parameters. One type of neural network parameter is the weights which are multiplied with the data depending on the underlying neural network operation (e.g., for convolution, batch normalization, and so on). The other type of neural network parameter is the bias, which is a value that may be added to the data or to the result of the multiplication of the weight with the data.

The neural network layers of a neural network start from the input layer where data is fed in, then hidden layers, and then the output layer. Layers are composed of artificial neurons, also called kernels or filters in case of the convolution layer. Examples of different types of layers that constitute a neural network can involve, but are not limited to, the convolutional layer, fully connected layer, recurrent layer, activation layer, batch normalization layer, and so on.

Neural network training or learning is a process that modifies and refines the values of the parameters in the neural network according to a set of objectives that is usually described in the label for the input data and set of input data known as test data. Training, learning or optimization of a neural network involves optimizing the values of the parameters in the neural network for a given set of objectives by either mathematical methods such as gradient based optimization or non-mathematical methods. In each iteration (referred to as an epoch) of training/learning/optimization, the optimizer (e.g., software program, dedicated hardware, or some combination thereof) finds the optimized values of the parameters to produce the least amount of error based on the set objective or labels. For the neural network inference, once a neural network is trained, learned, or optimized, with test data and label, one can apply/feed any arbitrary data to the trained neural network to get the output values, then interpret the output values according to the rules that are set for the neural network. The following are examples of neural network training, neural network inference, and the corresponding hardware implementations in the related art.

FIG. 1 illustrates an example of neural network training in accordance with the related art. To facilitate the neural network training in the related art, at first, the neural network parameters are initialized to random floating point or integer numbers. Then the iterative process to train the neural network is started as follows. The test data is input to the neural network to be forward propagated through all the layers to get the output values. Such test data can be in the form of floating-point numbers or integer. The error is calculated by comparing the output values to the test label values. A method as known in the art is then executed to determine how to change the parameters to lessen the error of the neural network, whereupon the parameters are changes according to the executed method. This iterative process is repeated until the neural network produces the acceptable error (e.g., within a threshold), and the resultant neural network is said to be trained, learned, or optimized.

FIG. 2 illustrates an example of neural network inference operation, in accordance with the related art. To facilitate the neural network inference, at first, the inference data is input to the neural network, which is forward propagated through all the layers to get the output values. Then, the output values of the neural network are interpreted in accordance with the objectives set by the neural network.

FIG. 3 illustrates an example of the neural network hardware implementations, in accordance with the related art. To implement the neural network in hardware, at first, input data and neural network parameters are obtained. Then, through using a hardware multiplier, input data (multiplicand) is multiplied with the parameters (multiplier) to get products. Subsequently, the products are all added through using a hardware adder to obtain a sum. Finally, if applicable, the hardware adder is used to add a bias parameter to the sum as needed.

FIG. 4 illustrates an example of training for a quantized neural network, in accordance with the related art. To facilitate the quantized neural network training, at first, the neural network parameters (e.g., weights, biases) are initialized to random floating point or integer numbers for the neural network. Then, an iterative process is executed in which test data is input to the neural network and forward propagated through all the layers of the neural network to get the output values. The error is calculated by comparing the output values to the test label values. Methods as known in the art are used to determine how to change the parameters to reduce the error of the neural network and changed accordingly. This iterative process is repeated until the neural network produces an acceptable error within a desired threshold. Once produced, the parameters are then quantized to reduce their size (e.g., quantize 32-bit floating point numbers to 8-bit integers).

FIG. 5 illustrates an example of neural network inference for a quantized neural network, in accordance with the related art. The inference process is the same as that of a regular neural network of FIG. 2, only that the neural network parameters are quantized into integers.

FIG. 6 illustrates an example of neural network hardware implementation for quantized neural network, in accordance with the related art. The hardware implementation is the same as that of a regular neural network as illustrated in FIG. 3. In this instance, the hardware multipliers and adders used for the quantized neural network are typically in the form of integer multipliers and integer adders as opposed to floating point adders/multipliers of FIG. 3 due to the integer quantization of the parameters.

To facilitate the calculations required for neural network operation, multiplier-accumulator circuits (MACs) or MAC equivalent circuits (multiplier and adder) are typically used to carry out the multiplication operation and the addition operation for the neural network operations. All AI processing hardwares in the related art rely fundamentally on MACs or MAC equivalent circuits to carry out calculations for most neural network operations.

SUMMARY

Due to the complexity of the multiplication operation, MACs consume a significant amount of power and take up a fairly significant footprint when used in arrays to process neural network and other artificial intelligence operations, as well as a significant amount of time to calculate. As the amount of input data and neural network parameters can be vast, large arrays (e.g. tens of thousands) of MACs may be utilized to process neural network operations. Such requirements can make the use of neural network based algorithms difficult for edge or personal devices, as complex neural network operations may require extensive MAC arrays that need to process neural network in timely manner.

Example implementations described herein are directed to a second-generation neural network processor (Neural Network 2.0, or NN 2.0) as implemented in hardware, software, or some combination thereof. The proposed example implementations can replace the MAC hardware in all neural network layers/operations that use multiplication and addition such as Convolutional Neural network (CNN), Recurrent Neural Network (RNN), Fully-connected Neural Network (FNN), and Auto Encoder (AE), Batch Normalization, Parametric Rectified Linear Unit, and more.

In example implementations described herein, NN 2.0 utilizes a shifter function in hardware to reduce the area and power of neural network implementation significantly by using shifters instead of multipliers and/or adders. The technology is based on the fact that neural network training is accomplished by adjusting parameters by arbitrary factors of their gradient values calculated. In other words, in a neural network training, incremental adjustment of each parameter is done by an arbitrary amount based on its gradient. Each time NN 2.0 is used to train a neural network (AI model), it ensures that parameters of the neural network such as weights are log-quantized (e.g., a value that can be represented as an integer power of two) so that shifters such as binary number shifters can be utilized in the hardware or software for neural network operations that require multiplication and/or addition operations such as a convolutional operation, batch normalization, or some activation function such as parametric/leaky ReLU, thereby replacing the multiplication and/or the addition operation with a shift operation. In some instances, the parameters or weights may be binary log-quantized—quantizing parameters to numbers that are an integer power of two. Through the example implementations described herein, it is thereby possible to execute calculations for neural network operations in a manner that is much faster than can be accomplished with a MAC array, while consuming a fraction of the power and having only a fraction of the physical footprint.

Example implementations described herein involve novel circuits in the form of an artificial intelligence processing element (AIPE) to facilitate a dedicated circuit for processing neural network/artificial intelligence operations. However, the functions described herein can be implemented in equivalent circuits, by equivalent field programmable gate arrays (FPGAs), or application specific integrated circuits (ASICs), or as instructions in memory to be loaded to generic central processing unit (CPU) processors, depending on the desired implementation. In the cases involving FPGAs, ASICs, or CPUs, the algorithmic implementations of the functions described herein will still lead to a reduction in area footprint, power and run time of hardware for processing neural network operations or other AI operations through replacement of multiplication or addition by shifting, which will save on compute cycles or compute resources that otherwise would have been consumed by normal multiplication on FPGAs, ASICs, or CPUs.

Aspects of the present disclosure can involve an artificial intelligence processing element (AIPE). The AIPE can comprise a shifter circuit configured to intake shiftable input derived from input data for a neural network operation; intake a shift instruction derived from a corresponding log quantized parameter of a neural network or a constant value; and shift the shiftable input in a left direction or a right direction according to the shift instruction to form shifted output representative of a multiplication of the input data with the corresponding log quantized parameter of the neural network.

Aspects of the present disclosure can involve a system for processing a neural network operation comprising a shifter circuit, the shifter circuit is configured to multiply input data with a corresponding log quantized parameter associated with the operation for a neural network. To multiply input data with a corresponding log quantized parameter, the shifter circuit is configured to intake shiftable input derived from the input data; and shift the shiftable input in a left direction or a right direction according to a shift instruction derived from the corresponding log quantized parameter to generate an output representative of the multiplying the input data with the corresponding log quantized parameter for the neural network operation.

Aspects of the present disclosure can involve a method for processing a neural network operation, comprising multiplying input data with a corresponding log quantized parameter associated with the operation for a neural network. The multiplying can comprise intaking shiftable input derived from the input data; and shifting the shiftable input in a left direction or a right direction according to a shift instruction derived from the corresponding log quantized parameter to generate an output representative of the multiplying the input data with the corresponding log quantized parameter for the neural network operation.

Aspects of the present disclosure can involve a computer program storing instructions for processing a neural network operation, comprising multiplying input data with a corresponding log quantized parameter associated with the operation for a neural network. The instructions for multiplying can comprise intaking shiftable input derived from the input data; and shifting the shiftable input in a left direction or a right direction according to a shift instruction derived from the corresponding log quantized parameter to generate an output representative of the multiplying the input data with the corresponding log quantized parameter for the neural network operation. The instructions can be stored on a medium such as a non-transitory computer readable medium and executed by one or more processors.

Aspects of the present disclosure can involve a system for processing a neural network operation, comprising means for multiplying input data with a corresponding log quantized parameter associated with the operation for a neural network. The means for multiplying can comprise means for intaking shiftable input derived from the input data; and means for shifting the shiftable input in a left direction or a right direction according to a shift instruction derived from the corresponding log quantized parameter to generate an output representative of the multiplying the input data with the corresponding log quantized parameter for the neural network operation.

Aspects of the present disclosure can further involve a system, which can include a memory configured to store a trained neural network represented by one or more log quantized parameter values associated with one or more neural network layers, each of the one or more neural network layers representing a corresponding neural network operation to be executed; one or more hardware elements configured to shift or add shiftable input data; and a controller logic configured to control the one or more hardware elements to, for the each of the one or more neural network layers read from the memory, shift the shiftable input data left or right based on the corresponding log quantized parameter values to form shifted data; and add or shift the formed shifted data according to the corresponding neural network operation to be executed.

Aspects of the present disclosure can further involve a method, which can include managing, in a memory, a trained neural network represented by one or more log quantized parameter values associated with one or more neural network layers, each of the one or more neural network layers representing a corresponding neural network operation to be executed; and controlling one or more hardware elements to, for the each of the one or more neural network layers read from the memory, shift the shiftable input data left or right based on the corresponding log quantized parameter values to form shifted data; and add or shift the formed shifted data according to the corresponding neural network operation to be executed.

Aspects of the present disclosure can further involve a method, which can include managing, in a memory, a trained neural network represented by one or more log quantized parameter values associated with one or more neural network layers, each of the one or more neural network layers representing a corresponding neural network operation to be executed; and for the each of the one or more neural network layers read from the memory, shifting the shiftable input data left or right based on the corresponding log quantized parameter values to form shifted data; and adding or shifting the formed shifted data according to the corresponding neural network operation to be executed.

Aspects of the present disclosure can further involve a computer program having instructions which can include managing, in a memory, a trained neural network represented by one or more log quantized parameter values associated with one or more neural network layers, each of the one or more neural network layers representing a corresponding neural network operation to be executed; and controlling one or more hardware elements to, for the each of the one or more neural network layers read from the memory, shift the shiftable input data left or right based on the corresponding log quantized parameter values to form shifted data; and add or shift the formed shifted data according to the corresponding neural network operation to be executed. The computer program and instructions can be stored in a non-transitory computer readable medium to be executed by hardware (e.g., processors, FPGAs, controllers, etc.).

Aspects of the present disclosure can further involve a system, which can include memory means for storing a trained neural network represented by one or more log quantized parameter values associated with one or more neural network layers, each of the one or more neural network layers representing a corresponding neural network operation to be executed; and for the each of the one or more neural network layers read from the memory means, shifting means for shifting the shiftable input data left or right based on the corresponding log quantized parameter values to form shifted data; and means for adding or shifting the formed shifted data according to the corresponding neural network operation to be executed.

Aspects of the present disclosure can further involve a method, which can include managing, in a memory, a trained neural network represented by one or more log quantized parameter values associated with one or more neural network layers, each of the one or more neural network layers representing a corresponding neural network operation to be executed; and for the each of the one or more neural network layers read from the memory, shifting the shiftable input data left or right based on the corresponding log quantized parameter values to form shifted data; and adding or shifting the formed shifted data according to the corresponding neural network operation to be executed.

Aspects of the present disclosure can further involve a computer program having instructions, which can include managing, in a memory, a trained neural network represented by one or more log quantized parameter values associated with one or more neural network layers, each of the one or more neural network layers representing a corresponding neural network operation to be executed; and for the each of the one or more neural network layers read from the memory, shifting the shiftable input data left or right based on the corresponding log quantized parameter values to form shifted data; and adding or shifting the formed shifted data according to the corresponding neural network operation to be executed. The computer program and instructions can be stored in a non-transitory computer readable medium to be executed by hardware (e.g., processors, FPGAs, controllers, etc.).

Aspects of the present disclosure can further involve a system, which can include memory means for storing a trained neural network represented by one or more log quantized parameter values associated with one or more neural network layers, each of the one or more neural network layers representing a corresponding neural network operation to be executed; and for the each of the one or more neural network layers read from the memory means, shifting means for shifting the shiftable input data left or right based on the corresponding log quantized parameter values to form shifted data; and means for adding or shifting the formed shifted data according to the corresponding neural network operation to be executed.

Aspects of the present disclosure can involve a method, which can involve intaking shiftable input derived from the input data (e.g., as scaled by a factor); shifting the shiftable input in a left direction or a right direction according to a shift instruction derived from the corresponding log quantized parameter to generate an output representative of the multiplying the input data with the corresponding log quantized parameter for the neural network operation as described herein. As described herein, the shift instruction associated with the corresponding log quantized parameter can involve a shift direction and a shift amount, the shift amount derived from a magnitude of an exponent of the corresponding log quantized parameter, the shift direction derived from a sign of the exponent of the corresponding log quantized parameter; wherein the shifting the shiftable input involves shifting the shiftable input in the left direction or the right direction according to the shift direction and by an amount indicated by the shift amount.

Aspects of the present disclosure can involve a method for processing an operation for a neural network, which can involve intaking shiftable input data derived from input data of the operation for the neural network; intaking input associated with a corresponding log quantized weight parameter for the input data of the operation for the neural network, the input involving a shift direction and a shift amount, the shift amount derived from a magnitude of an exponent of the corresponding log quantized weight parameter, the shift direction derived from a sign of the exponent of the corresponding log quantized weight parameter; and shifting the shiftable input data according to the input associated with the corresponding log quantized weight parameter to generate output for the processing of the operation for the neural network.

Aspects of the present disclosure can involve a system for processing an operation for a neural network, which can involve means for intaking shiftable input data derived from input data of the operation for the neural network; means for intaking input associated with a corresponding log quantized weight parameter for the input data of the operation for the neural network, the input involving a shift direction and a shift amount, the shift amount derived from a magnitude of an exponent of the corresponding log quantized weight parameter, the shift direction derived from a sign of the exponent of the corresponding log quantized weight parameter; and means for shifting the shiftable input data according to the input associated with the corresponding log quantized weight parameter to generate output for the processing of the operation for the neural network.

Aspects of the present disclosure can involve a computer program for processing an operation for a neural network, which can involve instructions including intaking shiftable input data derived from input data of the operation for the neural network; intaking input associated with a corresponding log quantized weight parameter for the input data of the operation for the neural network, the input involving a shift direction and a shift amount, the shift amount derived from a magnitude of an exponent of the corresponding log quantized weight parameter, the shift direction derived from a sign of the exponent of the corresponding log quantized weight parameter; and shifting the shiftable input data according to the input associated with the corresponding log quantized weight parameter to generate output for the processing of the operation for the neural network. The computer program and instructions can be stored in a non-transitory computer readable medium and configured to be executed by one or more processors.

BRIEF DESCRIPTION OF DRAWINGS

FIGS. 14A-14C illustrate a comparison between parameter updates. 14A is an example of parameter update process of a normal neural network. 14B and 14C are an example of parameter update process of a log quantized neural network.

FIGS. 29 and 30 illustrate an example of training LeakyReLU in log quantized neural network, in accordance with an example implementation.

FIGS. 43A, 43B, and 44 illustrate an example of an inference operation of batch normalization in a quantized neural network (NN2.0), in accordance with an example implementation.

DETAILED DESCRIPTION

Figure 1:
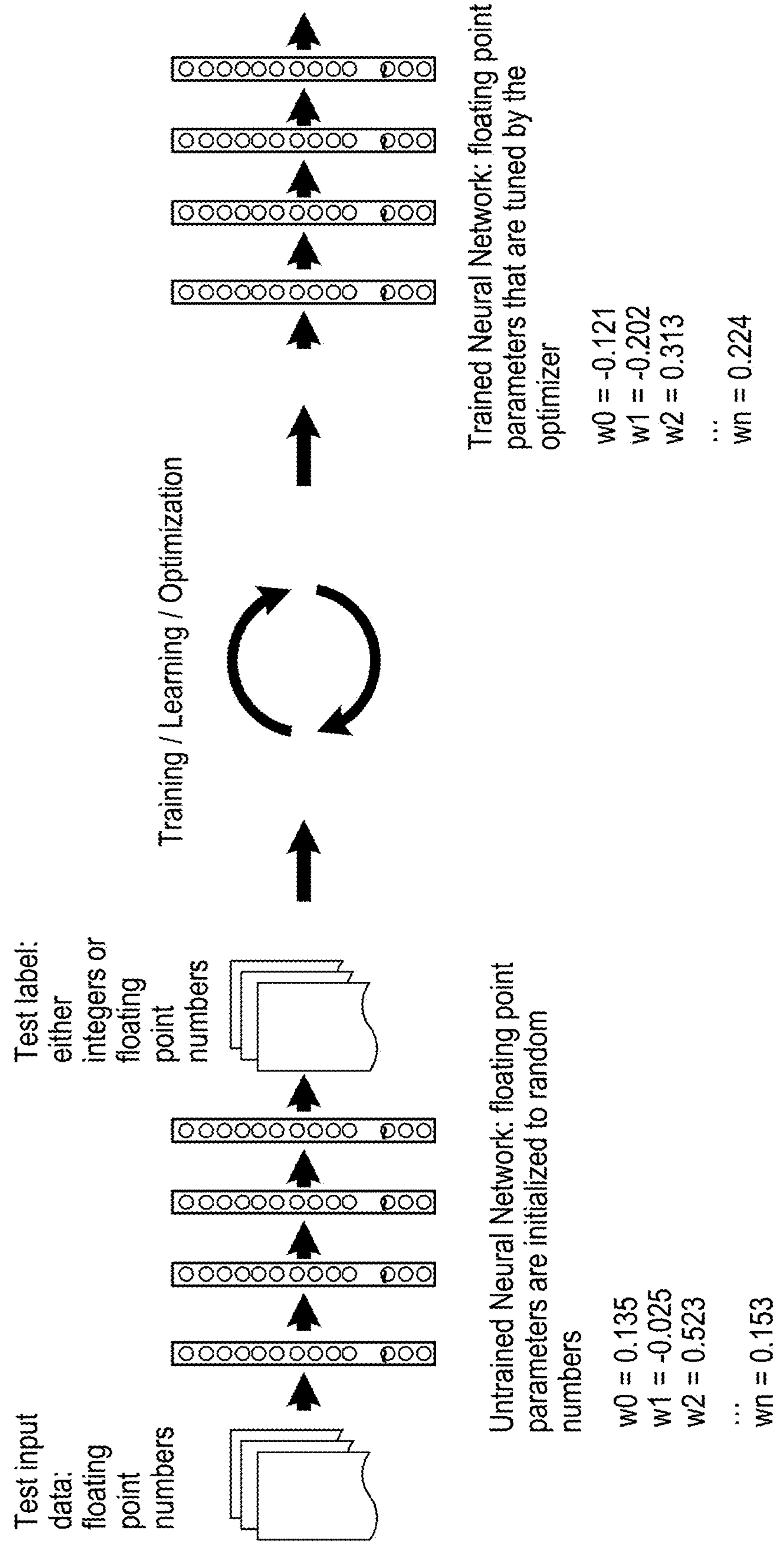
FIG. 1 illustrates an example of a training process for a typical neural network in accordance with the related art.
Figure 2:
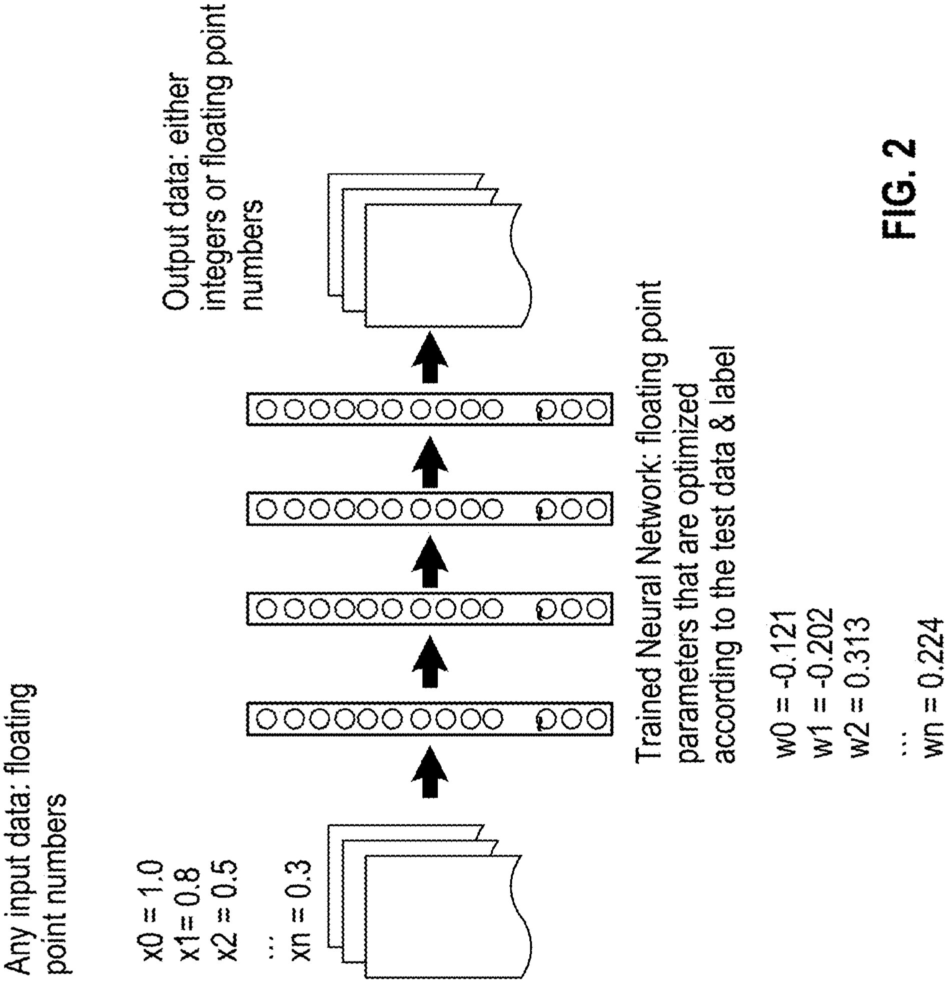
FIG. 2 illustrates an example of an inference process for a typical neural network, in accordance with the related art.
Figure 3:
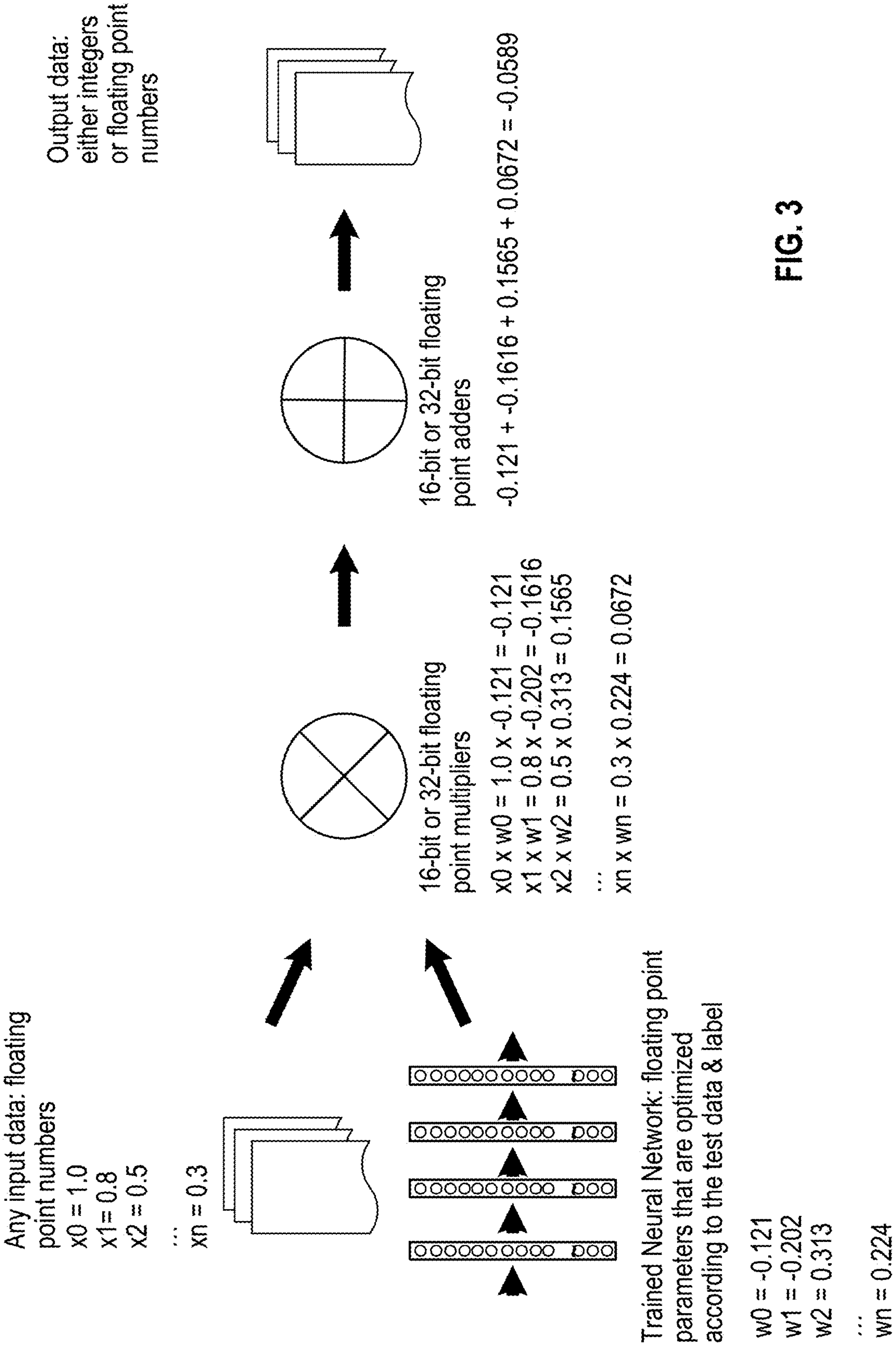
FIG. 3 illustrates an example of hardware implementation for a typical neural network, in accordance with the related art.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 7:
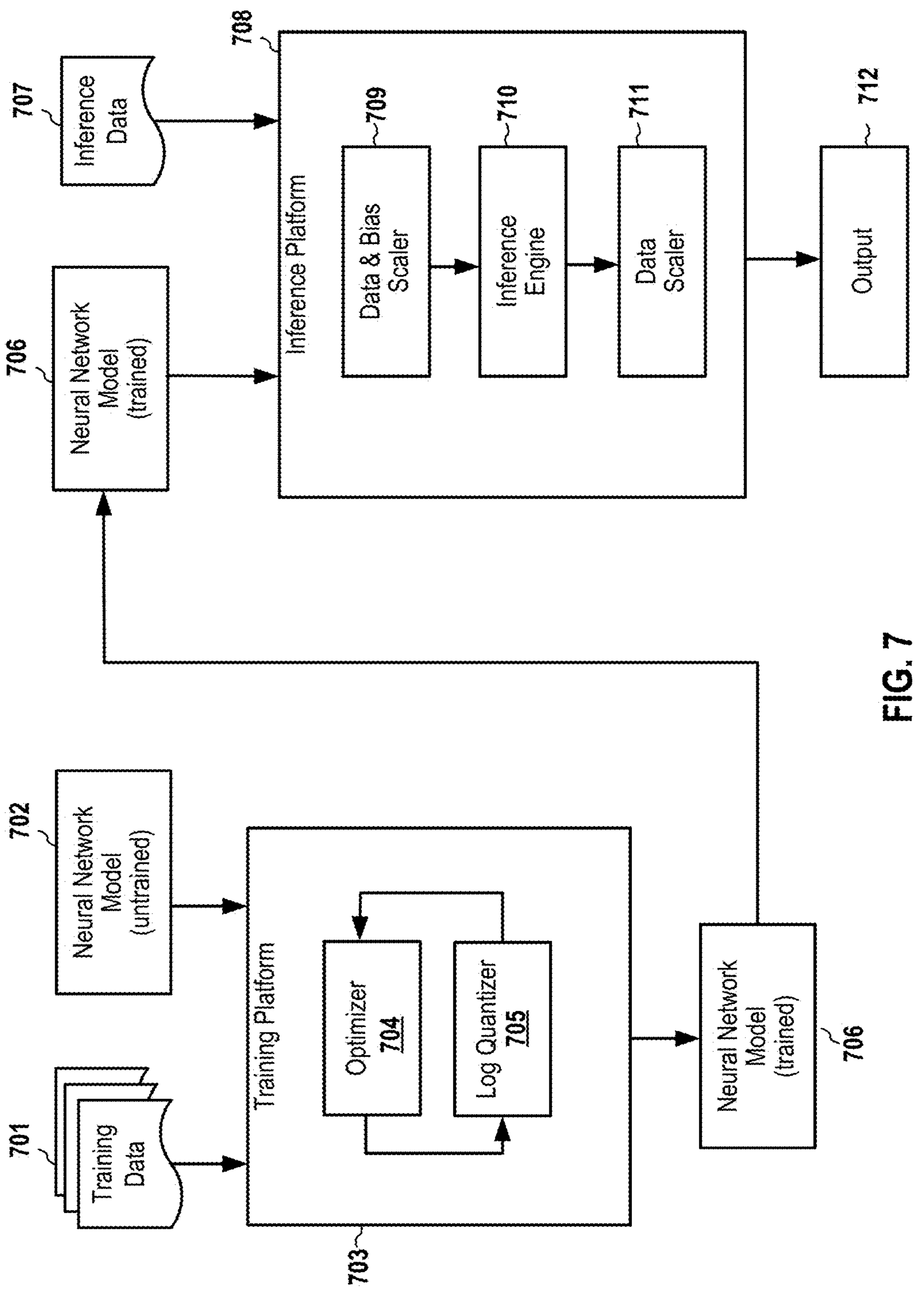
FIG. 7 illustrate an overall architecture of log quantized neural network, in accordance with an example implementation.

FIG. 7 illustrates an overall architecture of the log quantized neural network, in accordance with an example implementation. The NN 2.0 architecture is a log quantized neural network platform that involves the training and inference platform. The training and inference process for the NN 2.0 architecture is described below.

The training data 701 and an untrained neural network 702 are input into the training platform 703. The training platform 703 involves an optimizer 704 and log quantizer 705. The optimizer 704 optimizes the parameters of the model in accordance with any optimization algorithm as known in the art. The log quantizer 705 log quantizes the optimized parameters. The optimizer 704 and log quantizer 705 are iteratively executed until the neural network is trained with an error below the desired threshold, or until another termination condition is met in accordance with the desired implementation. The resulting output is a trained neural network 706 which is represented by log quantized parameters.

The trained neural network 706 and the inference data 707 are input into the inference platform 708, which can involve the following. The data and bias scaler 709 scales the inference data 707 and bias parameters of the trained neural network 706 to form left and right shiftable data and parameters as will be described herein. The inference engine 710 infers the scaled inference data 707 with the trained neural network 706 through hardware or some combination of hardware and software as described herein. The data scaler 711 scales the output of the inference engine 710 to the appropriate output range depending on the desired implementation. The inference platform 708 may produce an output 712 based on the results of the data and bias scaler 709, the inference engine 710, and/or the data scaler 711. The elements of the architecture illustrated in FIG. 7 can be implemented in any combination of hardware and software. Example implementations described herein involve a novel artificial intelligence processing unit (AIPE) as implemented in hardware as described herein to facilitate the multiplication and/or the addition required in the inference through shifting, however, such example implementations can also be implemented by other methods or conventional hardware (e.g., by field programmable gate array (FPGA), hardware processors, and so on) which will save on processing cycles, power consumption, and area on such conventional hardware due to the change of the multiplication/addition operation to a simpler shifting operation instead.

Figure 4:
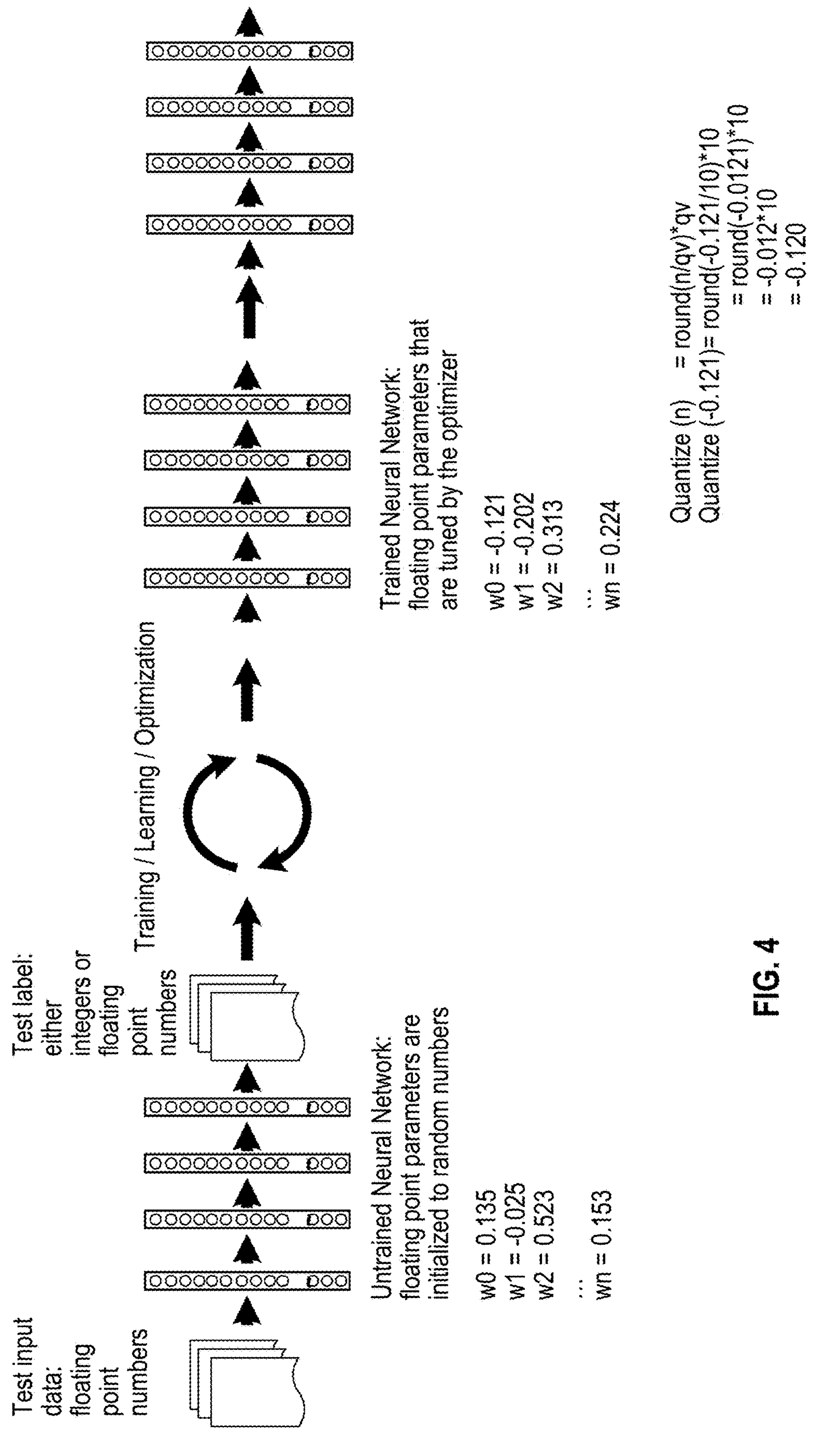
FIG. 4 illustrates an example of a training process for a quantized neural network, in accordance with the related art.
Figure 5:
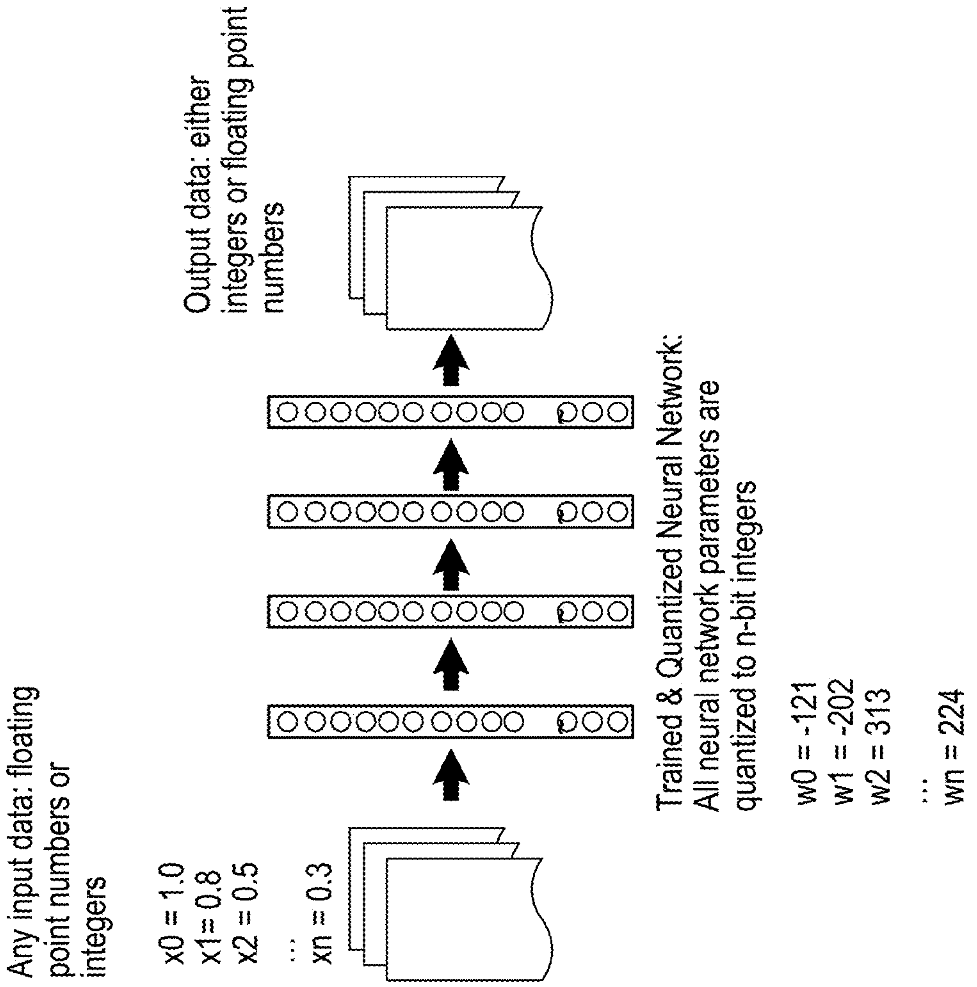
FIG. 5 illustrates an example of an inference process for a quantized neural network, in accordance with the related art.
Figure 6:
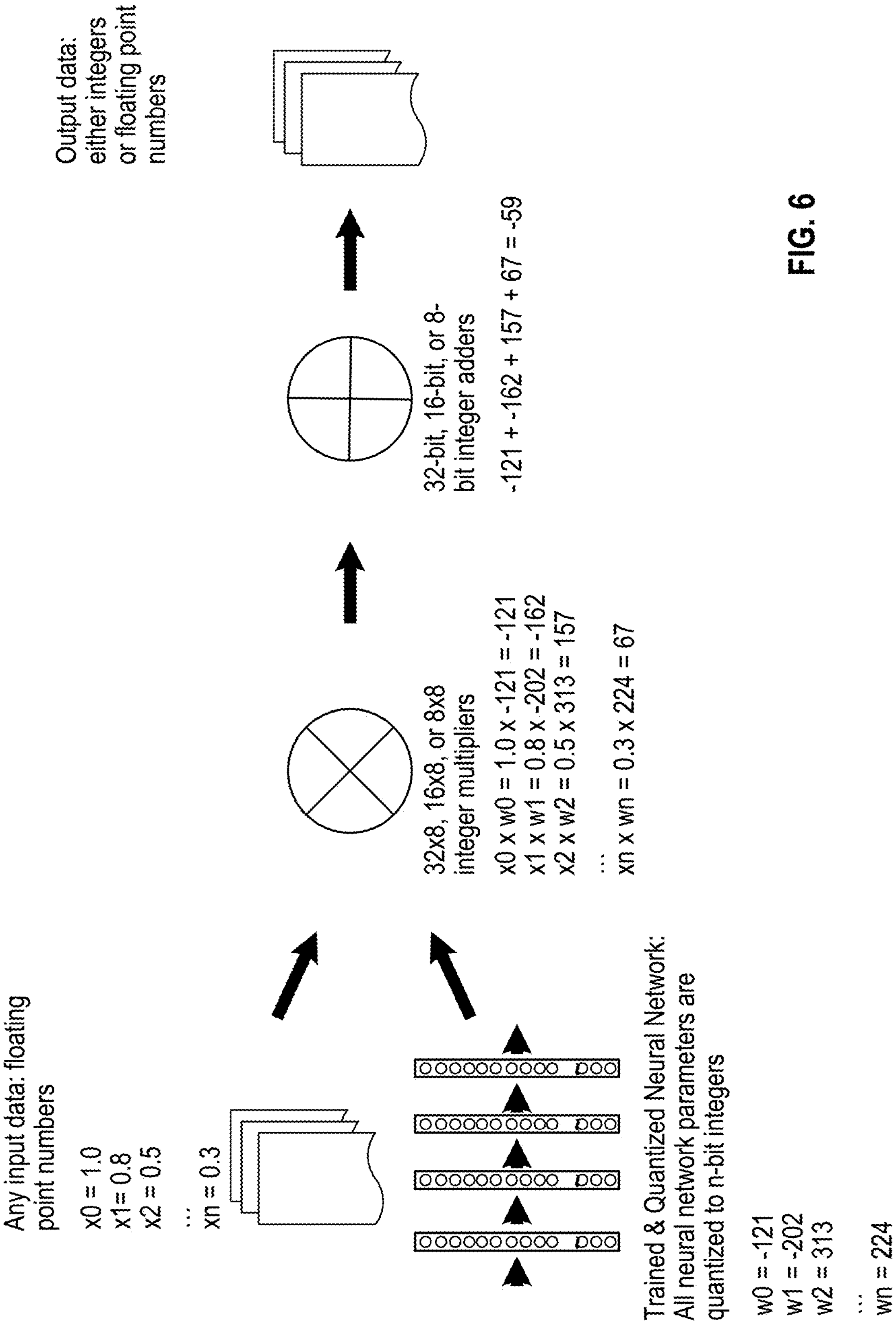
FIG. 6 illustrates an example of a hardware implementation for a quantized neural network, in accordance with the related art.
Figure 8:
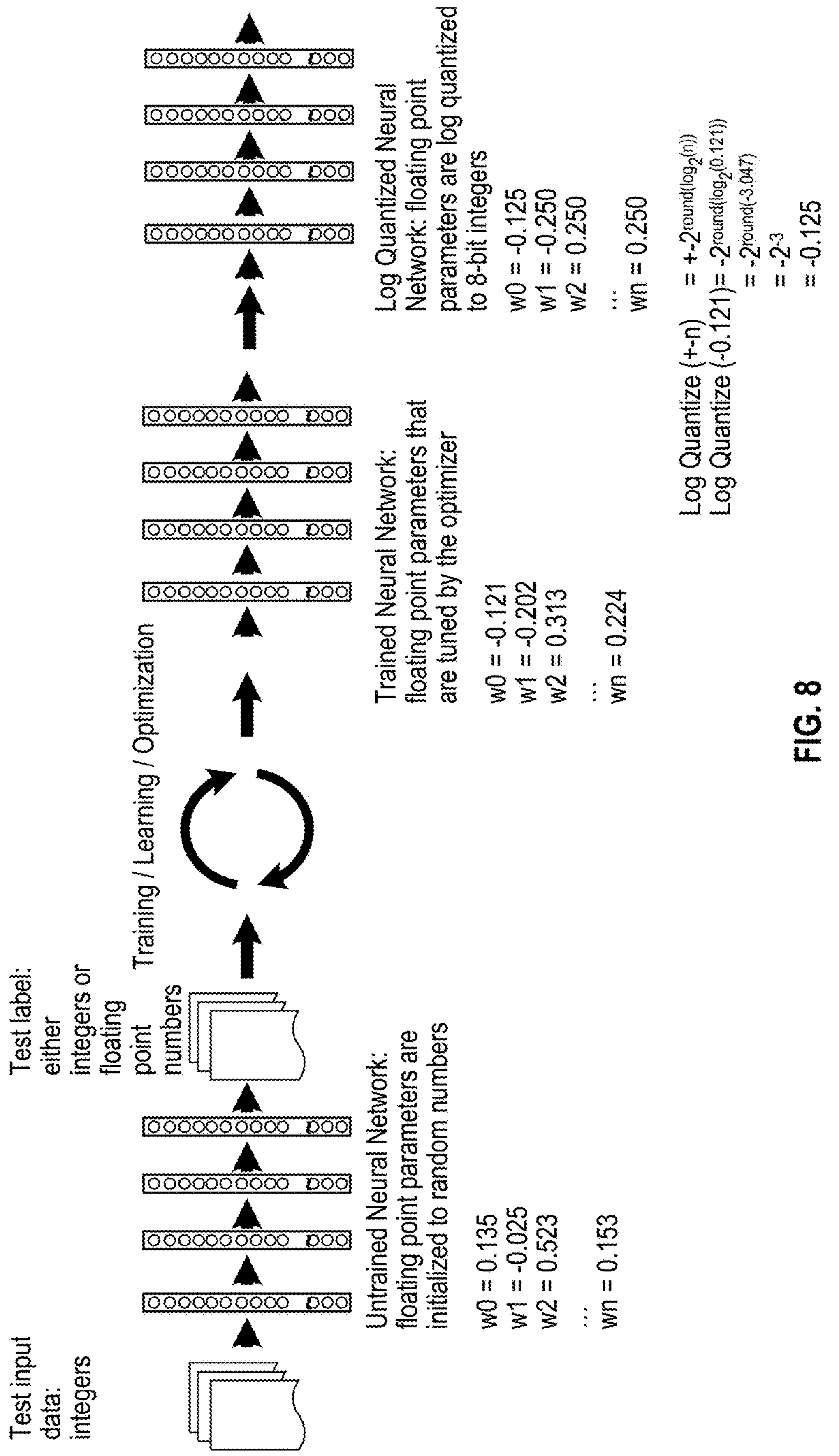
FIG. 8 illustrates an example of training process for a log quantized neural network, in accordance with an example implementation.

FIG. 8 illustrates an example of training a log quantized neural network, in accordance with an example implementation. Depending on the desired implementation, instead of utilizing a "round(operand)" operation, for example as discussed in FIG. 4, any mathematical operation that turns the operand into an integer can be used such as "floor(operand)" or "ceiling(operand)" or "truncate(operand)", and the present disclosure is not particularly limited thereto.

Figure 9A:
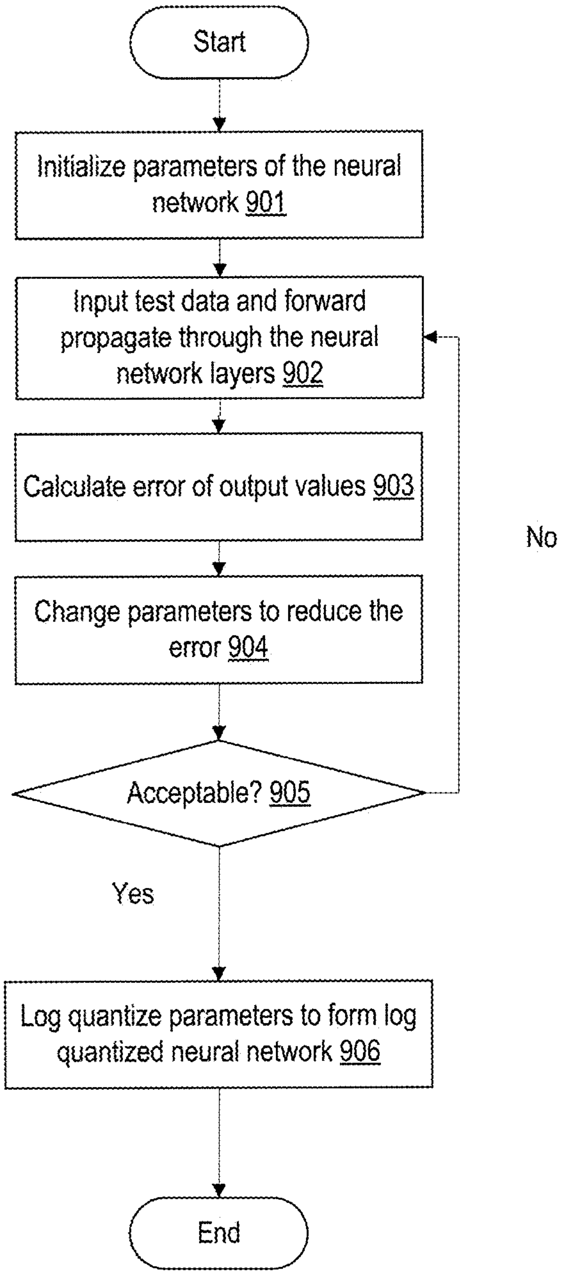
FIGS. 9A and 9B illustrate an example flow for a log quantized neural network training, in accordance with an example implementation.
Figure 9B:
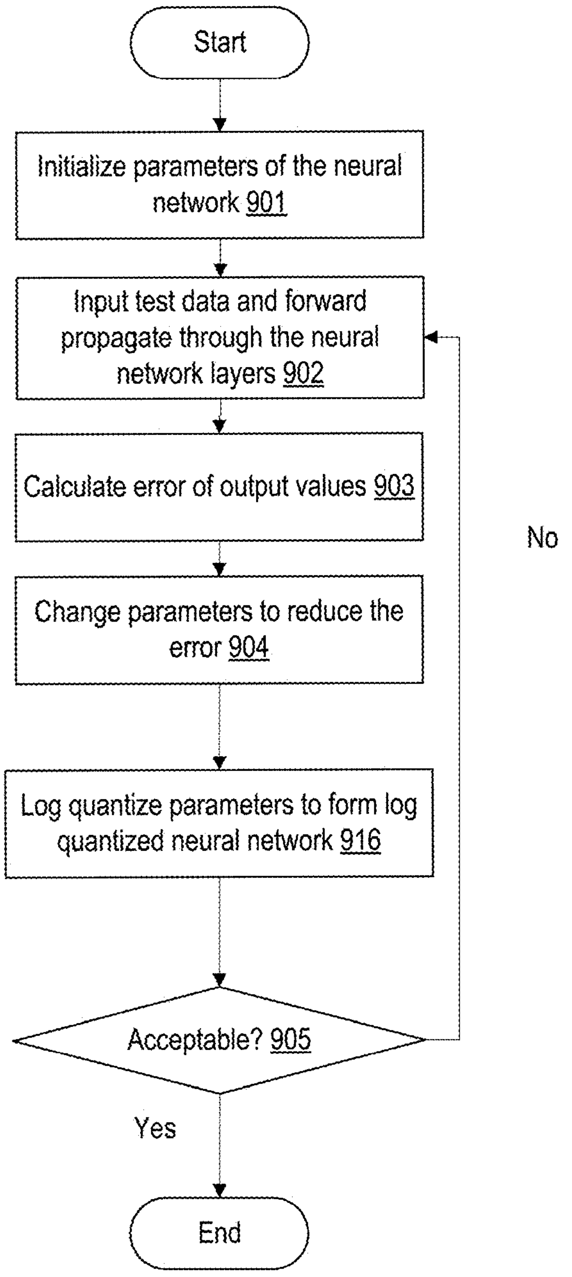

FIGS. 9A and 9B illustrate an example flow for the log quantized neural network training, in accordance with an example implementation.

At 901, the flow first initializes the parameters (e.g., weights, biases) of the neural network, which can be in the form of random floating point or integer numbers in accordance with the desired implementation. At 902, the test data is input to the neural network and forward propagated through all of the neural network layers to obtain the output values processed by the neural network. At 903, the error of the output values is calculated by comparing the output values to the test label values. At 904, an optimization method is used to determine how to change the parameters to reduce the error of the neural network, and the parameters are changed accordingly. At 905, a determination is made as to whether the parameters are acceptable; that is whether the neural network produces an error within the threshold or whether some other termination condition is met. If so (Yes), then the flow proceeds to 906, otherwise (No) the flow proceeds to 902. Accordingly, the flow of 902 to 905 is iterated until the desired error is met or whether a termination condition is met (e.g., manually terminated, a number of iterations are met, and so on).

At 906, the resulting parameters are then log quantized to reduce the size of the parameters and thereby prepare them for the shifter hardware implementation. In an example, 32-bit floating point numbers are log-quantized into 7-bit data, however, the present disclosure is not limited to the example and other implementations in accordance with the desired implementation can be utilized. For example, 64-bit floating point numbers can be log-quantized into 8-bit data. Further, the flow at 906 does not have to be executed at the end to log-quantize the parameters. In an example implementation, the log-quantization of the parameters can be part of the iterative process between 902 and 905 (e.g., executed before 905) so that the log-quantization can be used as part of the iterative training process of the parameters, as illustrated at 916 of FIG. 9B. Such an example implementation can be utilized depending on the desired implementation therein, so that the optimization and log quantization happens together to produce parameters (e.g., 7-bit data parameters). The resulting log-quantized neural network can thereby take in any input (e.g., floating point numbers, integers), and provide output data accordingly (e.g., proprietary data format, integers, floating point numbers).

Figure 10:
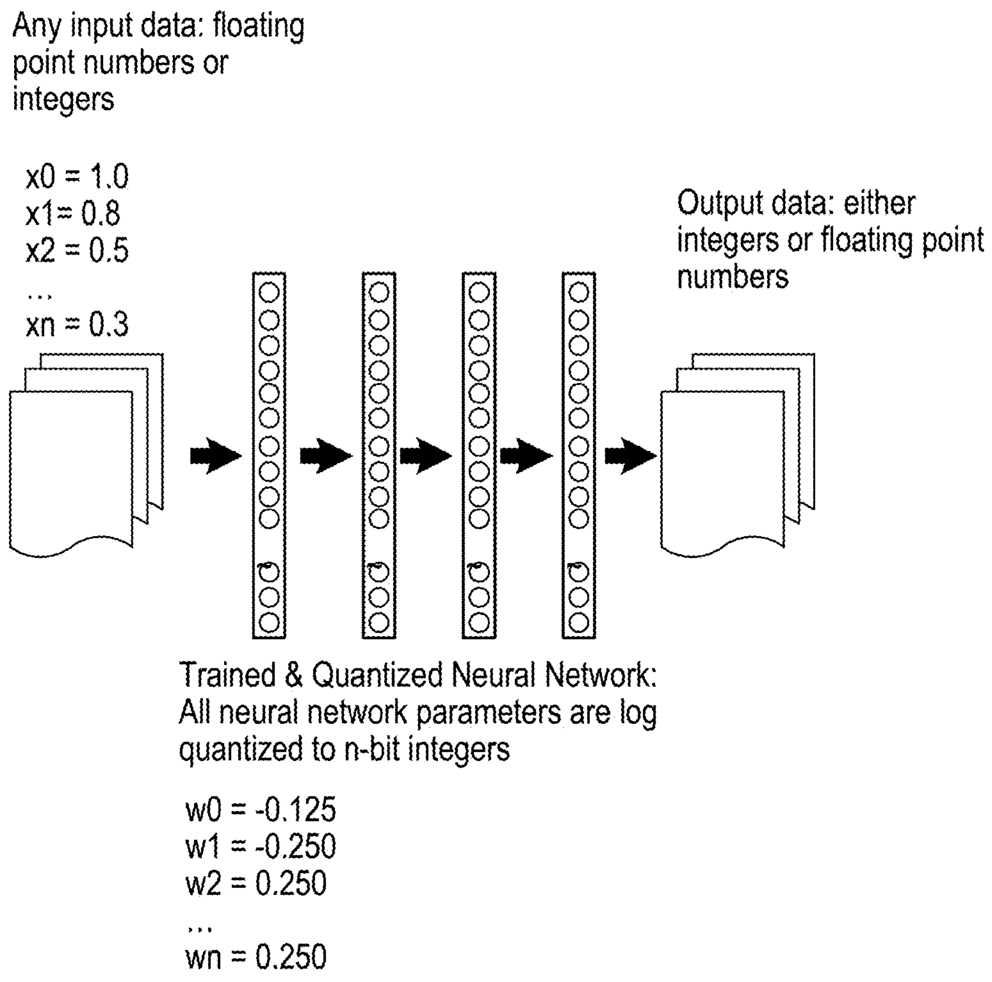
FIG. 10 illustrates an example of an inference process for a log quantized neural network, in accordance with an example implementation.

FIG. 10 illustrates an example of an inference process for a log quantized neural network, in accordance with an example implementation. To facilitate the neural network inference, at first, the inference data is input to the neural network, which is forward propagated through all the layers to get the output values. Then, the output values of the neural network are interpreted in accordance with the objectives set by the neural network. However, in this example, the parameters are log quantized. Thus, the inference process can be conducted via shifter circuits or AIPEs as will be described herein, or can be conducted in software using hardware processors and shifting operations depending on the desired implementation.

Figure 11:
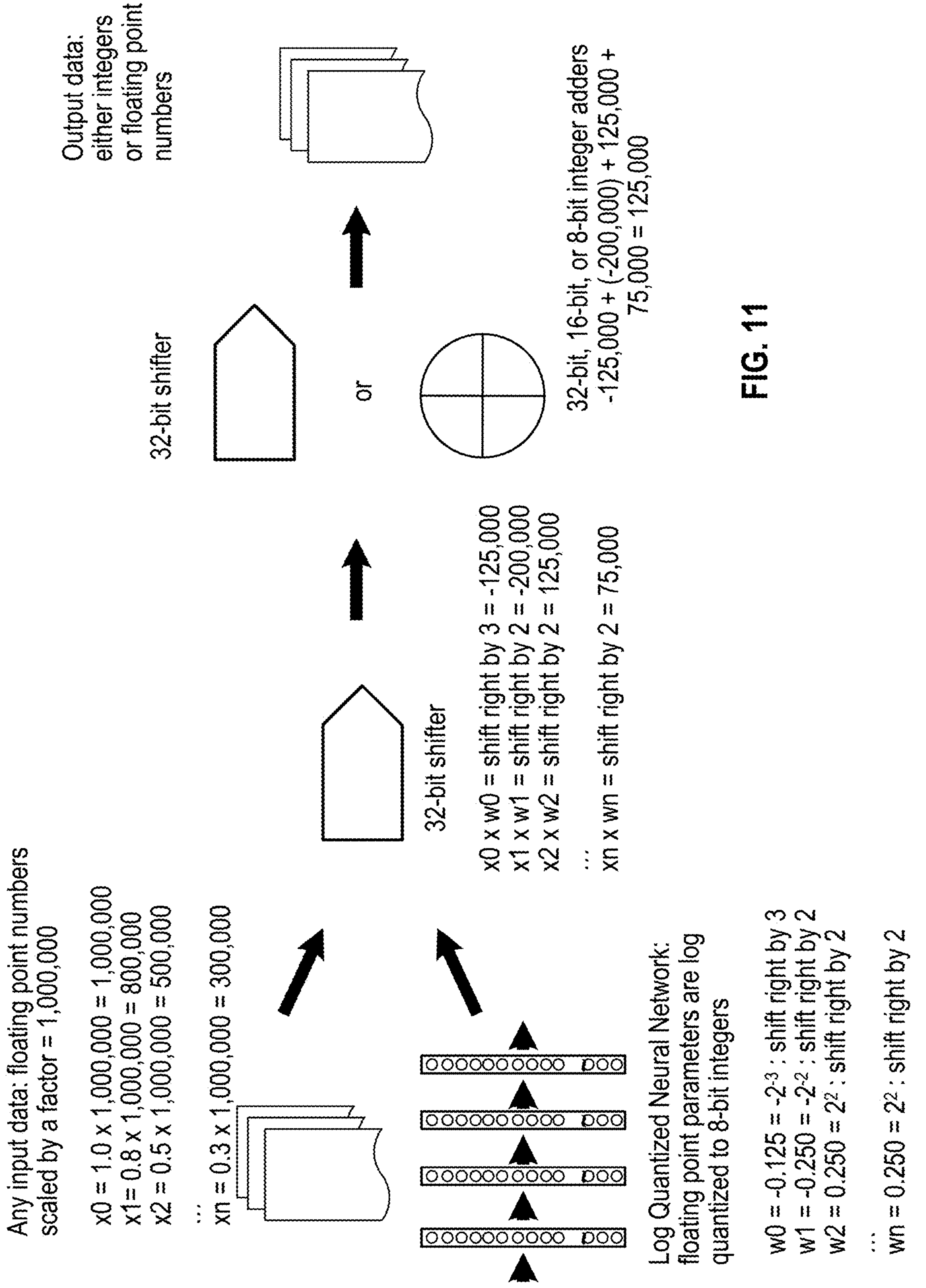
FIG. 11 illustrates an example of hardware implementation for a log-quantized neural network, in accordance with an example implementation.

FIG. 11 illustrates an example of a hardware implementation for the log-quantized neural network, in accordance with an example implementation. To implement the log-quantized neural network in hardware, at first, input data and neural network parameters are obtained. Then, through using a hardware or software data scaler, input data and biases are scaled by a factor in preparation for a shift operation by a hardware shifter. Through using the hardware shifter, input data is shifted based on the log-quantized parameter value. Then, through using a hardware adder, all of the shifted values are added together. Finally, the hardware adder is used to add the bias to the sum. In the example implementation of FIG. 11, a 32-bit shifter is utilized to facilitate the multiplication of a scaled input data value (e.g., scaled by $2^{10}$) with a log quantized parameters (e.g. 7-bit log-quantized parameter), as well as for the addition operation. However, other variations can be utilized depending on the desired implementation, and the present disclosure is not limited thereto. The input data values can be scaled by any factor, and the log quantized parameters can similarly be any type of log-quantized factor (e.g., 8-bit, 9-bit) with the shifter sized appropriately (e.g., 16-bit, 32-bit, 64-bit, etc.) to facilitate the desired implementation.

Figure 12:
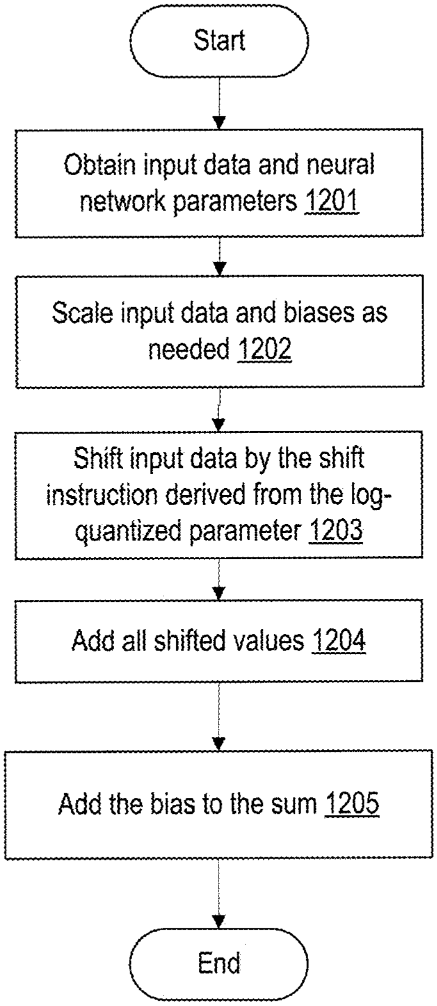
FIG. 12 illustrates an example of the flow diagram of hardware implementation for a log-quantized neural network, in accordance with an example implementation.

FIG. 12 illustrates an example of the flow diagram of the log quantized neural network inference in the hardware implementation, in accordance with an example implementation. At 1201, the flow obtains the input data and log-quantized neural network parameters. At 1202, the flow scales input data and biases by an appropriate factor to convert the input data and biases into a shiftable form for the shift operation. At 1203, the shiftable input data is shifted by the shift instruction derived from the log quantized parameter. The shift can be executed by a hardware shifter as described herein, or can be executed by hardware processors or Field Programmable Gate Arrays (FPGAs) depending on the desired implementation. Further details of the shift will be described herein.

At 1204, all of the shifted values are added. The addition operation can be carried out by a hardware adder as described herein, or can be executed by hardware processors or FPGAs depending on the desired implementation. Similarly, at 1205, the scaled bias is added to the resulting sum of the addition operation at 1204 by a hardware adder, hardware processors, or FPGAs.

Figure 13A:
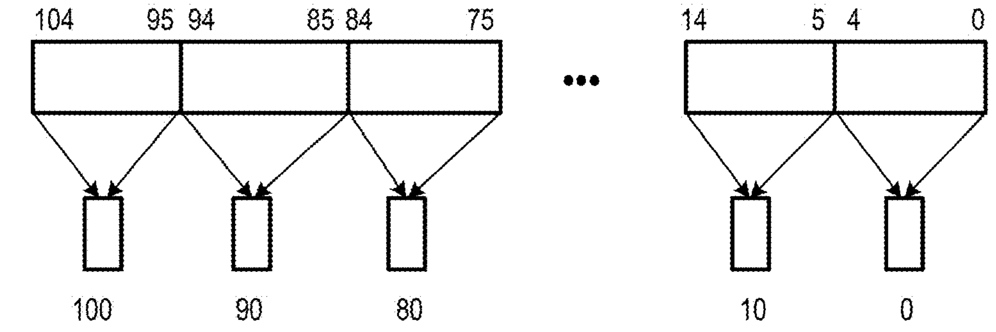
FIGS. 13A and 13B illustrate a comparison between quantization and log-quantization, respectively.
Figure 13B:
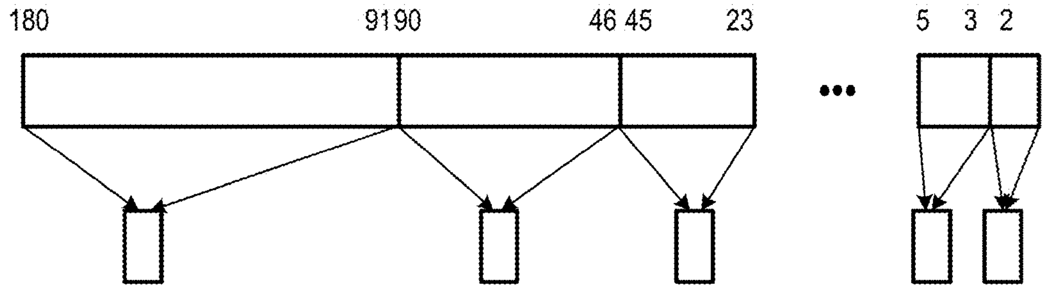

FIGS. 13A and 13B illustrate a comparison between quantization and log-quantization, respectively. FIG. 13A illustrates an example of quantizing integers from 0 to 104 by qv=10, where Quantization (n)=round(n/qv)*qv. FIG. 13B illustrates an example of log quantizing integers from 2 to 180, wherein Log Quantization (+—n)=+—$2^{round\ (log_2(n))}$. As illustrated in the comparison of FIGS. 13A and 13B, the log-quantization allows for better precision of smaller parameters due to the ranges being in the form of $2^n$ as opposed to the same ranges regardless of parameter values.

FIGS. 14A-14C illustrate a comparison between parameter updates for a normal neural network training and for a log-quantized neural network training, respectively. Although example implementations described herein involve executing the log-quantization of the weight parameter by adjusting the gradient appropriately, the log-quantization of the updated weight parameter after the gradient adjustment can also be done in accordance with example implementations described herein. In such an example implementation, the flow and 916 of FIG. 9B can be modified by determining an appropriate learning rate to multiply the gradient with so that the resulting parameter value will be a log-quantized value.

In example implementations described herein, the input data is scaled in accordance with the desired implementation to accommodate the shift operation. Most parameters in a model will result in "shift right" operation which correspond to values smaller than 1.0 such as 0.5, 0.25, 0.125, and so on. Therefore, the input data is shifted left, which is equivalent of multiplying the input by $2^N$ where N is a positive integer.

As an example, suppose the raw input value is $x_{old}$=0.85. The input is scaled by $2^{20}$ to result in 0.85×$2^{20}$=0.85×1,048,576=891,289.6. Such scaled input is rounded to an integer such that round (891,289.6)=891,290, which is used as the new input value $x_{new}$=891,290.

Bias is defined as a parameter that is added (not multiplied) in neural network operations. In a typical neural network operation as follows, bias term is the additional term.

$$a = x * w + b$$

Where, a is axon (output), x is input, w is weight, and b is bias. In example implementations described herein, the input and biases are scaled by the same amount. For example, if input is scaled by $2^{20}$, then bias is scaled by $2^{20}$.

Figure 15:
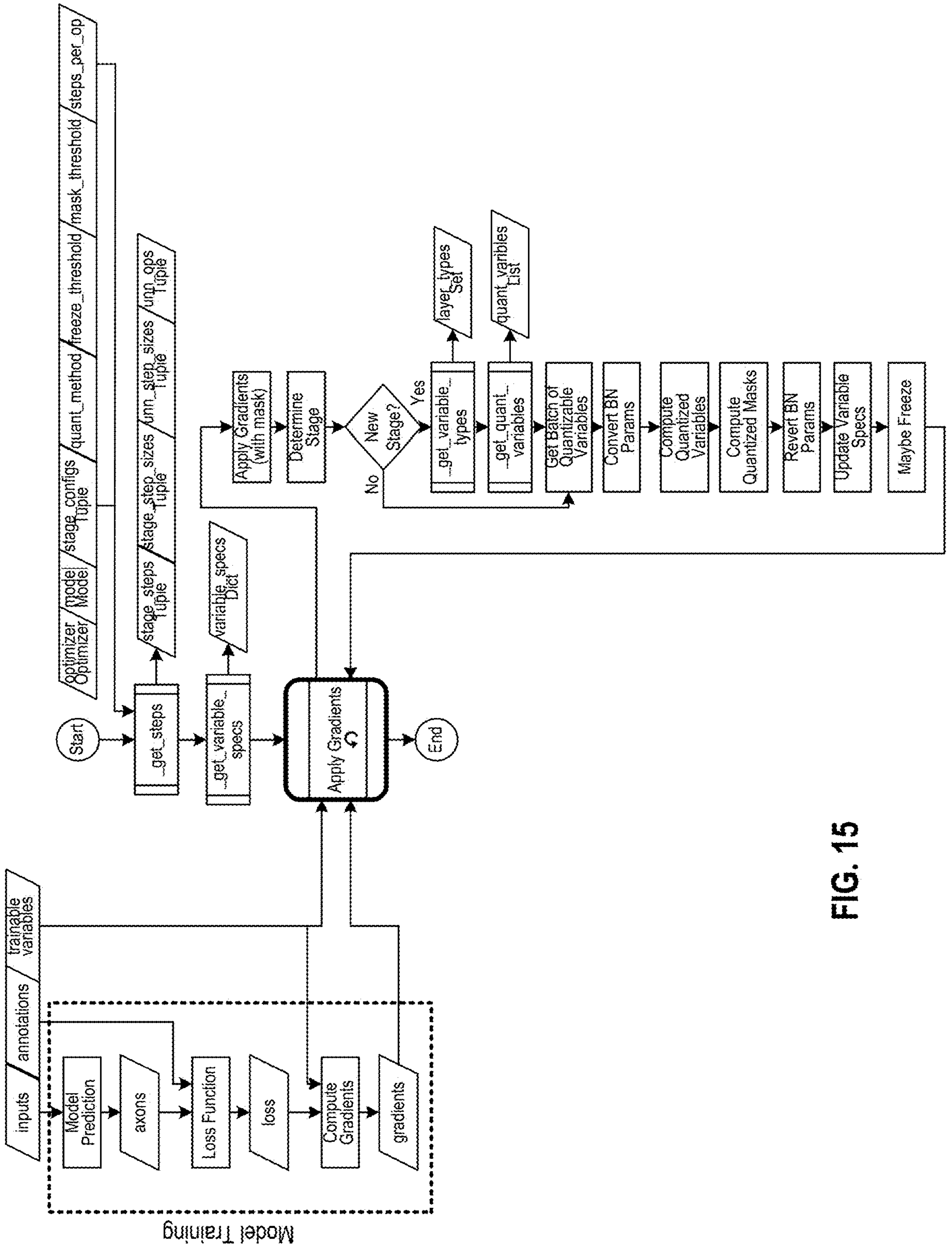
FIG. 15 illustrates an example of an optimizer for log quantized neural network, in accordance with an example implementation.

FIG. 15 illustrates an example of an optimizer, in accordance with an example implementation. In the example implementations described herein, the optimization can be built on top of any other gradient-based optimizer. The optimization can be done in stages, with the number of stages set by the user, in addition to the following for each stage: how often (in training steps) a step is performed, what layers are affected by the steps in each stage, and/or whether to quantize variables within a user-set threshold ('quant'—quantize values that are under the quantization threshold), or to force quantize all variables in the selected layers ('force'—quantize all parameters regardless of the threshold). Each stage defined by a stage step count (e.g., number of optimizations per stage), step interval (e.g., number of operations per stage), and an operation (e.g., type of operation (quant/force) and which layers to quantize).

Depending on the desired implementation, the user may also set the following parameters.

quant_method: 'truncate' or 'closest'; the rounding method to use when quantizing freeze threshold: threshold to determine the percentage of weights that must be quantized before forcing a quantize+freeze operation for the remaining weights.

mask threshold: threshold to determine how close weights must be to log-quantized form in order to quantize+freeze that weight.

In example implementations, the model quant method can be as follows.

Closest: For a value x, quantize to the nearest $log_2$ value.

Down: For a value x, quantize to the nearest floor of $log_2$.

Stochastic: For a value x, find ceiling and floor of $log_2$. The probability the ceiling is selected is (x—floor)/(ceiling—floor)

In example implementations, the model freeze method is as follows.

Threshold: During a freezing operation, freeze any layer where the layer has a percentage of weights frozen greater than or equal to the fz_threshold. At the end of the training, any remaining layers are also frozen.

Ranked: During a freeze operation, the layers are ranked in terms of percentage of weights frozen. The highest ranked layers are then frozen and managed so that an equal number of layers are frozen every time a freeze operation is performed.

Ordered: During a freeze operation, layers are frozen in terms of input→output order and managed so that an equal number of layers are frozen.

The training stage options in example implementations can be as follows. The default is assumed to be a regular (NN 1.0) neural network operation.

Fz_all: Quantizes, freezes, and applies mask to layers if it's a NN2.0 operation.

Fz_bn: Quantizes, freezes, and applies mask to Batch Norm layers if it's a NN2.0 operation.

Fz_conv: Quantizes, freezes, and applies mask to convolutional layer if it's a NN2.0 operation.

Quant_all: Quantizes and applies mask to all layers if it's a NN2.0 operation.

Quant_bn: Quantizes and applies mask to Batch Norm layers if it's a NN2.0 operation.

Quant_conv: Quantizes and applies mask to convolutional layers if it's a NN2.0 operation.

The training breakdown of example implementations can be as follows.

Input: Tuple of training stage tuples.

Example A: ((4, 1, Fz_all),)

The first entry dictates how many epochs are conducted for the stage operation (in this case, fz_all for four epochs).

The second entry dictates how often a NN2.0 operation will be performed. In other words, this tuple indicates that the fz_all operation is executed every epoch.

The third entry indicates which NN2.0 stage operation is to be performed.

Example B: ((2, 1, Default), (4, 1, Fz_conv), (4, 2, fz_bn))

In this example, the training is done for a total of ten epochs. The first two epochs will be trained with NN1.0. The next four epochs will run a NN2.0 operation at the end of every epoch. By the end of the four epochs all convolution layers will be frozen. The final four epochs will run a NN2.0 every other epoch. By the end of the fourth epoch, all batch normalization layers will be frozen.

Figure 16C:
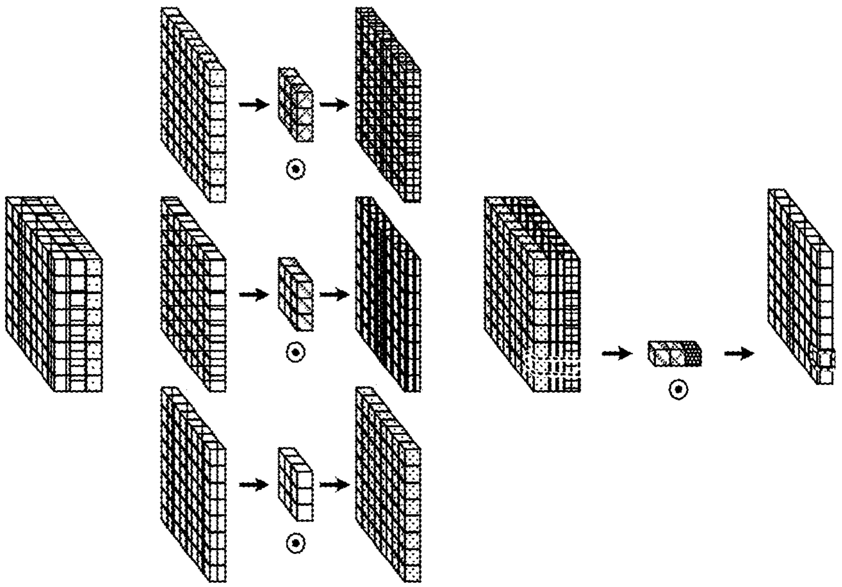
FIGS. 16A-16C illustrate examples of convolution operations, in accordance with an example implementation.
Figure 16B:
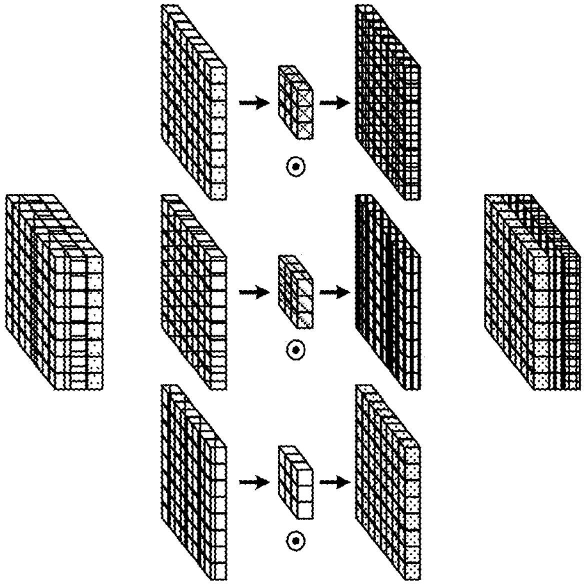
Figure 16A:
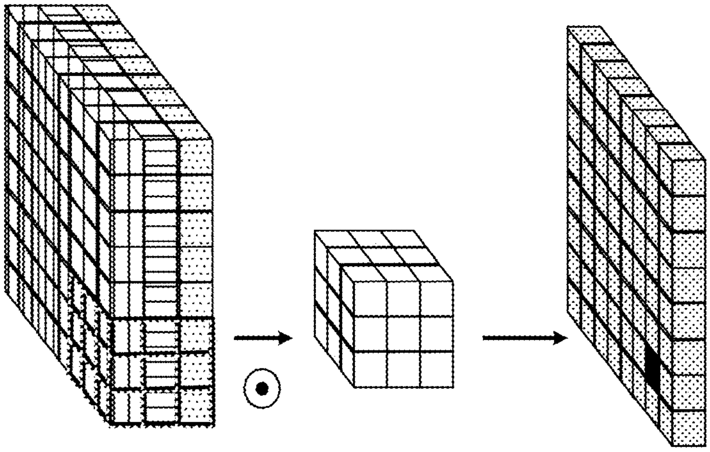

FIGS. 16A, 16B, and 16C illustrate examples of convolution operations, in accordance with an example implementation. Specifically, FIG. 16A illustrates an example of convolution, FIG. 16B illustrates an example of depthwise convolution, and FIG. 16C illustrates an example of separable convolution. In the example convolution of FIG. 16A, a two-dimensional (2D) convolution is applied over an input signal such that $$Conv(x) = \sum(\text{weight} * x) + \text{bias}$$

In the example of depthwise convolution of FIG. 16B, a 2D convolution is applied over each channel separately, wherein the outputs are concatenated. In the example of separable convolution of FIG. 16C, a 2D convolution is applied over each channel separately, wherein the outputs are concatenated and convolution is conducted depthwise.

Figure 17A:
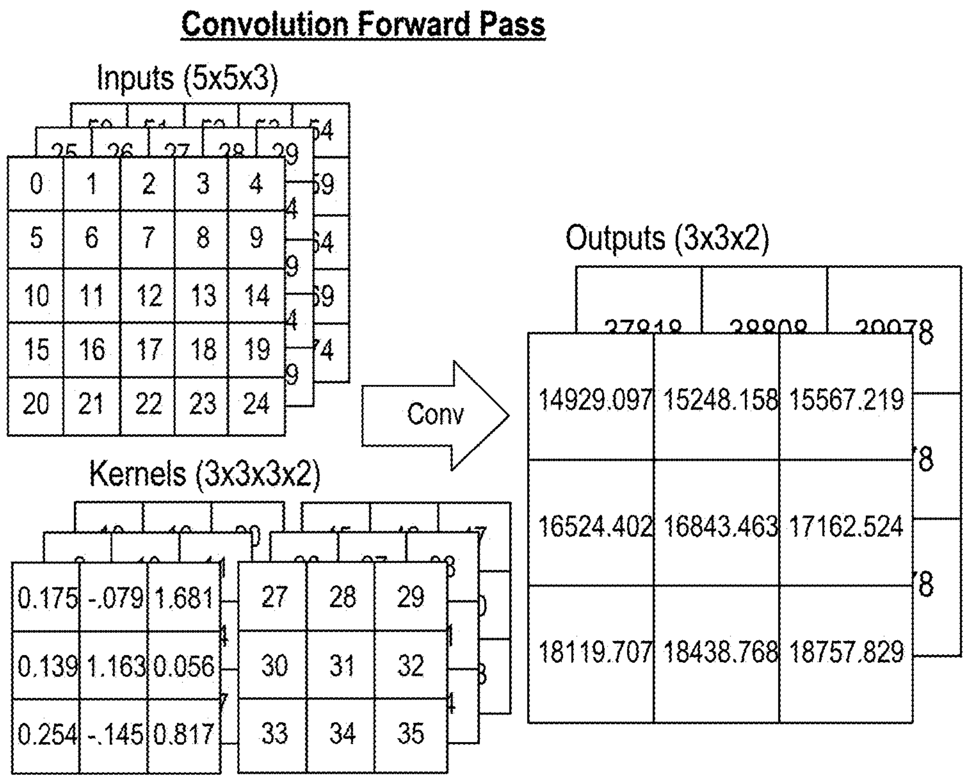
FIGS. 17A, 17B, and 18 illustrate an example process for training convolution layers in log quantized neural network, in accordance with an example implementation.
Figure 17B:
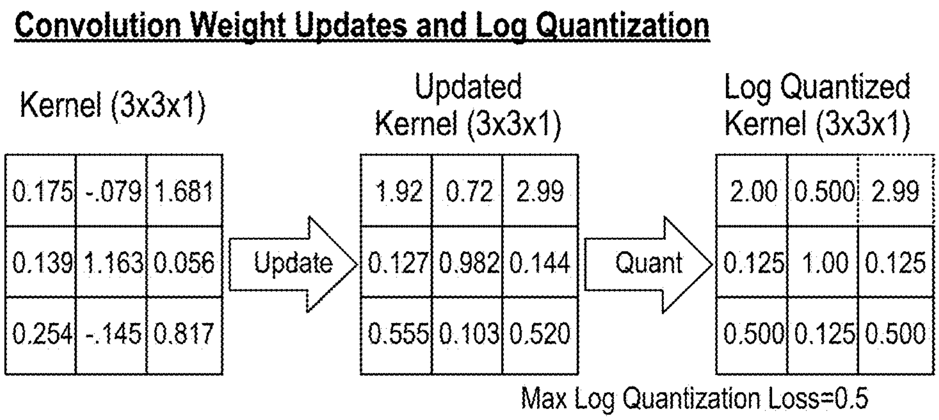
Figure 18:
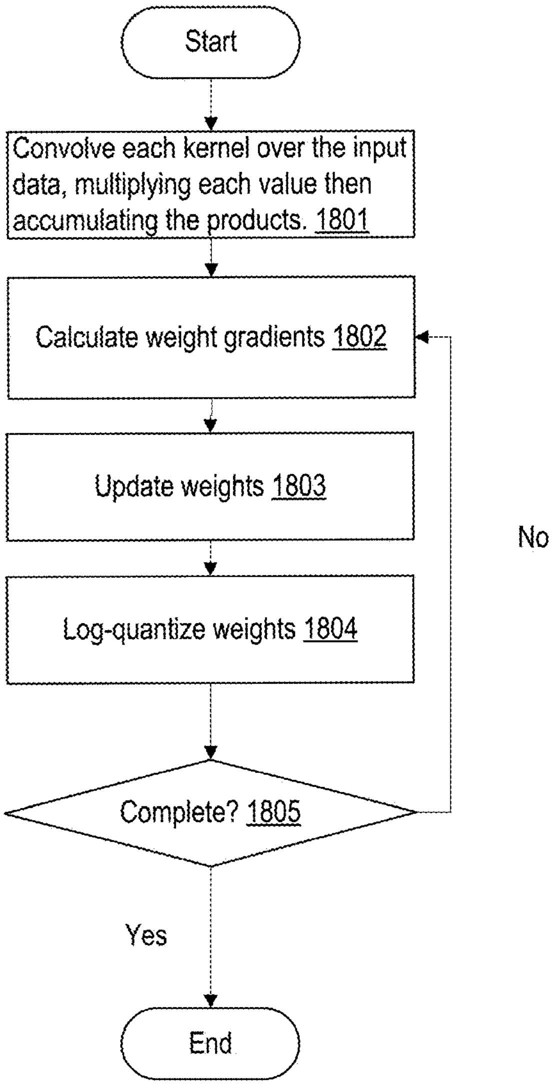

FIGS. 17A, 17B, and 18 illustrate an example process for training convolution layers, in accordance with an example implementation. Specifically, FIG. 17A illustrates an example of the convolution forward pass, FIG. 17B illustrates an example of convolution weight updates and log quantization, and FIG. 18 illustrates an example flow for the training of the convolution layers in reference to FIG. 17A and FIG. 17B. In the flow of FIG. 18, at 1801, the flow convolves each kernel (3×3×3 in FIG. 17A) over the input data, multiplying each value, then accumulating the products. One output matrix (3×3 in FIG. 17A) will be generated for each kernel. At 1802, the flow calculates weight gradients after computing the error between outputs and ground truth data. At 1803, using the weight gradients, the flow updates weights according to a predefined update algorithm as shown in FIG. 17B. At 1804, the flow log quantizes weight values that have a low log quantization cost. Weights with a high quantization loss can be left unquantized until a future iteration, or can be quantized immediately depending on the desired implementation. In the example of FIG. 17B, the value 2.99' is left unquantized because the log quantization cost would be 2.99-2.00=0.99, higher than the max log quantization loss of 0.5. At 1805, the process from 1801 to 1804 is iterated until the convolution training is complete.

Figure 19A:
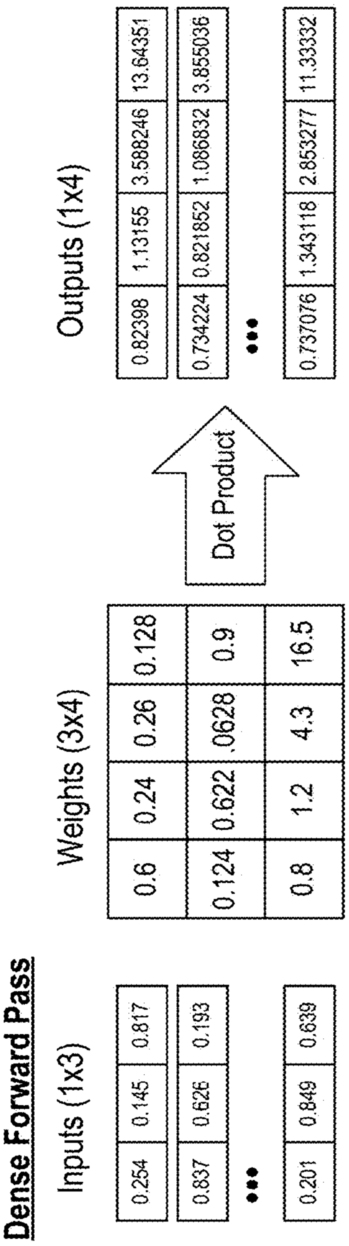
FIGS. 19A, 19B, and 20 illustrate an example process for training dense layers in log quantized neural network, in accordance with an example implementation.
Figure 19B:
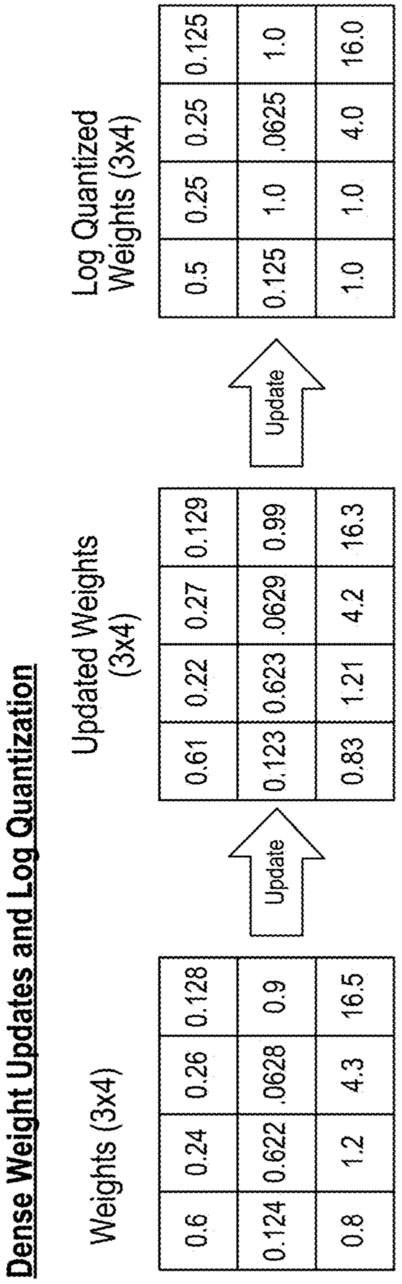
Figure 20:
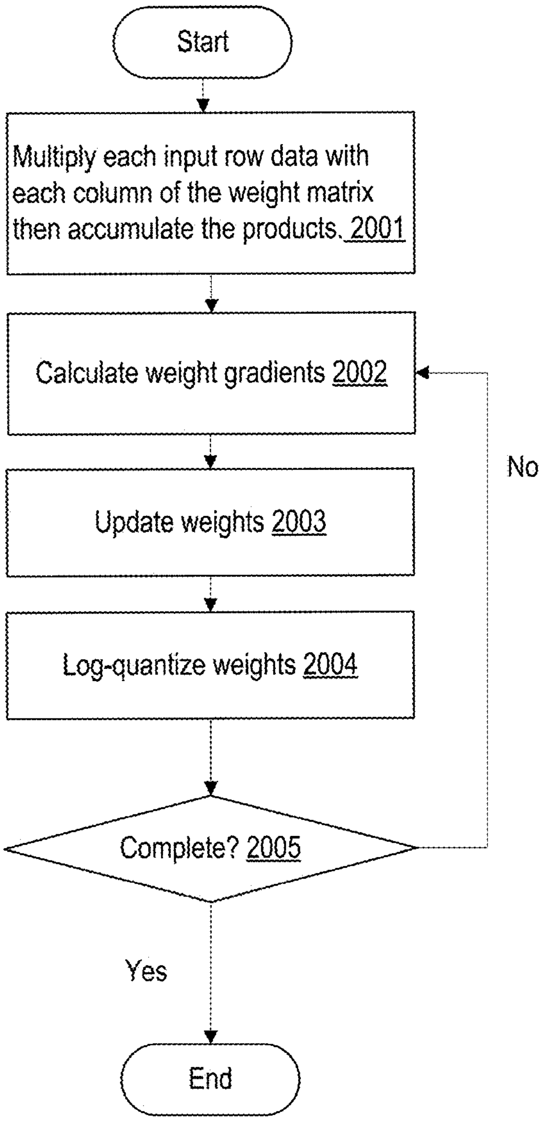

FIGS. 19A, 19B, and 20 illustrate an example process for training dense layers, in accordance with an example implementation. Specifically, FIG. 19A illustrates an example of the dense layer forward pass, FIG. 19B illustrates an example of dense layer weight updates and log quantization, and FIG. 20 illustrates an example flow for the training of the dense layers in reference to FIG. 19A and FIG. 19B. In the flow of FIG. 20, at 2001, the flow multiplies each input row data (Inputs (1×3) from FIG. 19A) with each column of the weight matrix (Weights (3×4) from FIG. 19A) then accumulate the products resulting in an output (1×4) as shown in FIG. 19A. At 2002, the flow calculates weight gradients after computing error between outputs and ground truth data. At 2003, using the weight gradients, the flow update weights according to a predefined update algorithm as illustrated in FIG. 19B. At 2004, the flow log quantizes weight values that have a low log quantization cost. Weights with a high quantization loss can be left unquantized until a future iteration or can be quantized immediately depending on the desired implementation. At 2005, the process from 2001 to 2004 is iterated until the dense layer training is complete.

With respect to batch normalization training, for a layer with d-dimensional input $x=(x^{(1)} \ldots x^{(d)})$, each dimension is normalized.

The dimension may represent the channel based on the following:

$$\hat{x}^{(k)} = \frac{x^{(k)} - \text{mean}(x^{(k)})}{\sqrt{\text{variance}(x^{(k)} + \epsilon)}}$$

where the mean and the variance are computed over the training data set.

For each activation $x^{(k)}$, a pair of parameters $\gamma^{(k)}$, $\beta^{(k)}$ may scale and shift the normalized value as follows $BN^{(k)} = \gamma^{(k)}\hat{x}^{(k)} + \beta^{(k)}$. The pair of parameters are learned along with the original model parameters.

With respect to batch normalizing data, batch normalization (BN) is represented by the following:

$$BN(x) = \gamma\left(\frac{x - \text{mean}}{\sqrt{\text{var} + \epsilon}}\right) + \beta$$

The mean and variance of the data are calculated.

The value of epsilon (€) is usually a small number so as to avoid division by zero. The BN is then converted to the form of W.x+B.

$$BN = \left(\frac{\gamma}{\sqrt{\text{var} + \epsilon}}\right) \cdot x + \left(\beta - \gamma \cdot \left(\frac{\text{mean}}{\sqrt{\text{var} + \epsilon}}\right)\right)$$

Where, $$W = \frac{\gamma}{\sqrt{\text{var} + \varepsilon}}$$

$$B = \beta - \gamma \cdot \left(\frac{\text{mean}}{\sqrt{\text{var} + \epsilon}}\right)$$

The W term is log quantized and the bias term B is scaled appropriately. Then W is multiplied to the input x and bias B is added to the result of the multiplication.

Figure 21:
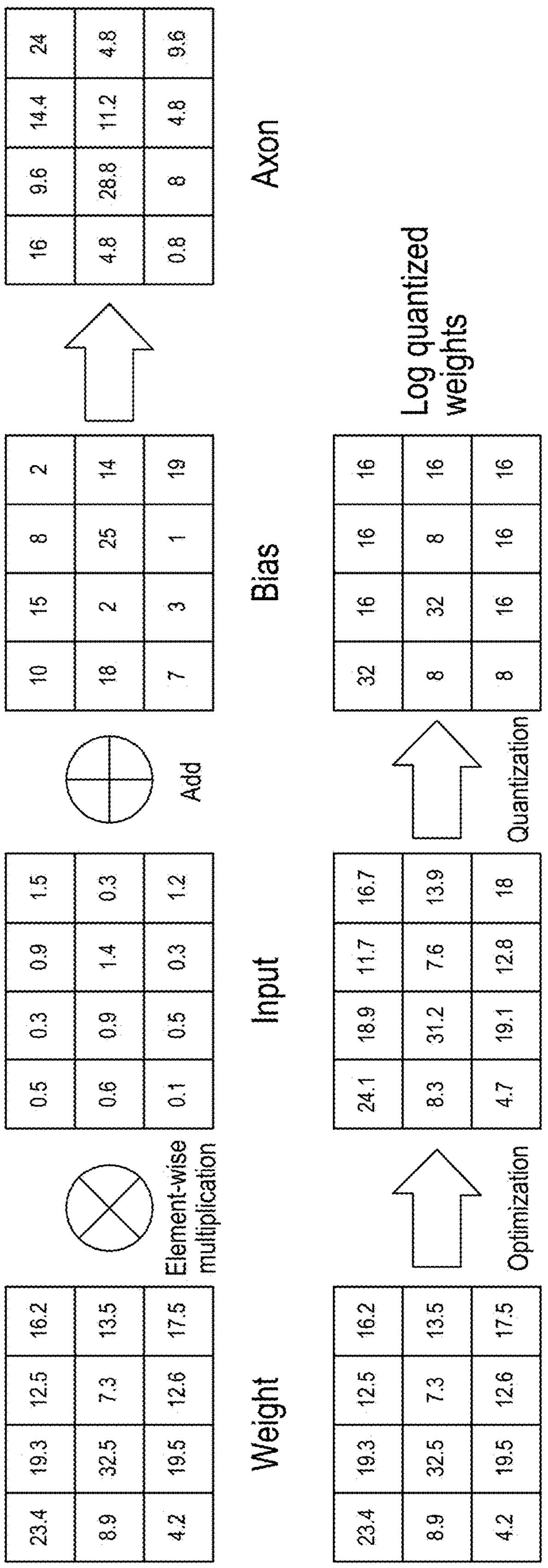
FIGS. 21 and 22 illustrate an example process of batch normalization in log quantized neural network, in accordance with an example implementation.
Figure 22:
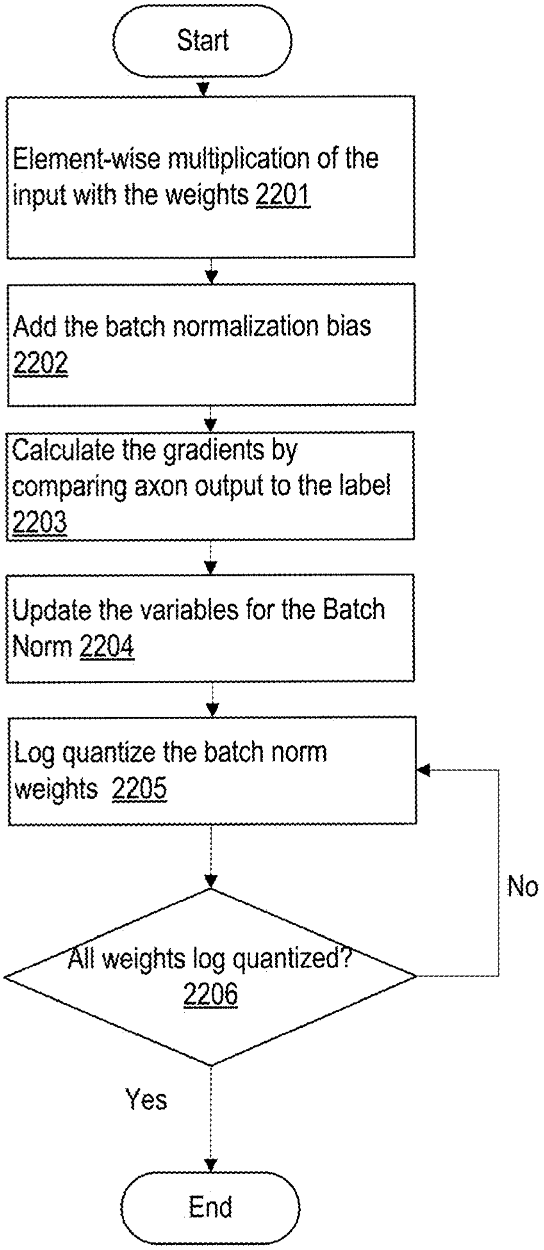

FIGS. 21 and 22 illustrate an example of batch normalization training, in accordance with an example implementation. Specifically, FIG. 22 illustrates a flow of the batch normalization training which is used in the example for FIG. 21. At 2201, the flow conducts element-wise multiplication of the input with the batch normalization weights. At 2202, the flow adds the batch normalization bias. At 2203, the flow calculates the gradients by comparing axon output to the label. At 2204, the flow updates the variables for the batch normalization. At 2205, the flow log quantizes the batch norm weights that are close (e.g., within a threshold) to log quantized values. At 2206, the flow repeats 2205 until the batch normalization weights are fully log quantized.

Figure 23:
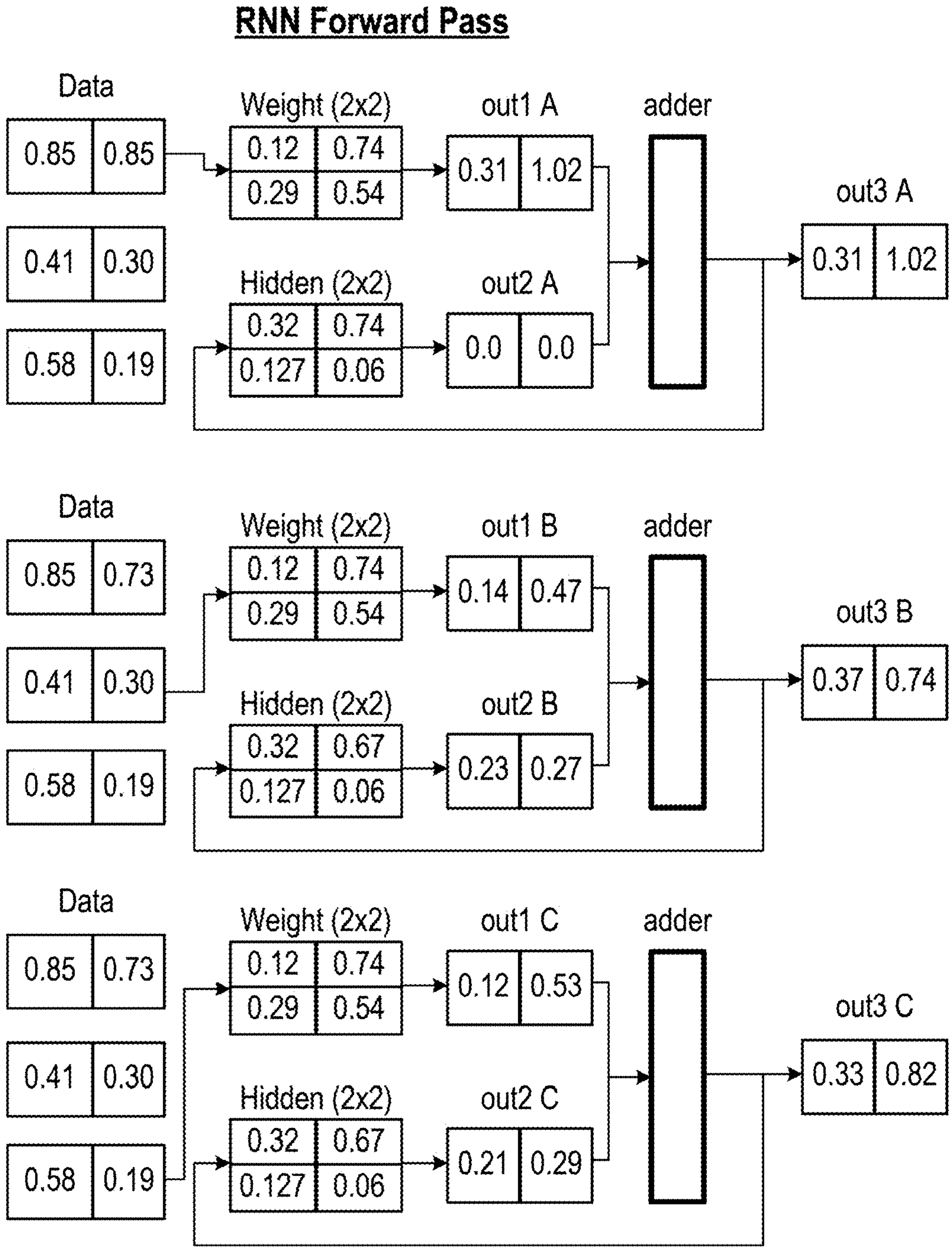
FIGS. 23 and 24 illustrate an example of recurrent neural network (RNN) training in log quantized neural network, in accordance with an example implementation.
Figure 24:
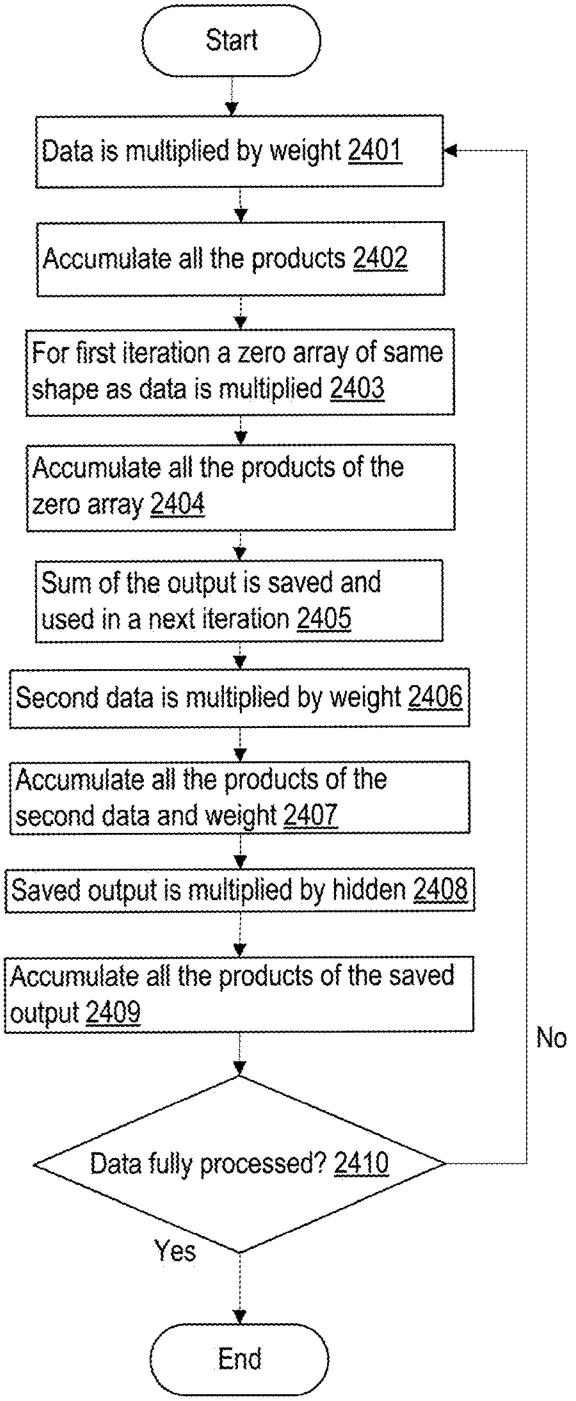

FIGS. 23 and 24 illustrate an example of recurrent neural network (RNN) forward pass, in accordance with an example implementation. Specifically, FIG. 23 and FIG. 24 illustrate an example of the RNN forward pass. At 2401, the flow multiplies a first data from FIG. 23 and Weight (2×2). At 2402, the flow accumulates all of the products of the first data and Weight. At 2403, for the first iteration, the flow multiplies a zero array having the same shape as the data by Hidden (2×2). At 2404, the flow accumulates all the products of the zero array and Hidden. At 2405, the flow saves the sum of the output from 2402 and 2404 and will be used in the next or a subsequent iteration. At 2406, the flow multiplies a second data from FIG. 23 by Weight (2×2). At 2407, the flow accumulates all the products of the second data and Weight. At 2408, the flow multiplies the output from 2407 by Hidden (2×2). At 2409, the flow accumulates all the products of the saved output and Hidden. At 2410, the flow repeats until data is fully processed.

Figure 25:
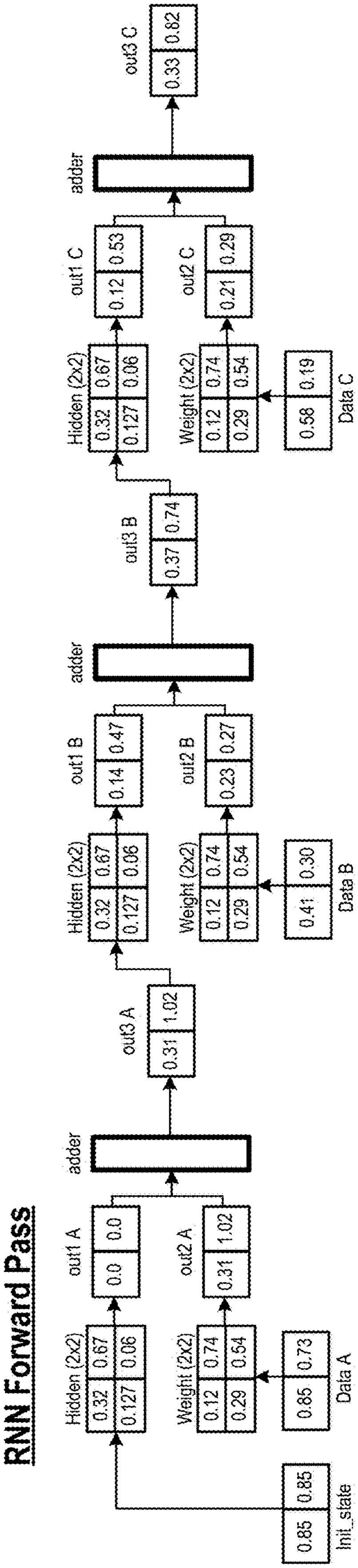
FIGS. 25 and 26 illustrate an example of RNN forward pass, in accordance with an example implementation.
Figure 26:
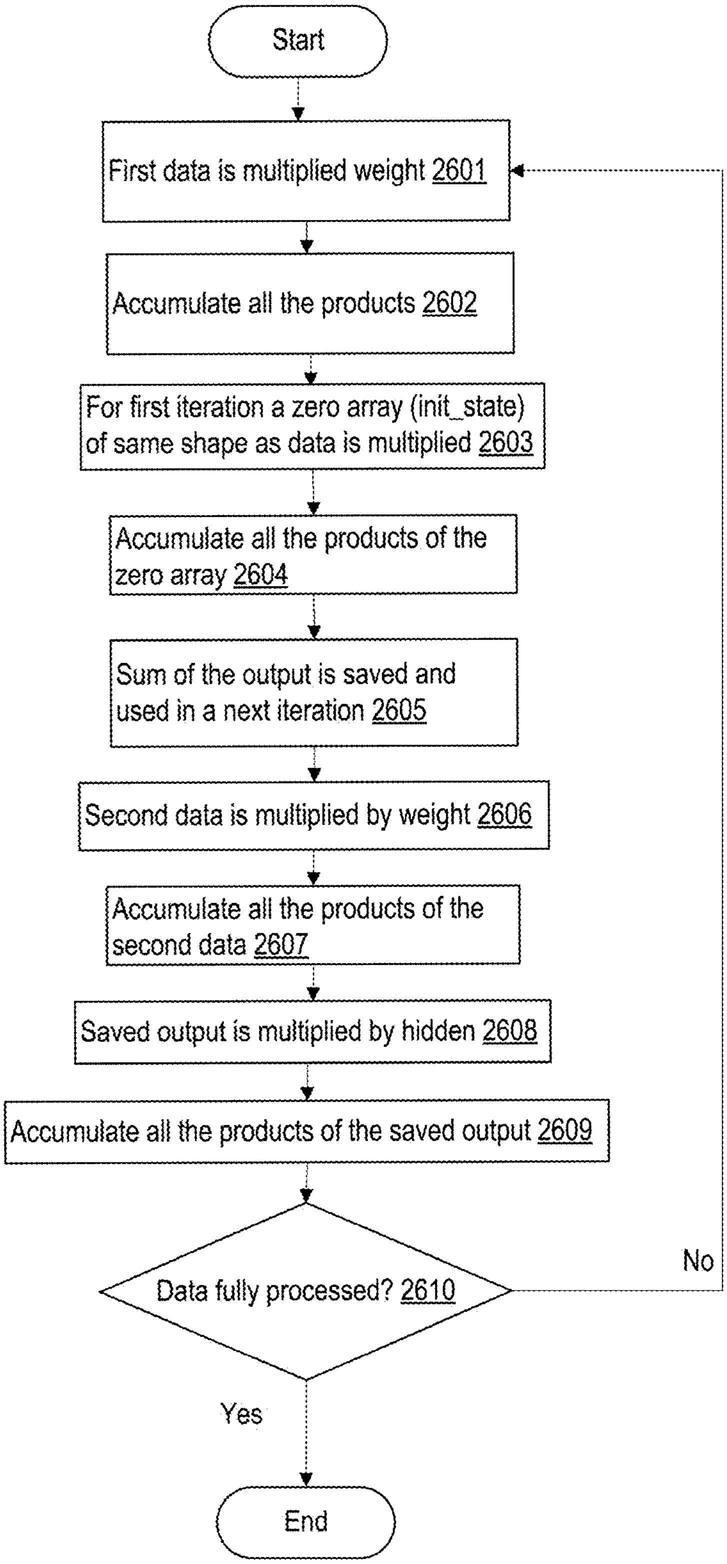

FIGS. 25 and 26 illustrate another example of RNN forward pass, in accordance with an example implementation. Specifically, FIG. 25 and FIG. 26 illustrate an example of the RNN forward pass. At 2601, the flow multiplies a first data from FIG. 25 by Weight (2×2). At 2602, the flow accumulates all of the products of the first data and the weight. At 2603, for the first iteration, the flow multiplies a zero array (init_state) having the same shape as the data (1×2) by Hidden (2×2). At 2604, the flow accumulates all the products of the zero array and Hidden (2×2). At 2605, the flow saves the sum of the output from 2602 and 2604 and will be used in the next or a subsequent iteration. At 2606, the flow multiplies a second data from FIG. 25 by Weight (2×2). At 2607, the flow accumulates all the products of the second data and Weight (2×2). At 2608, the flow multiplies the output from 2607 by Hidden (2×2). At 2609, the flow accumulates all the products of the saved output and Hidden (2×2). At 2610, the flow repeats until data is fully processed.

Figure 27:
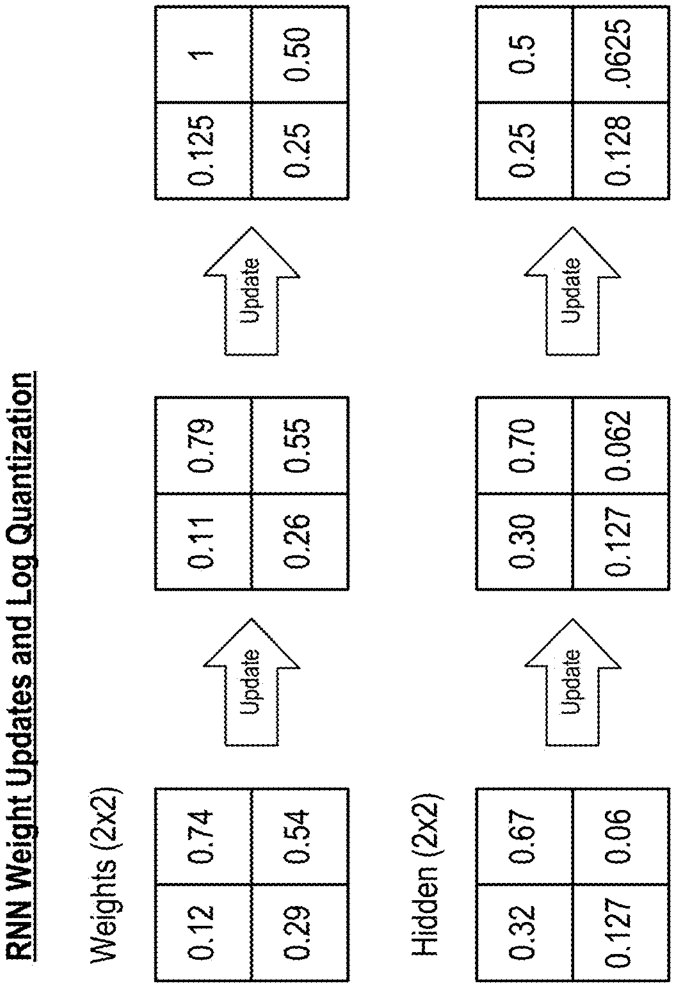
FIGS. 27 and 28 illustrate an example process for training RNN in log quantized neural network, in accordance with an example implementation.
Figure 28:
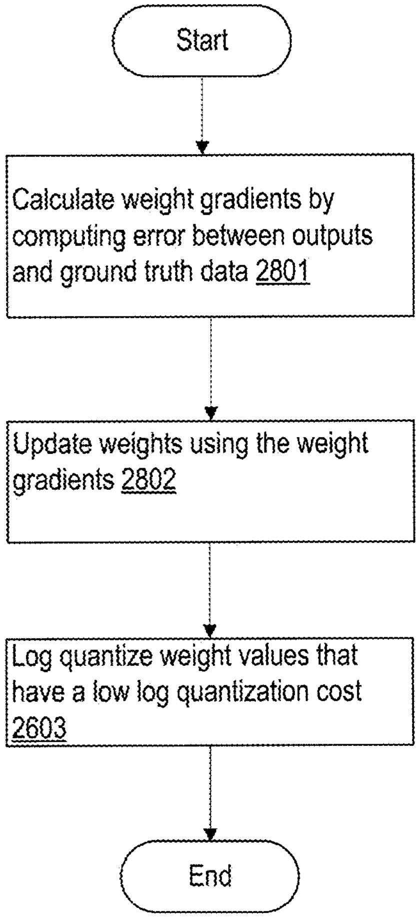

FIGS. 27 and 28 illustrate an example of RNN weight update and log quantization, in accordance with an example implementation. Specifically, FIG. 27 illustrates an example of the RNN weight update and quantization, and FIG. 28 illustrates an example flow of the RNN weight update and quantization. At 2801, the flow calculates weight gradients by computing errors between outputs and ground truth data. In some instances, the Weight (2×2) and the Hidden (2×2) may both be dense layers. At 2802, the flow updates the weights using the weight gradients based on a predefined or preconfigured update algorithm. At 2803, the flow log quantizes weight values that have a low log quantization cost (e.g., within a threshold). Weights that have a high quantization loss (e.g., exceed the threshold) are not quantized and left for a future or subsequent iteration.

Figure 30:
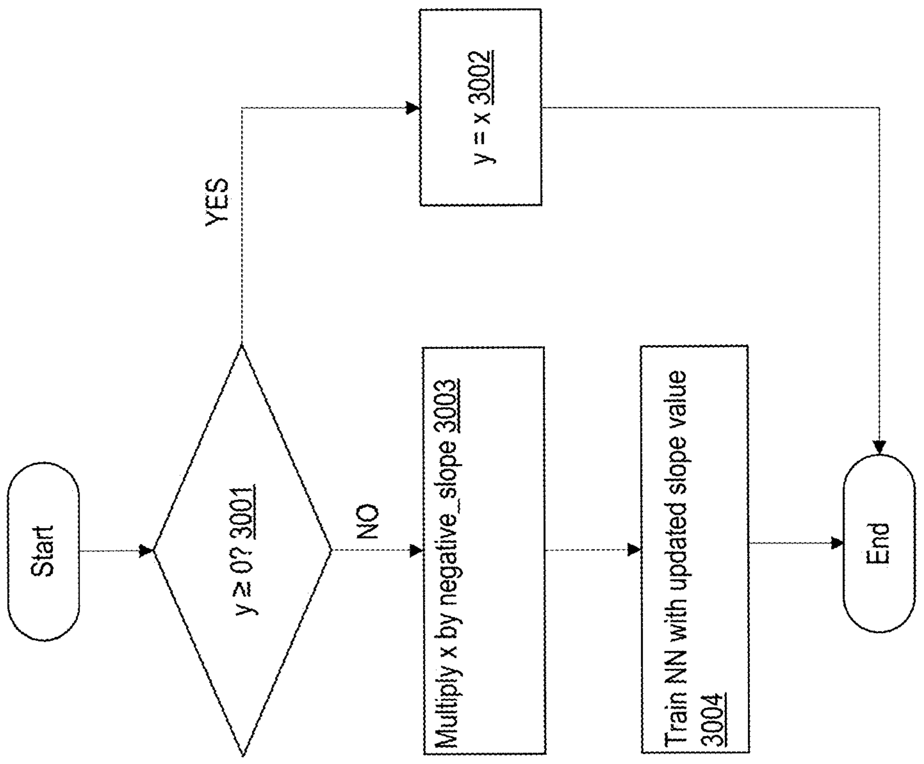

FIGS. 29 and 30 illustrate an example of training LeakyReLU, in accordance with an example implementation. Specifically, FIG. 29 illustrates an example of the LeakyReLU training, and FIG. 30 illustrates an example flow of the LeakyReLU training. LeakyReLU may apply an elementwise function that corresponds to the following: LeakyReLU(x)=max(0,x)+negative_slope*min(0,x), where LeakyReLU(x)=x if x>0; or LeakyReLU(x)=negative_slope*x otherwise. At 3001, the flow determines if y is greater than or equal to zero (0). At 3002, in response to a determination by the flow that y is greater than or equal to zero (0), y is set to the value of x, and the training process is complete. At 3003, in response to a determination by the flow that y is not greater than or equal to zero (0), x is multiplied by the negative slope. In typical neural network operations, the negative slope is set to 0.3, by default. In NN2.0 the negative slope is set to 0.25 or 2-2 by log quantizing the value of 0.3. At 3004, the flow trains the NN with the updated slope value. The NN is trained with the updated slope value because the axon value may change for other layers during the training.

Figure 31:
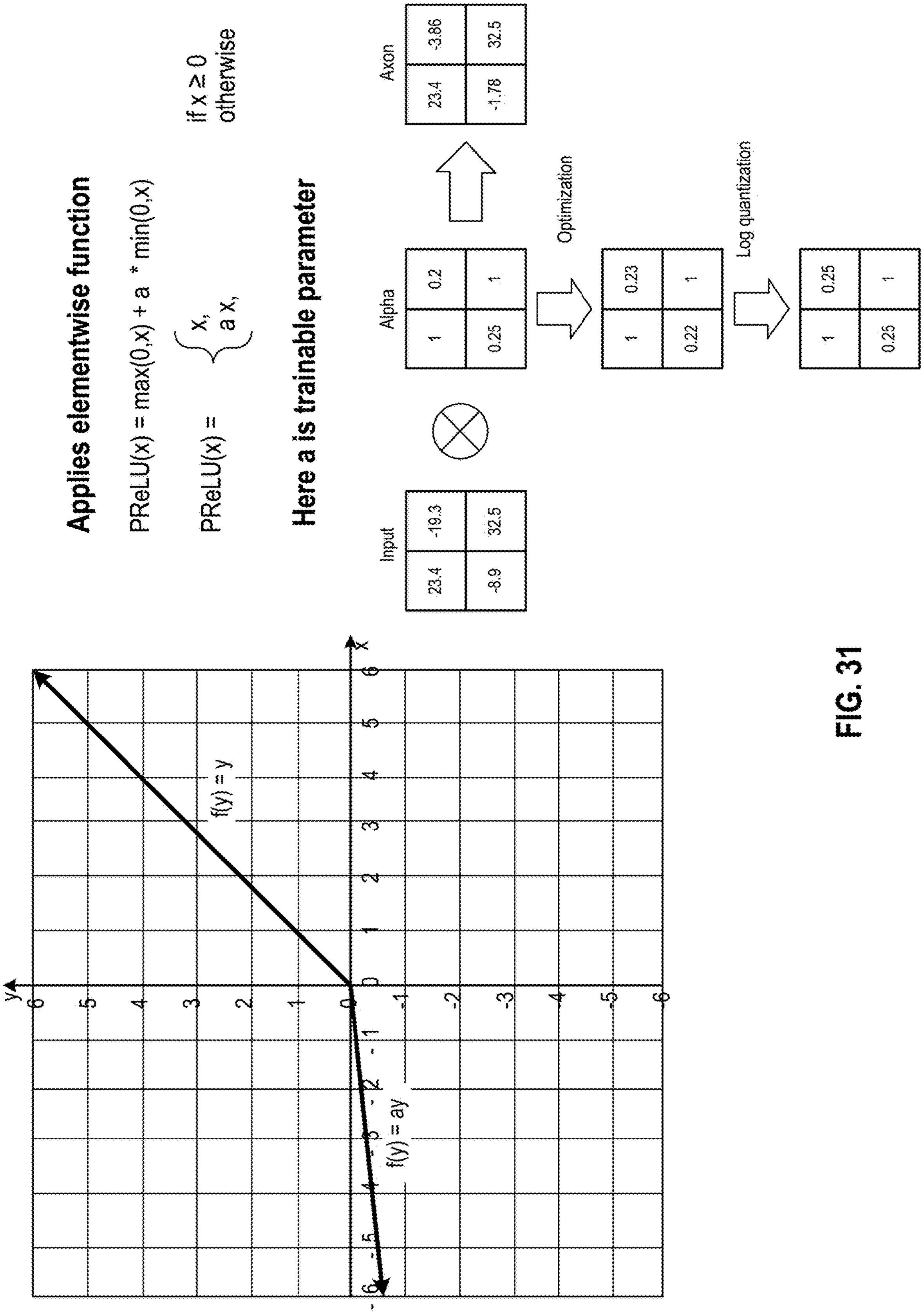
FIGS. 31 and 32 illustrate an example of training Parametric ReLU (PRELU) in log quantized neural network, in accordance with an example implementation.
Figure 32:
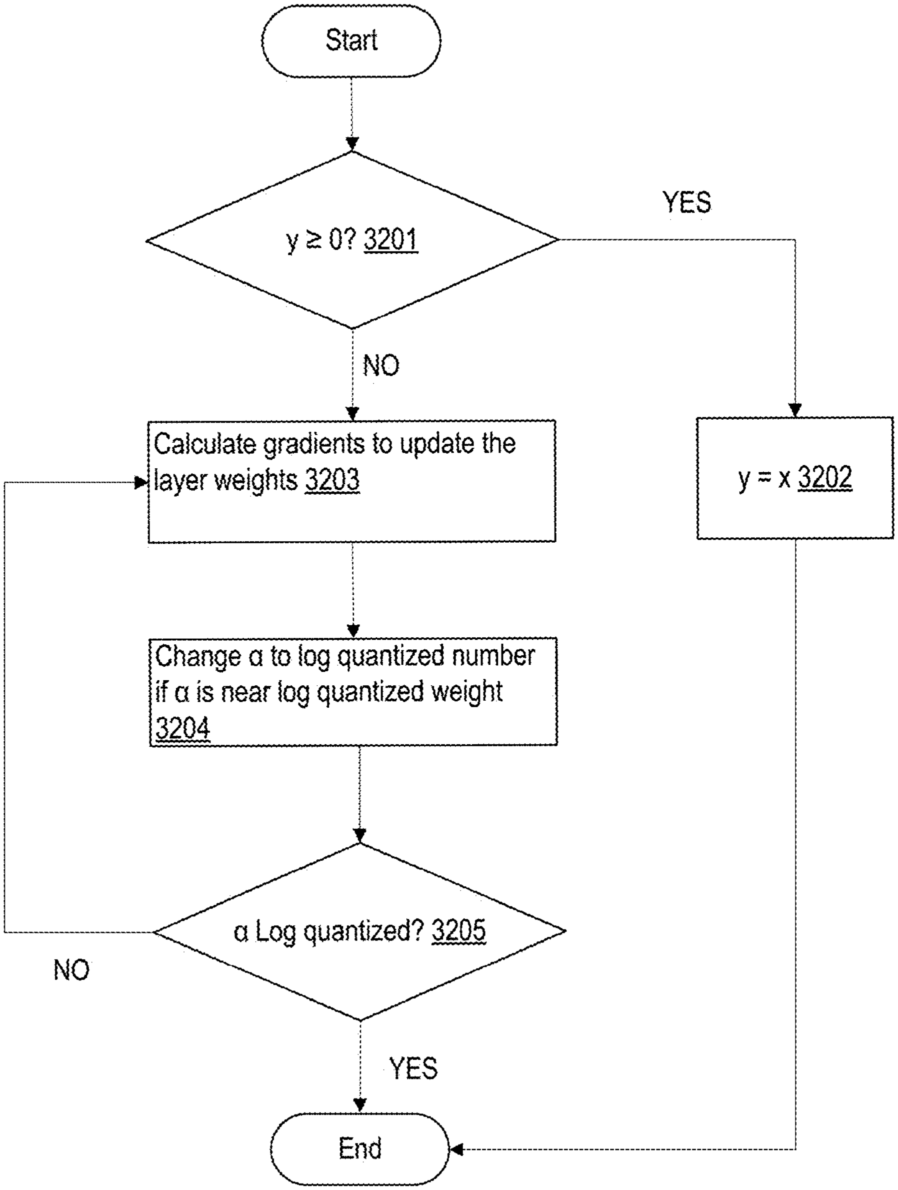

FIGS. 31 and 32 illustrate an example of training Parametric ReLU (PRELU), in accordance with an example implementation. Specifically, FIG. 31 illustrates an example of the PReLU training, and FIG. 32 illustrates an example flow of the PRELU training. PRELU training may apply an elementwise function that corresponds to the following: PRELU(x)=max(0,x)+a*min(0,x), where PReLU(x)=x if x>0; or PRELU(x)=a*x otherwise. In such instances, a is a trainable parameter. At 3201, the flow determines if y is greater than or equal to zero (0). At 3202, in response to a determination by the flow that y is greater than or equal to zero (0), y is set to the value of x, and the PRELU training process is complete. At 3203, in response to a determination by the flow that y is not greater than or equal to zero (0), x is multiplied by a in order to calculate the gradients to update the layer weights. At 3204, if a is near a log quantized weight (e.g., within a threshold), the flow changes the a to a log quantized number. At 3205, if the a is not log quantized at 3204, then the process of 3203 and 3204 repeats until a is log quantized.

Figure 33:
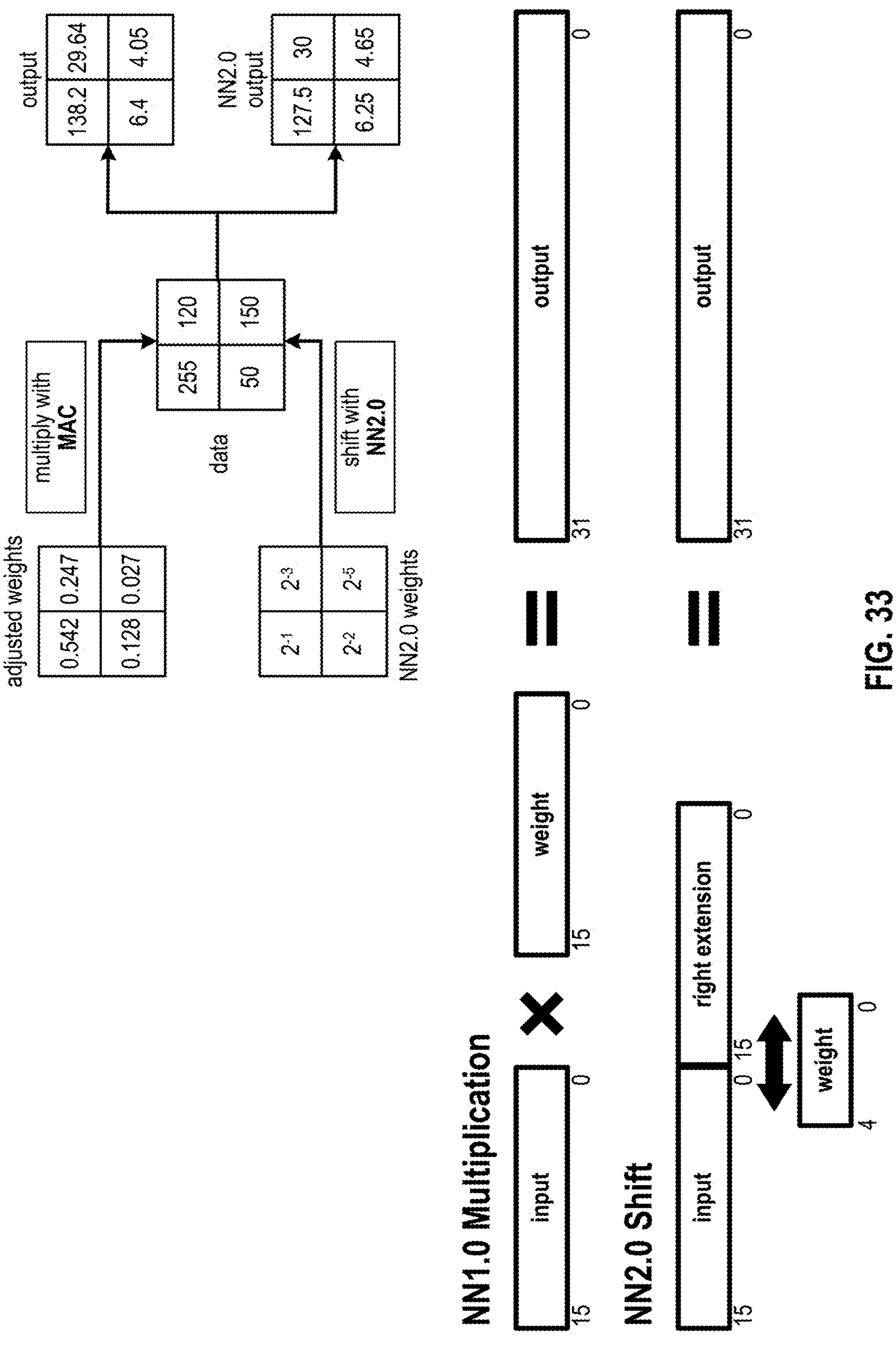
FIG. 33 illustrates an example of difference between a normal neural net inference operation (NN1.0) and a log quantized neural network (NN2.0) inference operation.

FIG. 33 illustrates an example of difference between a normal neural net operation (NN1.0) and a NN2.0 operation. Once a neural network is trained, learned, or optimized, inference data (arbitrary data) may be applied to the trained neural network to obtain output values. The output values are interpreted based on rules that are set for the neural network. For example, in NN1.0, the data may be multiplied with the weights to produce an output. In NN2.0, the data may be shifted based on the NN2.0 log quantized weights to produce the resulting output for the neural network operation.

Figure 34:
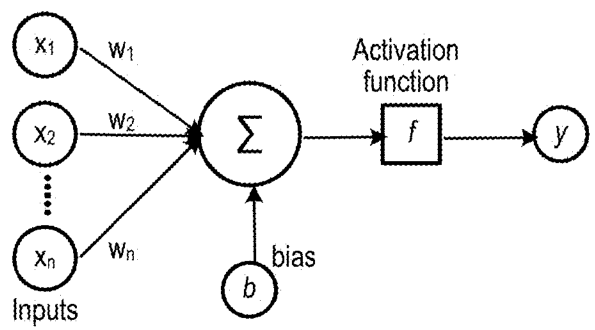
FIG. 34 illustrates an example of scaling input data and bias data for log quantized neural network inference, in accordance with an example implementation.

When using shift operations in NN2.0, an issue that may arise is that information (digits in layer axons) may be lost in right shift operations. For example, suppose the input to a dense layer is 4 (0100—in binary) and the weight is 2-5, meaning that the input (4=0100) is to be shifted to the right by 5, which produces the result of 0, instead of the normal 0.125 by multiplication. This may lead to a loss of information due to the right shift in NN2.0. This issue may be accounted for by scaling up (left shifting) all the input data by a factor that leaves enough space to sufficiently apply all the right shift operations. The exact factor value may depend on individual neural networks and/or the datasets used in conjunction with the neural networks. For example, a factor 22+ may be used. However, the disclosure is not intended to be limited to the factor $2^{24}$, such that other factor values may be used. the biases of each layer should be scaled (left shifted) by the same factor that is used for the input data, in order to maintain consistency with the scaled inputs, for example, as shown in FIG. 34.

Figure 35:
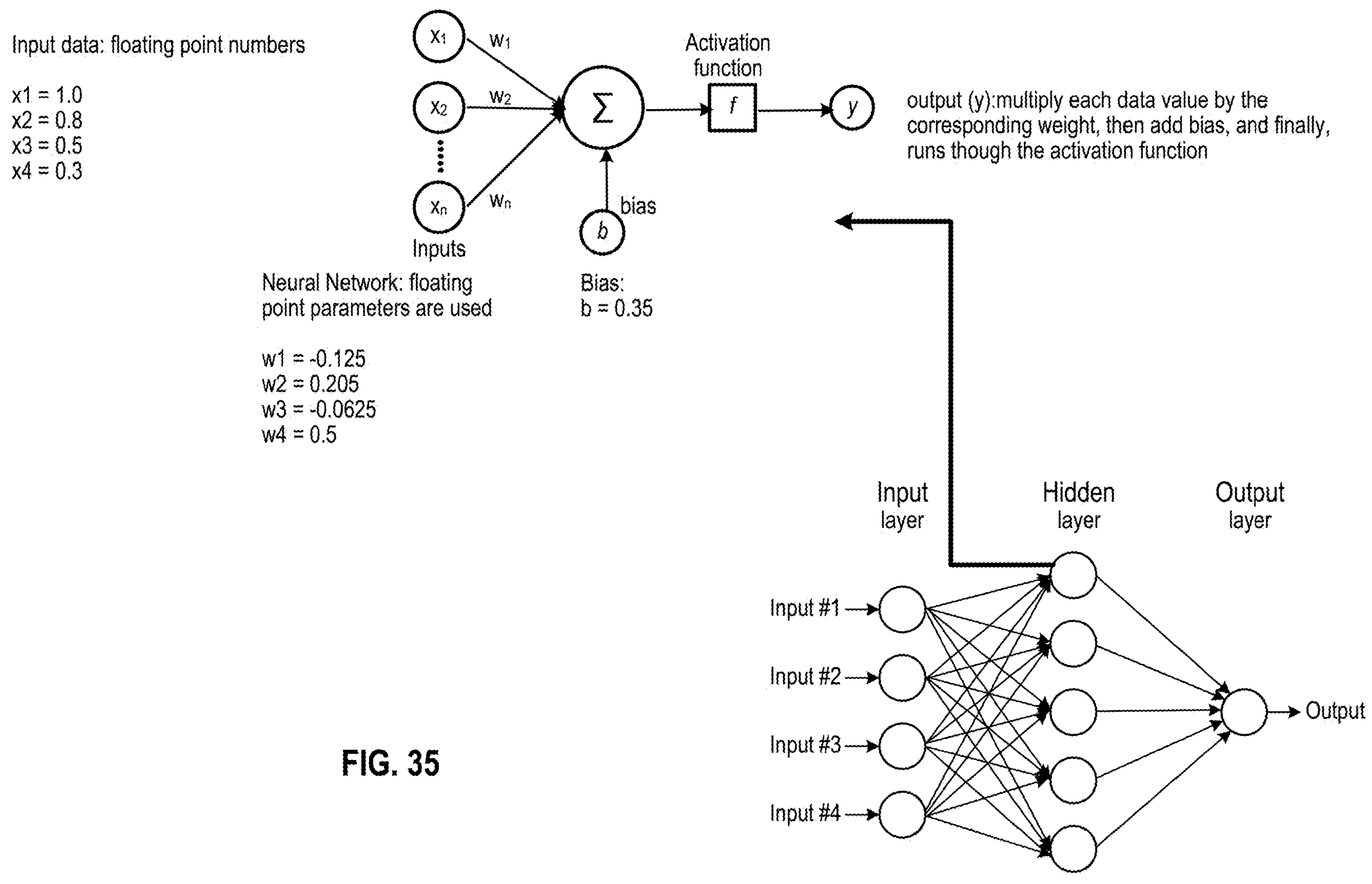
FIGS. 35 and 36 illustrate an example of an inference of a fully connected neural network in a normal neural network, in accordance with an example implementation.
Figure 36:
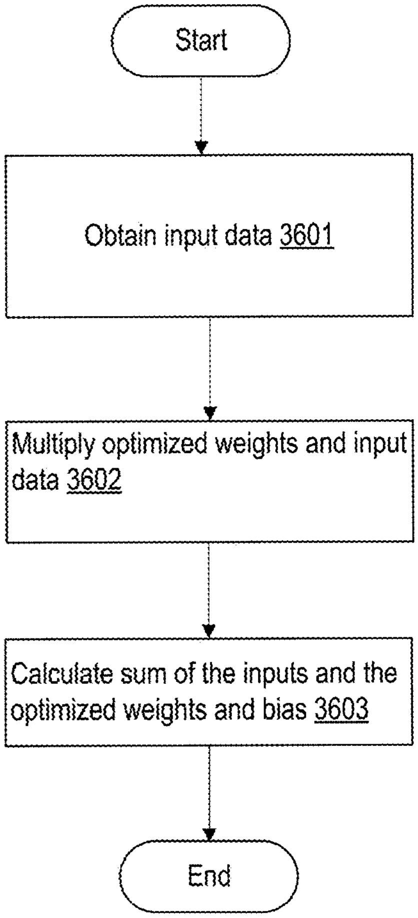

FIGS. 35 and 36 illustrate an example of an inference of a fully connected neural network having dense layers in a normal neural network, in accordance with an example implementation. Specifically, FIG. 35 illustrates an example of the fully connected neural network (e.g., NN1.0) having the dense layers, and FIG. 36 illustrates an example flow of the fully connected neural network having the dense layers. The neural network of FIG. 35 includes an input layer, a hidden layer, and an output layer. The input layer may comprise a plurality of inputs that are fed into the hidden layer. At 3601, the flow obtains the input data. The input data that is fed into the hidden layers comprising floating point numbers. At 3602, the flow multiplies the input data with the optimized weights. At 3603, the flow calculates the sum of the input data multiplied by the corresponding optimized weights and a bias to generate an output.

Figure 37:
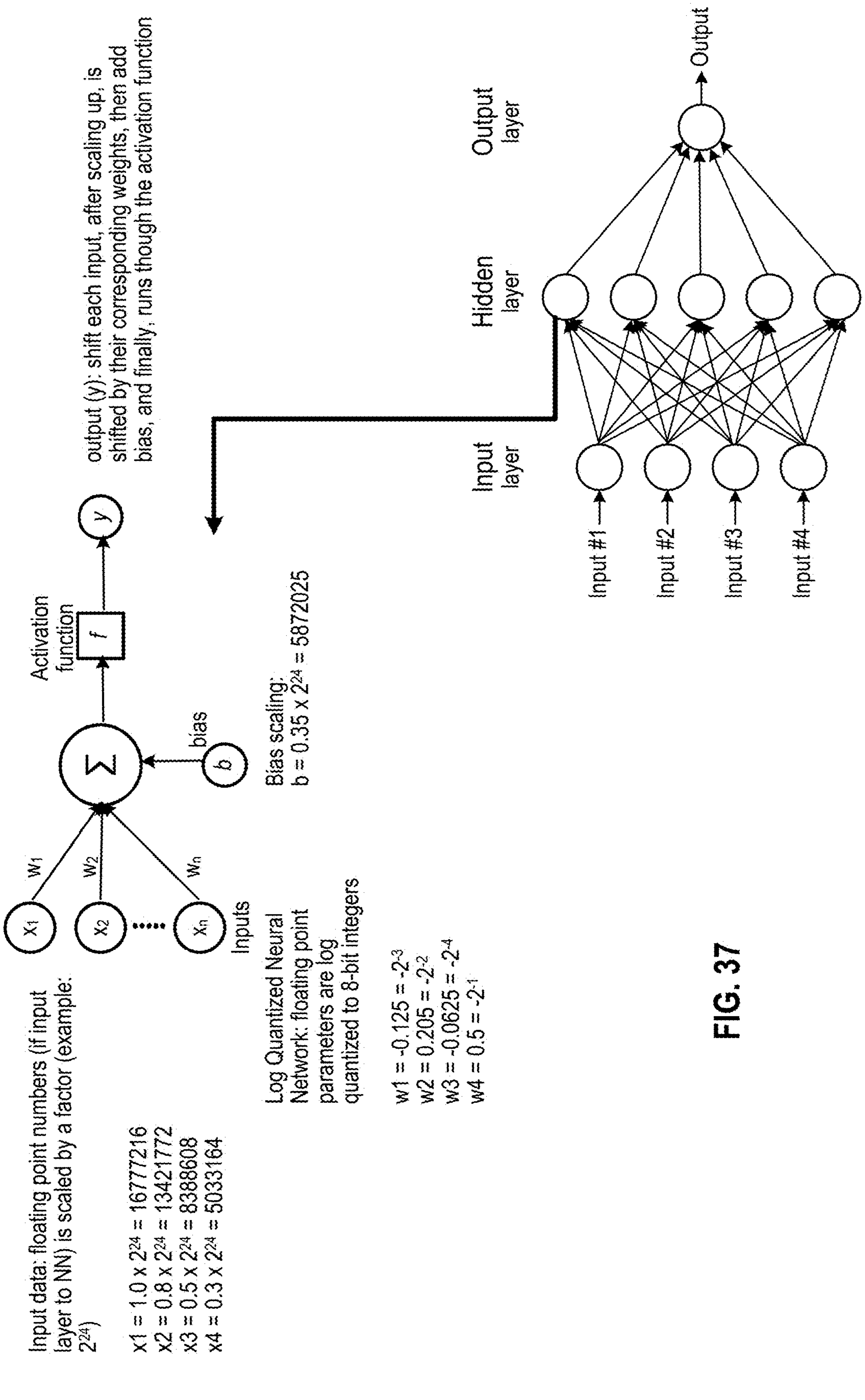
FIGS. 37 and 38 illustrate an example of an inference operation of a fully connected dense layers in a log-quantized neural network, NN2.0, in accordance with an example implementation.
Figure 38:
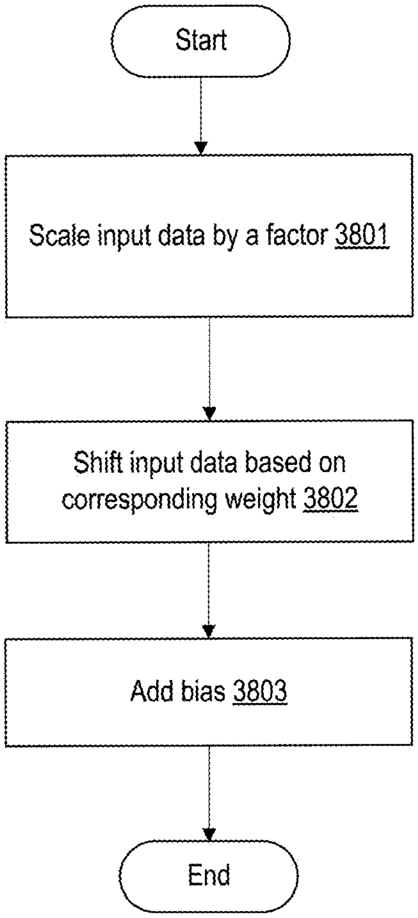

FIGS. 37 and 38 illustrate an example of an inference of a fully connected dense layers in a log-quantized neural network, NN2.0, in accordance with an example implementation. Specifically, FIG. 37 illustrates an example of the fully connected NN2.0 having the dense layers, and FIG. 38 illustrates an example flow of the fully connected NN2.0 having the dense layers. The NN2.0 of FIG. 37 includes an input layer, a hidden layer, and an output layer. The input layer may comprise a plurality of inputs that are fed into the hidden layer. At 3801, the flow scales the input data. The input data comprises floating point numbers that have been scaled by a factor. For example, the floating point numbers may be scaled by a factor of $2^{24}$. The disclosure is not intended to be limited to the example scale factor disclosed herein, such that different values of the scale factor may be used. At 3802, the flow shifts the input data based on the shift instruction derived from the corresponding log-quantized weights. The weights may comprise 7-bit data derived from log quantizing the parameters. At 3803, the flow adds the bias. The bias is scaled by the same factor used for scaling the input data.

Figure 39:
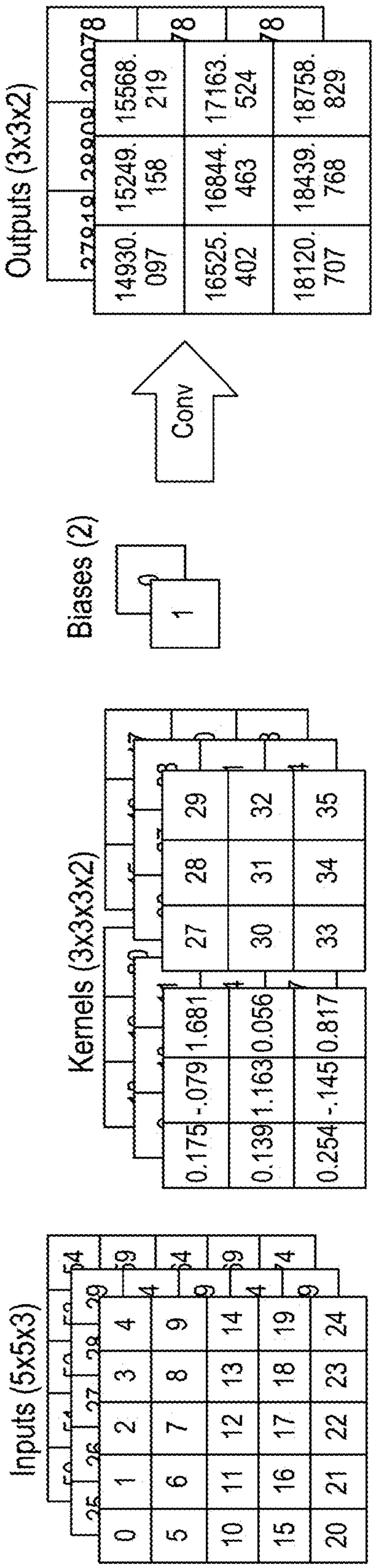
FIGS. 39 and 40 illustrate an example of an inference operation of convolution layer in a normal neural network, in accordance with an example implementation.
Figure 40:
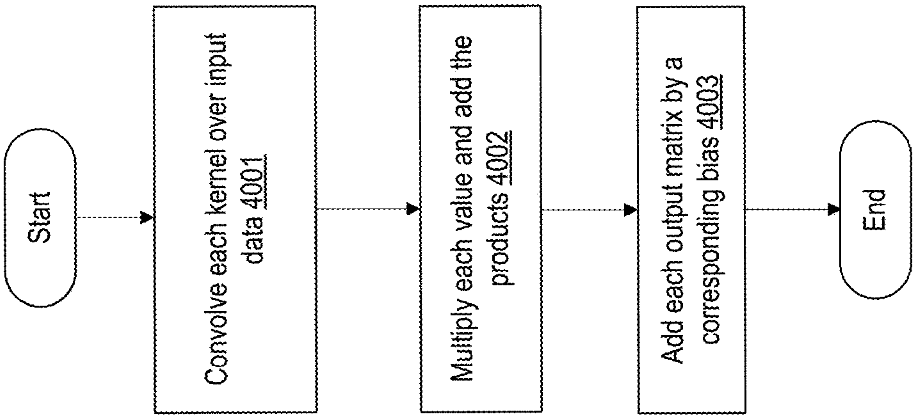

FIGS. 39 and 40 illustrate an example of a convolution inference operation in a normal neural network, in accordance with an example implementation. Specifically, FIG. 39 illustrates an example of a convolution inference operation for a convolution layer, and FIG. 40 illustrates an example flow of the convolution inference operation for the convolution layer. At 4001, the flow convolves each kernel (3×3×3 as shown in FIG. 39) over the input data. At 4002, the flow multiplies each value and accumulates or adds the products. In the example of FIG. 39, one output matrix (3×3) may be generated for each kernel. At 4003, the flow adds each output matrix by a corresponding bias. Each kernel may have a different bias, which is broadcasted over the kernel's entire output matrix (3×3 in FIG. 39).

Figure 41:
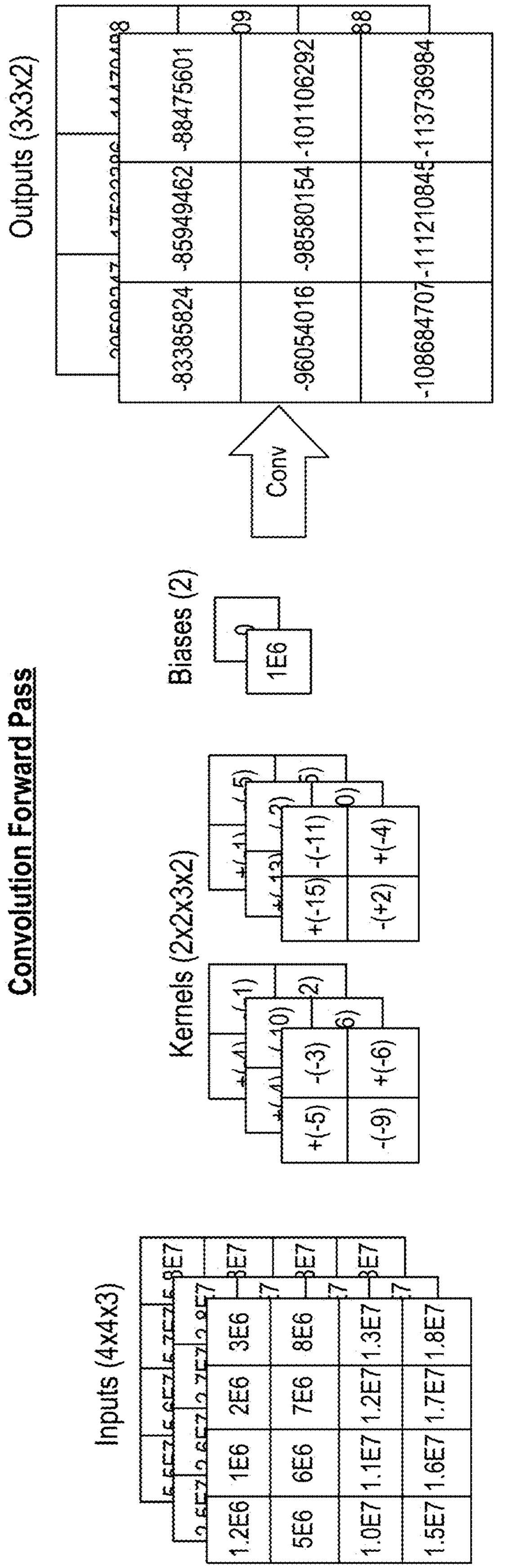
FIGS. 41 and 42 illustrate an example of an inference operation of convolution layer in a quantized neural network (NN2.0), in accordance with an example implementation.
Figure 42:
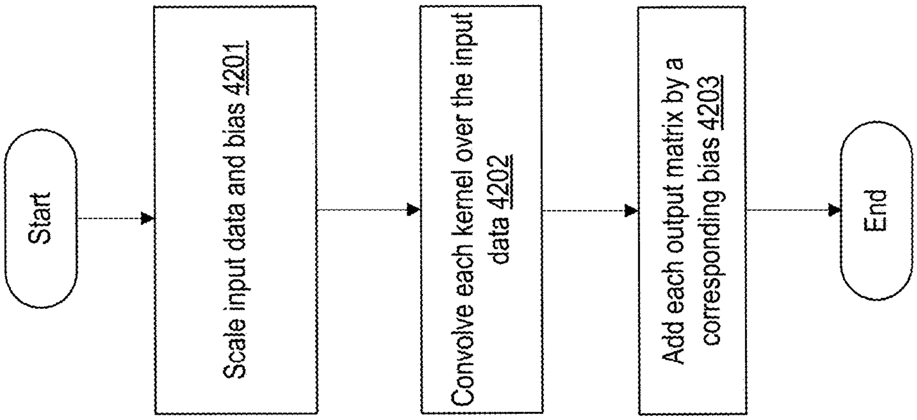

FIGS. 41 and 42 illustrate an example of a convolution inference operation for NN2.0, in accordance with an example implementation. Specifically, FIG. 41 illustrates an example of a convolution inference operation for a convolution layer for NN2.0, and FIG. 42 illustrates an example flow of the convolution inference for the convolution layer for NN2.0. At 4201, the flow scales each of the input data by a factor and each bias value by the same factor. The flow scales up each of the input data by multiplying the factor (e.g., $2^{24}$) in instances where the layer is the input layer to the NN2.0. If the layer is not the input layer, the input data values are assumed to already be scaled, and the kernel weights are assumed to be trained to log quantized values to use for shifting. At 4202, the flow convolves each kernel (2×2×3 in FIG. 41) over the input data. Element-wise shifting may be used for each value and the results are accumulated. In some aspects, one output matrix (3×3 in FIG. 41) is generated for each kernel. The weight values in the kernels may have the format of (+/− to determine the sign of the weight) (+/−for left/right shift, followed by how much to shift). For example, +(−5) indicates that the sign of the weight is negative, followed by a shift to the right by 5. This is equivalent to multiplying the input value by 2-5. At 4203, the flow adds each output matrix by a corresponding bias. Each kernel may have a respective bias, which may be broadcasted over the kernel's entire output matrix (3×3 in FIG. 41).

With respect to batch normalization inference, the batch normalization may correspond to the following:

$$BN(x) = \gamma\left(\frac{x - \text{mean}}{\sqrt{\text{var} + \epsilon}}\right) + \beta,$$

where γ and β may be trainable parameters, while the mean and the variance are constants and may be set during training. Epsilon (∈) is also a constant that is used for numeric stability and has a small value, such as but not limited to 1E-3. The mean, variance, and epsilon are all broadcasted. The mean and variance have one value per channel (broadcasted across height/width of each channel), while epsilon is one value broadcasted across all dimensions. In some instances, element-wise operations according to the batch normalization equation may be used to calculate the axon using the input data (x).

Figure 44:
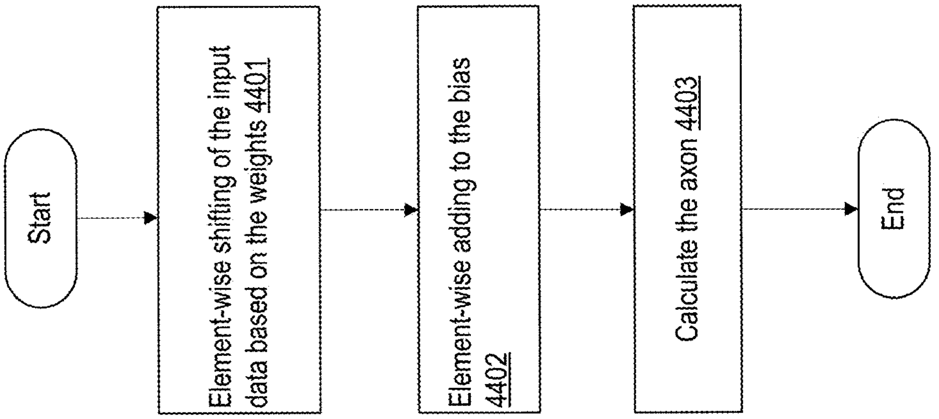

FIGS. 43A, 43B, and 44 illustrate an example of batch normalization inference, in accordance with an example implementation. Specifically, FIG. 43A illustrates batch normalization equations converted for NN2.0, FIG. 43B illustrates a batch normalization inference for NN2.0, and FIG. 44 illustrates an example flow of batch normalization inference for NN2.0. The NN2.0 batch normalization equation is converted as shown in FIG. 43A. The batch normalization for NN2.0 final format is shown as equation 3 in FIG. 43A. In some instances, during training, it may be assumed that W in equation 4 of FIGS. 43A and B in equation 4 of FIG. 43A are optimized, where W is log quantized, and W and B are set and ready for inference.

At 4401, the flow element-wise shifts the input data based on the log quantized weight (w) values, as shown in FIG. 43B. At 4402, the flow element-wise adds the bias. Since this is a batch normalization layer, it is unlikely that it will be the input layer, such that the input data is assumed to be scaled. The bias may also be scaled by the same factor as the input data. At 4403, the flow calculates the axon.

Figure 45:
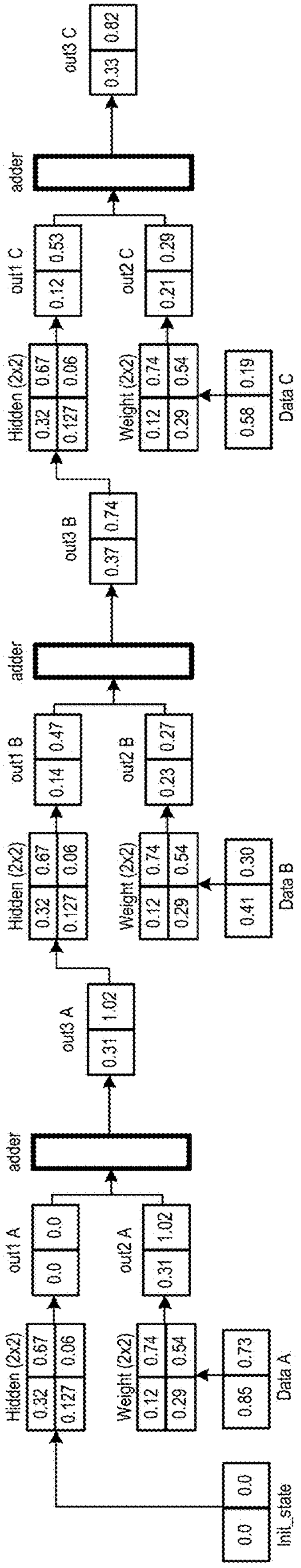
FIGS. 45 and 46 illustrate an example of an inference operation of RNN in a normal neural network, in accordance with an example implementation.
Figure 46:
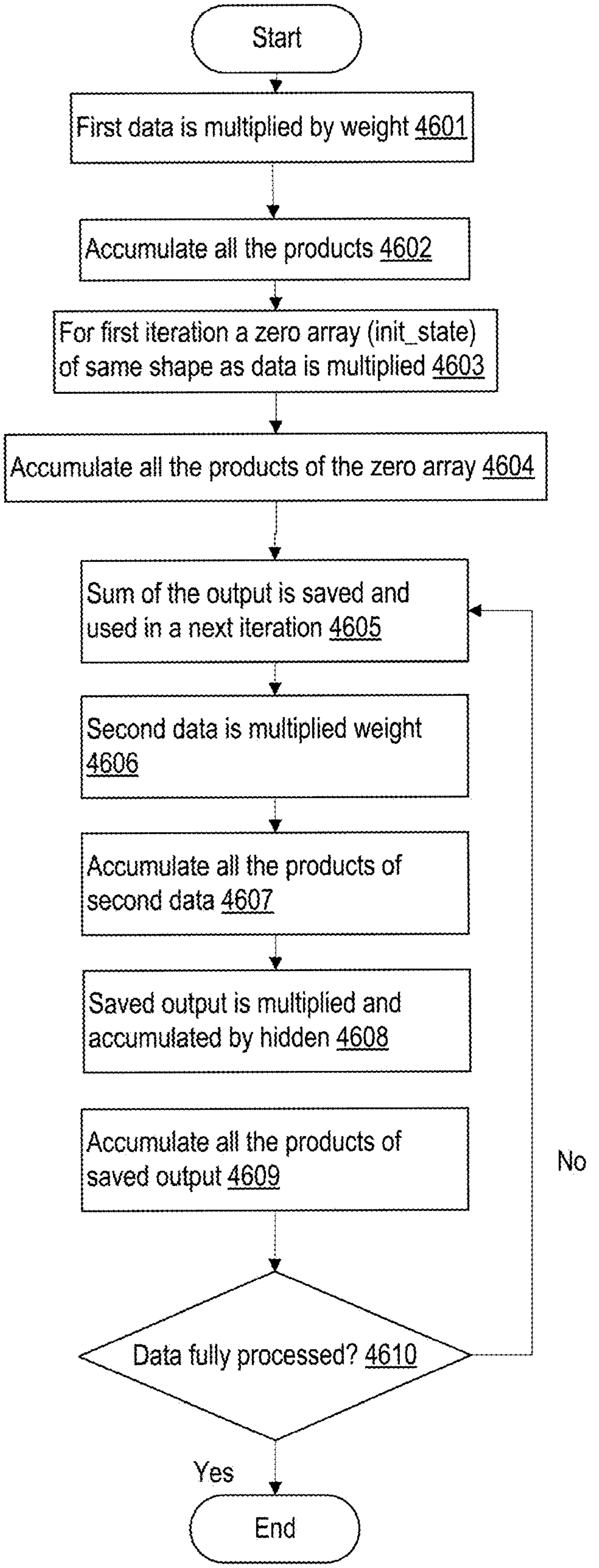

FIGS. 45 and 46 illustrate an example of RNN inference in normal neural network, in accordance with an example implementation. Specifically, FIG. 45 illustrates an example of the RNN inference, and FIG. 46 illustrates an example flow of the RNN inference. At 4601, the flow multiplies a first data from FIG. 45 with Weight (2×2). At 4602, the flow accumulates all the products of the first data and the weights. At 4603, for the first iteration, the flow multiplies a zero array (init_state) having the same shape as the data (1×2) by Hidden (2×2). At 4604, the flow accumulates all the products of the zero array. At 4605, the flow saves the sum of the output from 4602 and 4604 and will be used in the next or a subsequent iteration. At 4606, the flow multiplies a second data from FIG. 45 by Weight (2×2). At 4607, the flow accumulates all the products of the second data and the weight. At 4608, the flow multiplies the output from 4605 by Hidden (2×2). At 4609, the flow accumulates all the products of the saved output. At 4610, if the data is not fully processed at 4609, then the process of 4605 to 4609 repeats until the data is fully processed.

Figure 47:
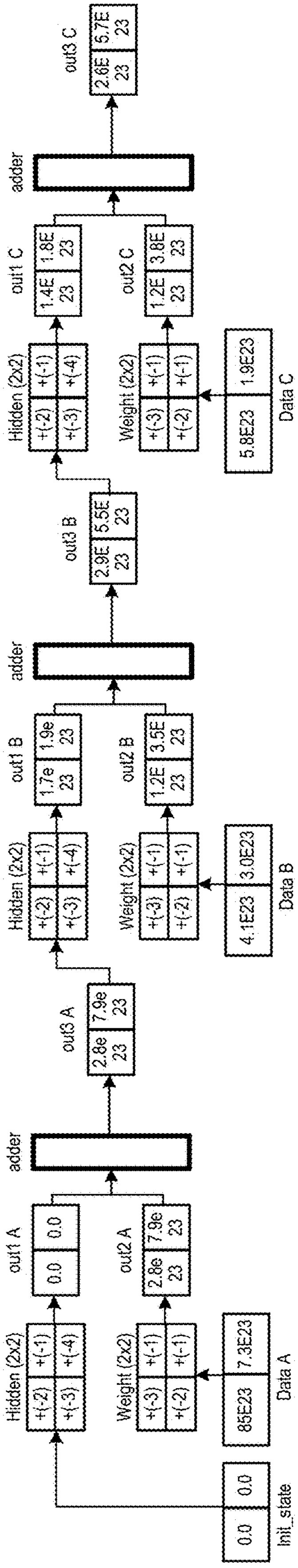
FIGS. 47 and 48 illustrate an example of an inference operation of RNN in a log quantized neural network (NN2.0), in accordance with an example implementation.
Figure 48:
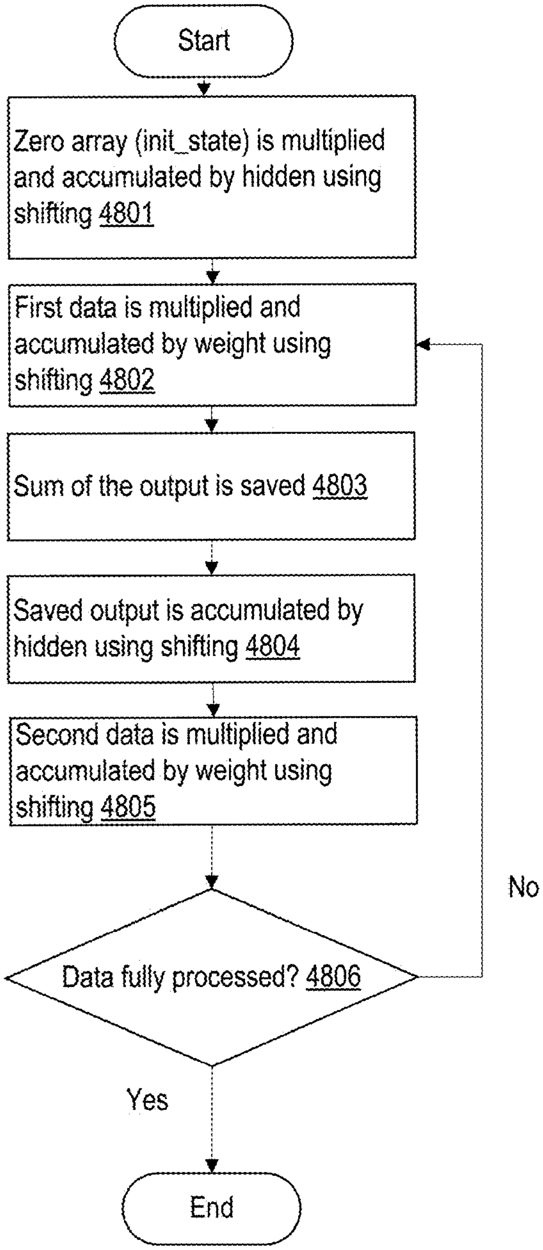

FIGS. 47 and 48 illustrate an example of RNN inference for NN2.0, in accordance with an example implementation. Specifically, FIG. 47 illustrates an example of the RNN inference for NN2.0, and FIG. 48 illustrates an example flow of the RNN inference for NN2.0. At 4801, the flow multiplies and accumulates a zero array (init_state) by hidden (2×2) using shifting. The resulting vector is saved (out1 A) as shown in FIG. 47. At 4802, the flow multiplies and accumulates a first data (data A) by weight (2×2) using shifting. Weight (2×2) and hidden (2×2) are both dense layers. The resulting vector is saved (out2 A) as shown in FIG. 47. At 4803, the flow adds the vector outputs from 4801 and 4802 together. The resulting vector is saved (out3 A) as shown in FIG. 47. At 4804, the flow multiplies and accumulates the vector output from 4803 by hidden (2×2) using shifting. The resulting vector is saved (out1 B) as shown in FIG. 47. At 4805, the flow multiplies and accumulates a second data (data B) by weight (2×2) using shifting. The resulting vector is saved (out2 B) as shown in FIG. 47. At 4806, if the data is not fully processed at 4805, then the process of 4802 to 4805 repeats until the data is fully processed.

In some instances, three types of rectified linear units (relu) activation functions are commonly used, which may include ReLU, LeakyReLU, or Parametric ReLU (PreLU). ReLU may correspond to the following:

$$ReLU(x) = (x)^+ = \max(0, x)$$

LeakyReLU may correspond to the following:

$$LeakyReLU(x) = \max(0, x) + \text{negative\_slope} * \min(0, x), \text{ where}$$

$$LeakyRELU(x) = \begin{cases} x, & \text{if } x \geq 0 \\ \text{negative\_slope} * x, & \text{otherwise} \end{cases}$$

PRELU may correspond to the following:

$$PReLU(x) = \max(0, x) + \alpha * \min(0, x), \text{ where}$$

$$PReLU(x) = \begin{cases} x, & \text{if } x \geq 0 \\ \alpha x, & \text{otherwise} \end{cases}$$

The three functions are configured to take in an input, typically a tensor axon calculated through a layer of a neural network, and apply a function to calculate the output. Each input value in the tensor axon behaves independently based on their value. For example, if the input value is greater than zero (0), then all three functions operate the same, such that output=input. However, if the input value is less than zero (0), then the functions operate in differently.

In the case of ReLU, the output=0 if the input value <0. In the case of LeakyReLU, the output=negative_slope*input, where the negative_slope is set at the beginning of training (typically 0.3) and is fixed throughout training. In the case of PRELU, the output=a*input, where a is trainable and optimized during training. The a has one value per PRELU layer, and is broadcasted across all dimensions. In some instances, such as when there is more than 1 PRELU in the network, each PRELU will have a corresponding a trained and optimized.

Figure 49:
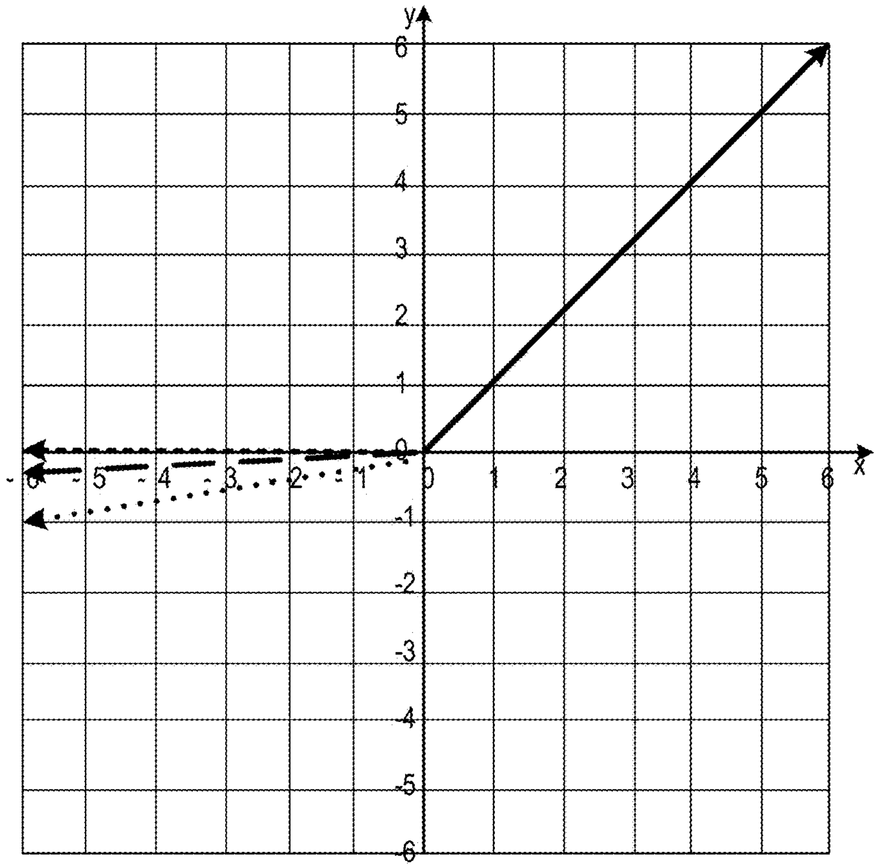
FIG. 49 illustrates an example graph of ReLU, LeakyReLU, and PRELU functions, in accordance with an example implementation.

FIG. 49 illustrates an example graph of all three functions, in accordance with an example implementation. All three activation functions infer the same as their standard inferences if the input value is greater than 0, such that output=input. If the input value is less than zero (0), the NN2.0 ReLU inference may have an output=0, as shown in the short dashed line in FIG. 49. The NN2.0 ReLU inference may be the same as the standard ReLU when the input value is less than zero (0). The NN2.0 LeakyReLU inference for negative input values is modified such that the negative_slope is log quantized (having a default of $0.25=2^{-2}$, as shown as the long dashed line in FIG. 49). Log quantizing is done to utilize shifting (instead of multiplication) to calculate the outputs. The negative_slope value is set before training starts and trainable parameters in other layers are trained and optimized accordingly. The NN2.0 PRELU inference for negative input values is also different in that the trainable parameter ($\alpha=0.5=2^{-1}$, as shown as the dotted line in FIG. 49) is log quantized during training, which allows shifting to be utilized to calculate the output values.

Figure 50:
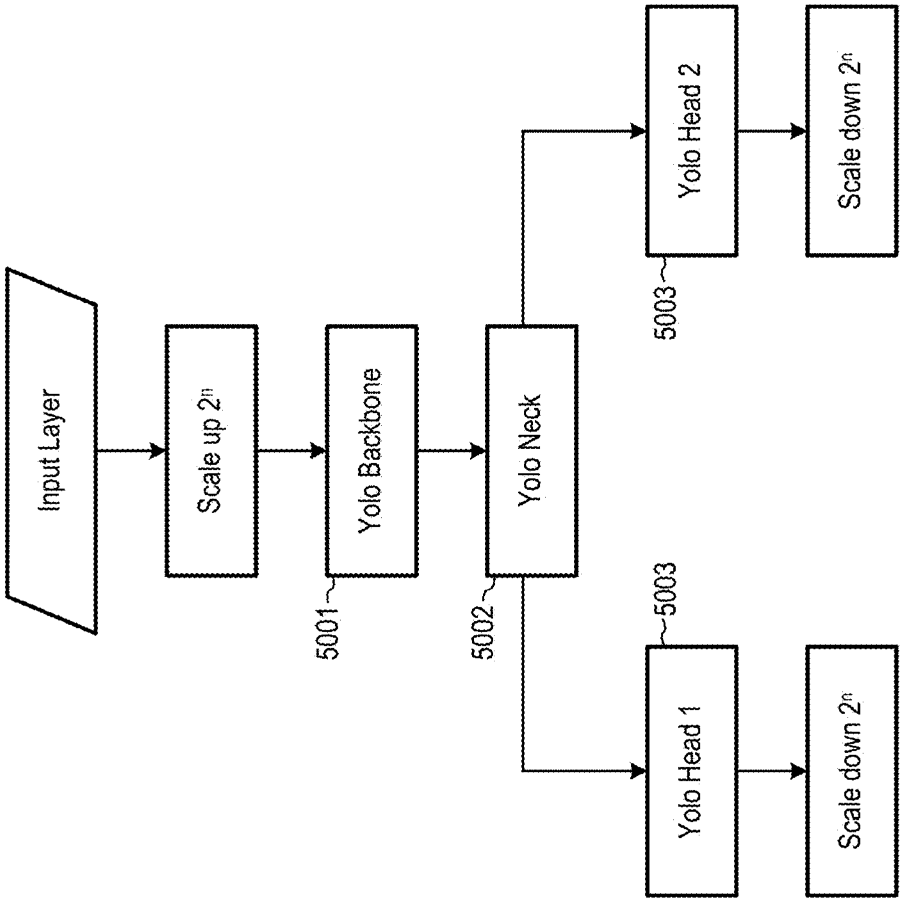
FIGS. 50 and 51 illustrate an example of transforming an object detection model into a log-quantized NN2.0 object detection model, in accordance with an example implementation.
Figure 51:
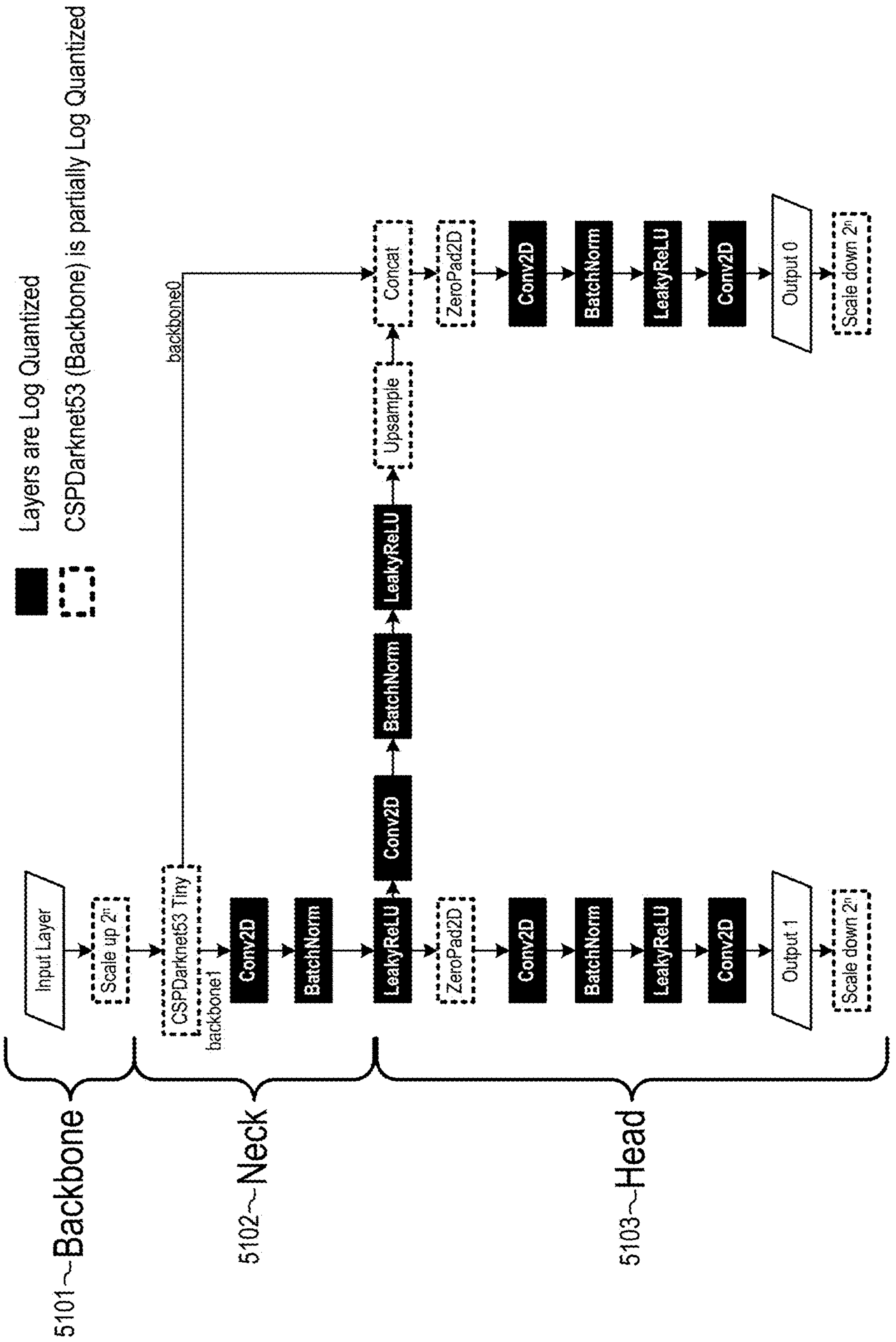

FIG. 50 & FIG. 51 illustrate an example of how to transform an object detection model such as YOLO into a log-quantized NN2.0 model, in accordance with an example implementation. Typical YOLO architecture may include a backbone 5001, a neck 5002, and a head 5003. The backbone may include CSPDarknet53 Tiny, while the neck and head comprise convolution blocks. An input layer may be scaled by a factor $2^n$ (e.g., $2^{24}$) for shifting purposes. Biases for the convolution and batch normalization layers may also be scaled by the same factor $2^n$ (e.g., $2^{24}$) used for scaling the input layer. The outputs may be scaled down by the same factor $2^{24}$ used to scale the input layer and the biases for the convolution and batch normalization layers.

FIG. 51 illustrates an example of what operations/layers of YOLO to log-quantize to transform the model into a NN2.0 model. The input to the backbone 5101 is scaled by a factor of $2^n$ for shifting purposes. For example, the factor may be $2^{24}$, but the disclosure is not intended to be limited to the example of $2^{24}$, such that the factor may be different values. The backbone 5101, neck 5102, and/or head 5103 may include a plurality of layers (e.g., neural network layers) that process the data. For example, some of the layers may include convolution layers, batch normalization layers, or LeakyReLU layers. The operations/layers that utilize multiplication and/or addition such as convolution layers, batch normalization layers, and LeakyReLU layers are log quantized to make the model into a NN2.0 model. The other layers within the backbone, neck, and/or head are not log quantized because such other layers do not utilize multiplication and/or addition operations. For example, some of the other layers may include concatenate, upsample, or zero padding layers do not involve multiplication to perform their respective operations, such that concatenate, upsample, or zero padding layers are not log quantized. However, in some instances, other layers that do not use multiplication and/or addition operations may be log quantized. Layers that utilize multiplication and/or addition operations, such as but not limited to convolution layers, dense layers, RNN, batch normalization, or Leaky ReLU are typically log quantized to make the model into a NN2.0 model. The outputs of the head may be scaled down by the same factor used to scale the input to generate the same output values as the normal model. For example, the outputs of the head may be scaled down by the factor of $2^{24}$.

Figure 52B:
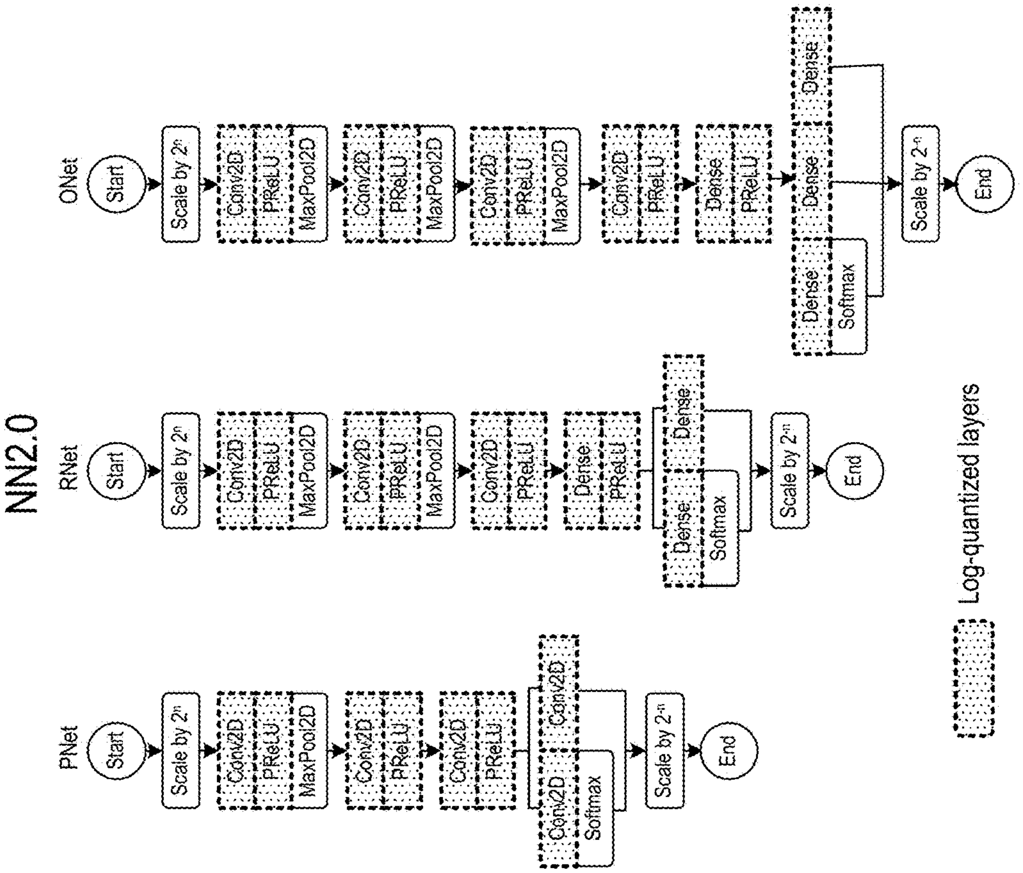
FIGS. 52A and 52B illustrate examples of transforming a face detection model into a log-quantized NN2.0 face detection model, in accordance with an example implementation.
Figure 52A:
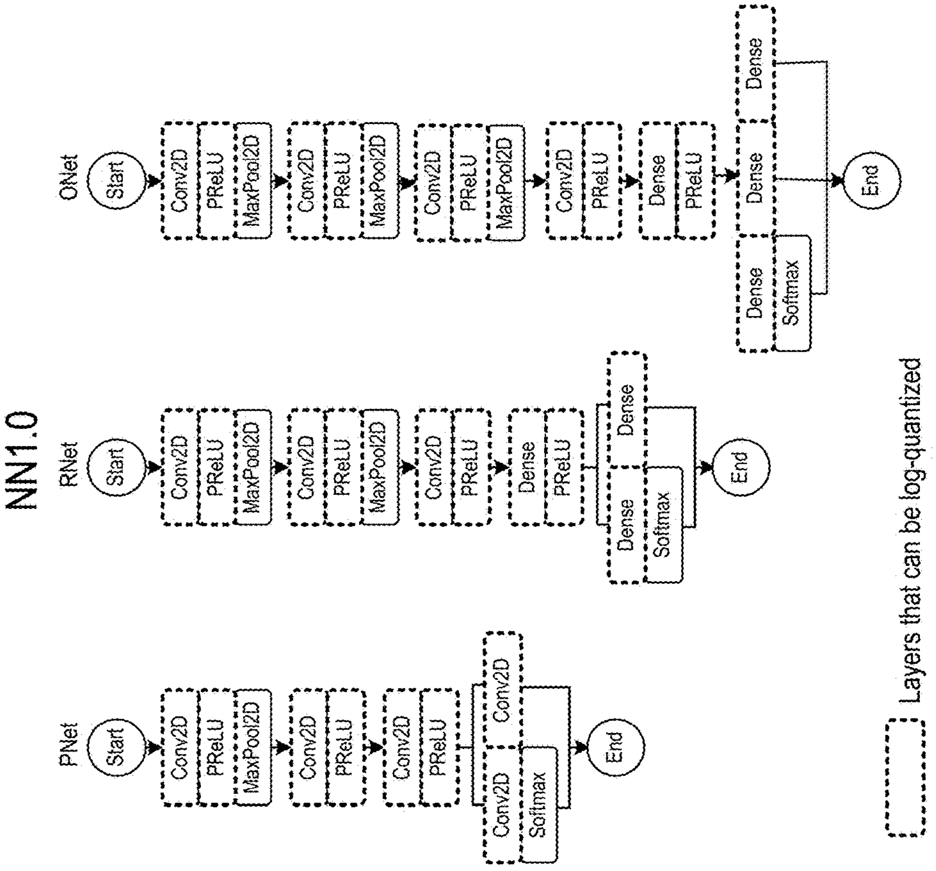

FIGS. 52A and 52B illustrate examples of how to transform a face detection model such as MTCNN into a log-quantized NN2.0 model, in accordance with an example implementation. Specifically, FIG. 52A illustrates a typical architecture of MTCNN model, while FIG. 52B illustrates layers of MTCNN model that are log-quantized to transform the model into a NN2.0 model. FIG. 52A includes examples architectures of PNet, RNet, and ONet and identifies the layers within each architecture that can be log-quantized. For example, the convolution layers and PRELU layers of PNet in FIG. 52A can be log-quantized, while the convolution layers, the PRELU layers, and the dense layers of RNet and ONet in FIG. 52A can be log-quantized. With reference to FIG. 52B, the architecture of PNet, RNet, and ONet under NN2.0 include the scaling layers for the input and output, as well as the log-quantized layers to transform the model in FIG. 52A into a NN2.0 model.

Figure 53B:
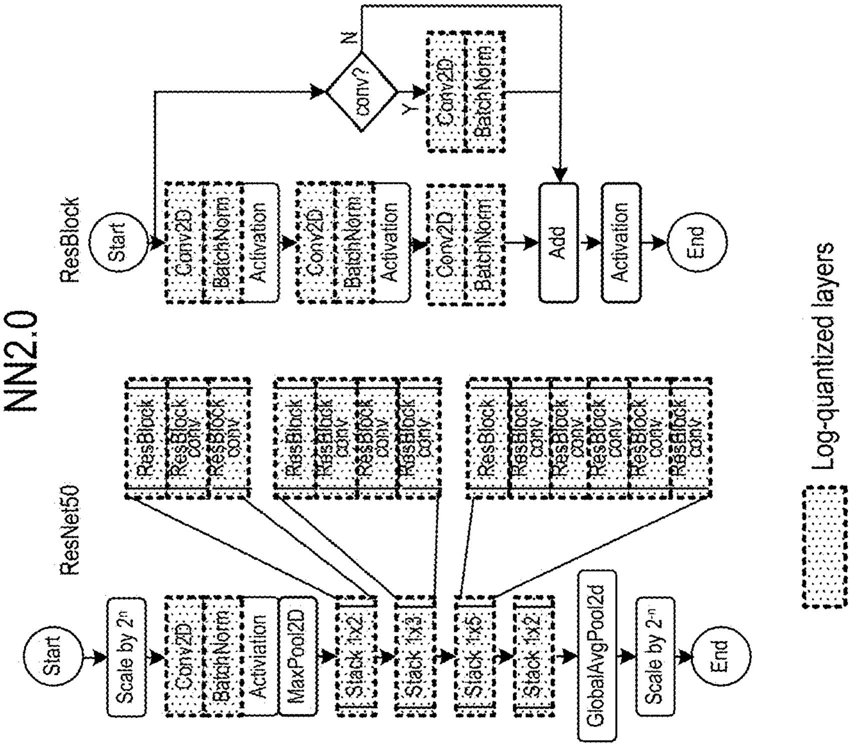
FIGS. 53A and 53B illustrate examples of transforming a facial recognition model into a log-quantized NN2.0 facial recognition model, in accordance with an example implementation.
Figure 53A:
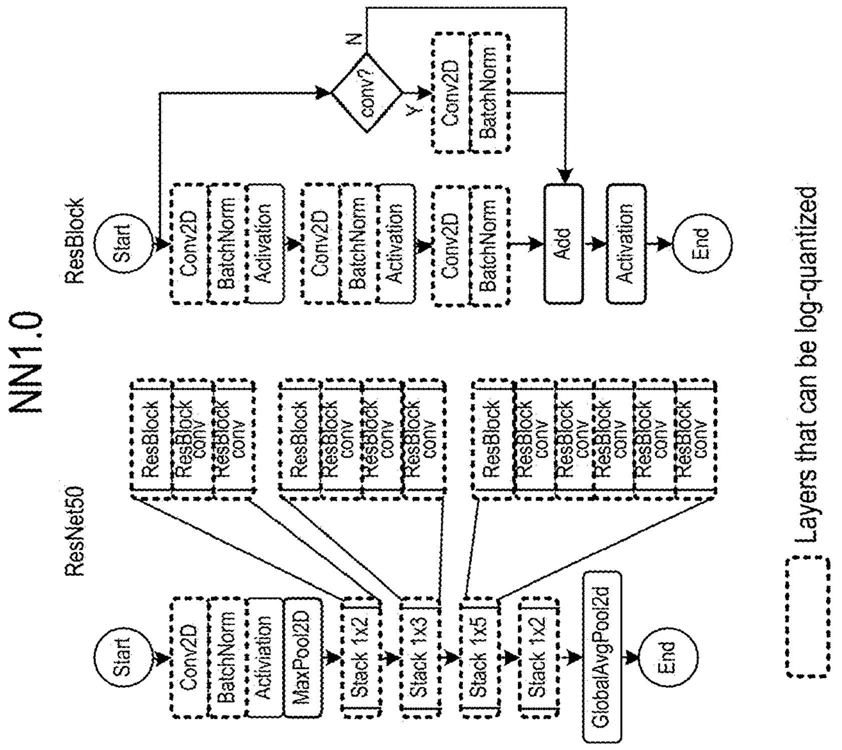

FIGS. 53A and 53B illustrate examples of how to transform a facial recognition model such as VGGFace into a log-quantized NN2.0 model., in accordance with an example implementation. Specifically, FIG. 53A illustrates a typical architecture VGGFace model, while FIG. 53B illustrates layers of VGGFace model that are log-quantized to transform the model into a NN2.0 model. FIG. 53A includes example architectures of ResNet50 and ResBlock and identifies the layers within each architecture that can be log-quantized. For example, the convolution layers, batch normalization layers, and stack layers comprising ResBlock and ResBlock convolution layers in FIG. 53A can be log-quantized. With reference to FIG. 53B, the architecture of ResNet50 and ResBlock under NN2.0 include scaling layers for input and output, as well as the log-quantized layers to transform the model in FIG. 53A into a NN2.0 model.

Figure 54A:
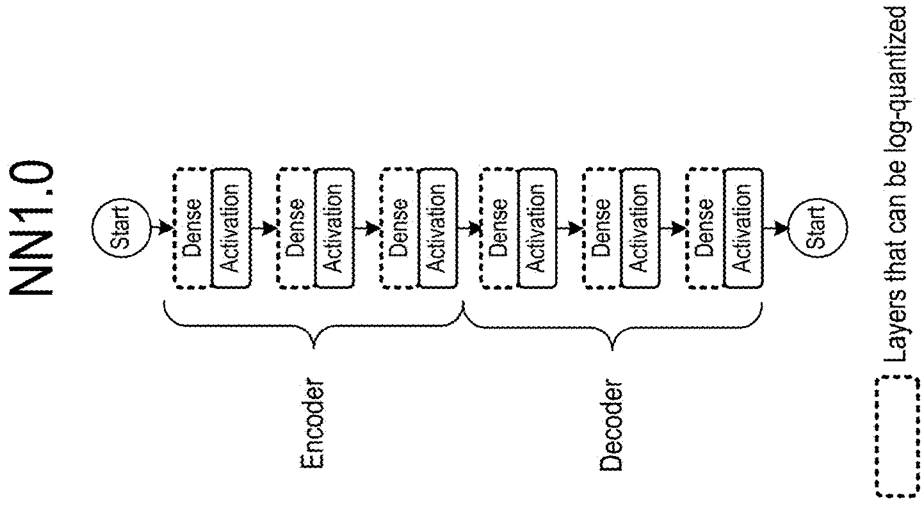
FIGS. 54A and 54B illustrate an example of transforming an autoencoder model into a log-quantized NN2.0 autoencoder model., in accordance with an example implementation.
Figure 54B:
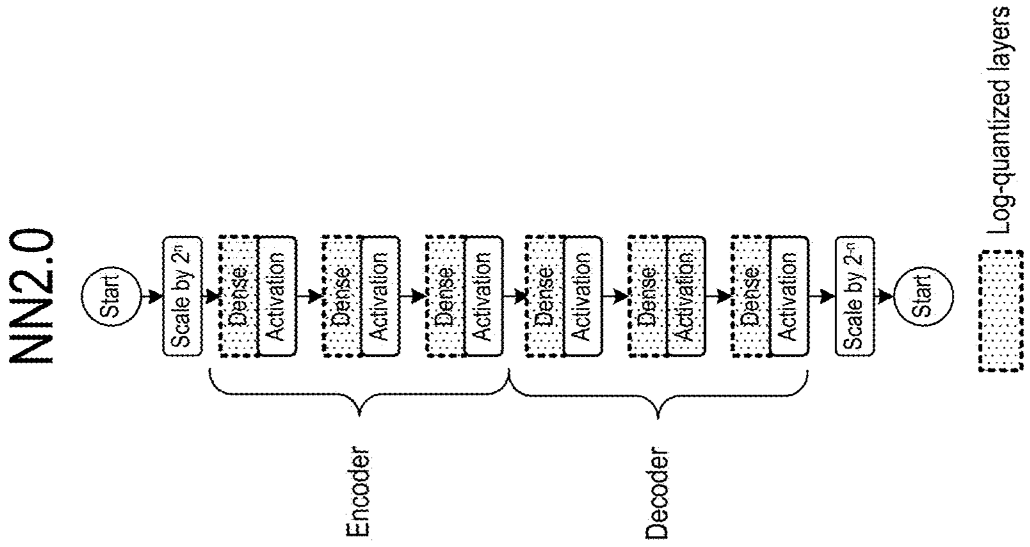

FIGS. 54A and 54B illustrate an example of how to turn an autoencoder model into a log-quantized NN2.0 model., in accordance with an example implementation. Specifically, FIG. 54A illustrates a typical architecture of an autoencoder model, while FIG. 54B illustrates layers of autoencoder model that are log-quantized to transform the model into a NN2.0 model. FIG. 54A includes an example of an autoencoder layer structure and identifies the layers that can be log-quantized. For example, the dense layers within an encoder and a decoder in FIG. 54A can be log-quantized. With reference to FIG. 54B, the autoencoder layers under NN2.0 include scaling layers for input and output, as well as the log-quantized layers to transform the model in FIG. 54A into a NN2.0 model.

Figure 55B:
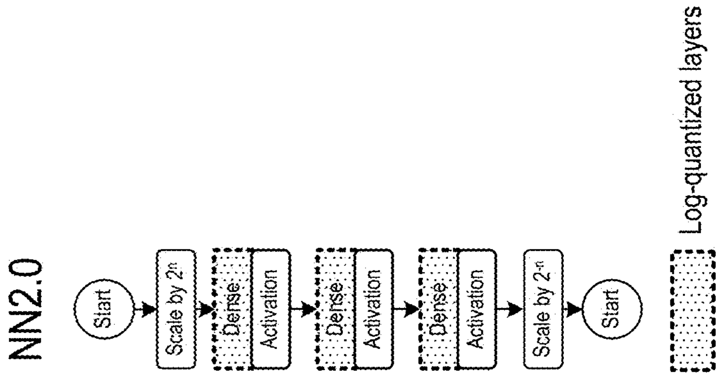
FIGS. 55A and 55B illustrate an example of transforming a dense neural network model into a log-quantized NN2.0 dense neural network model, in accordance with an example implementation.
Figure 55A:
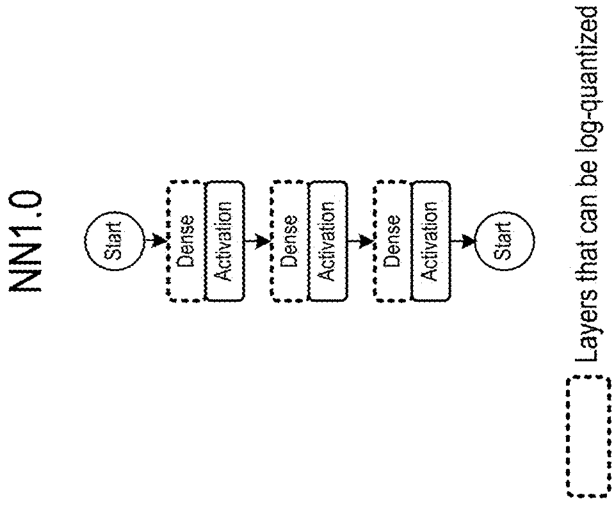

FIGS. 55A and 55B illustrate an example of how to turn a dense neural network model into a log-quantized NN2.0 model, in accordance with an example implementation. Specifically, FIG. 55A illustrates a typical architecture of dense neural network model, while FIG. 55B illustrates layers of dense neural network model that are log-quantized to transform the model into a NN2.0 model. FIG. 55A includes an example of a dense neural network model layer structure and identifies the layers that can be log-quantized. For example, the dense layers within the model architecture in FIG. 55A can be log-quantized. With reference to FIG. 55B, the model layers under NN2.0 include scaling layers for input and output, as well as the log-quantized layers to transform the model in FIG. 55A into a NN2.0 model.

Figure 56:
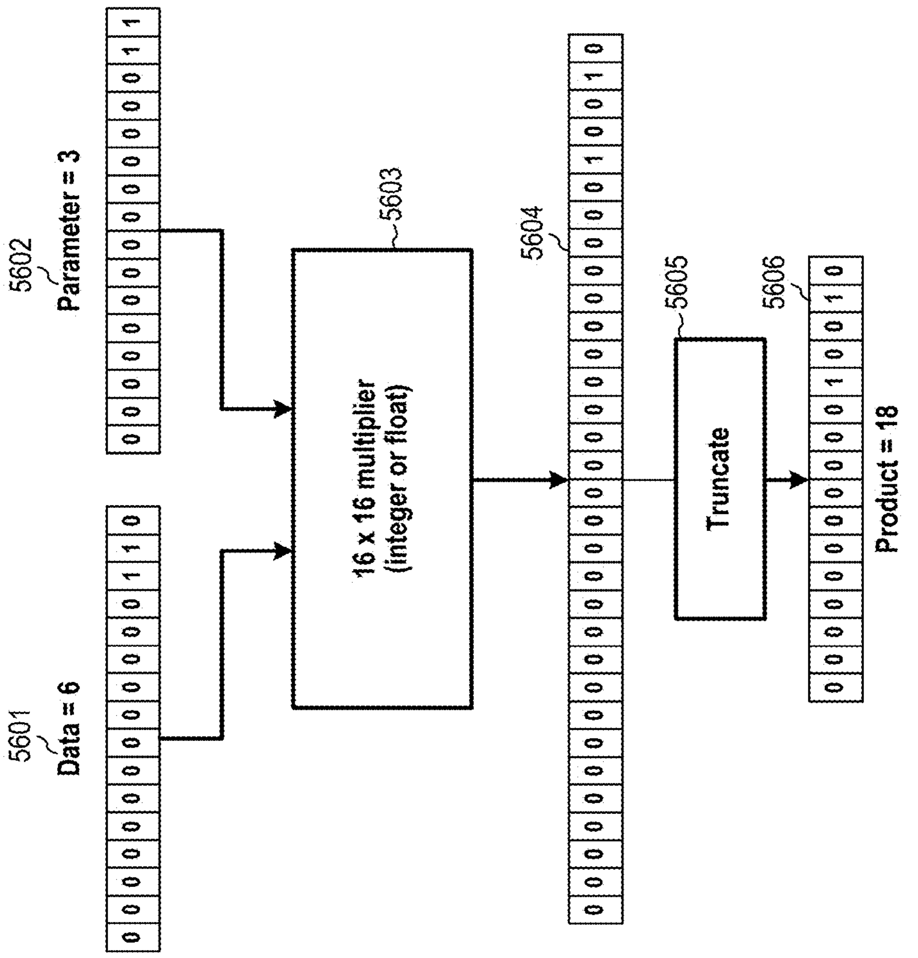
FIG. 56 illustrates an example of a typical binary multiplication that occurs in hardware, in accordance with an example implementation.

FIG. 56 illustrates an example of a typical binary multiplication that occurs in hardware, in accordance with an example implementation. The example multiplication that occurs in hardware may use binary numbers. For example, as shown in FIG. 56, a data 5601 may have a value of 6, and a parameter 5602 may have a value of 3. The data 5601 and parameter 5602 are 16-bit data, such that the 16-bit parameter data will go in and will be multiplied by a 16×16 multiplier using a multiplier 5603 that will generate a 32-bit number 5604. The 32-bit number may be truncated using a truncate operation 5605 to produce a 16-bit number 5606 if so desired. The 16-bit number 5606 will have a value of 18.

Figure 57:
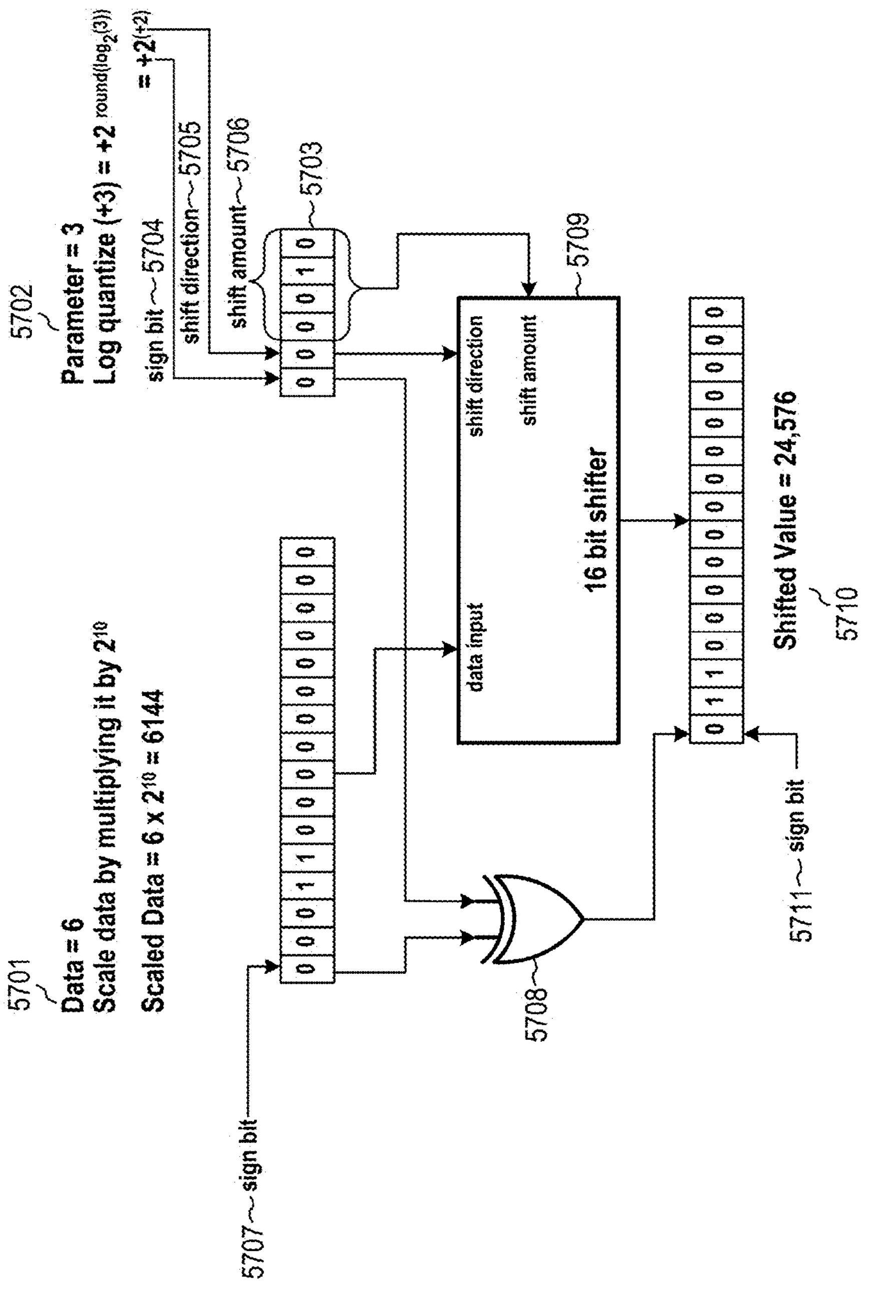
FIGS. 57 and 58 illustrate an example of a shift operation for NN2.0 to replace multiplication operation, in accordance with an example implementation.
Figure 58:
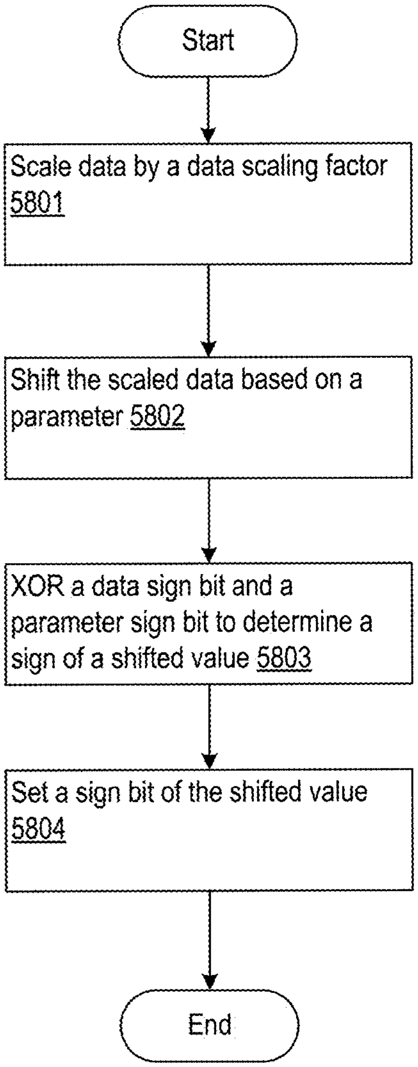

FIGS. 57 and 58 illustrate an example of a shift operation for NN2.0, in accordance with an example implementation. Specifically, FIG. 57 illustrates an example of the shift operation for NN2.0, and FIG. 58 illustrates an example flow of the shift operation for NN2.0.

At 5801, the flow scales data by a data scaling factor. In the example of FIG. 57, input data 5701 may have a value of 6 and the input data is scaled by a scaling factor $2^{10}$. The data scaling factor may produce a scaled data. Other data scaling factors may be used, and the disclosure is not intended to be limited to the examples provided herein. The input data 5701 is scaled by multiplying the input data 5701 by the data scaling factor $2^{10}$, which results in the scaled data having a value of 6,144. The 16-bit binary representation of the scaled data is 0001100000000000.

At 5802, the flow shifts the scaled data based on a shift instruction derived from the log quantized parameter. In the example of FIG. 57, parameter 5702 has a value of 3, and the parameter 5702 is log quantized to generate a shift instruction to shift the scaled data. The parameter 5702 is log quantized, where the method of log quantizing the value+3 is as follows: log-quantize(+3)=>$+2^{round(log_2(3))}=+2^{round(+1.5649)}+2^{(+2)}=+4$.

The shift in 5802 is conducted in accordance with shift instructions which is provided to the shifter 5709. The shift instructions can include one or more of the sign bit 5704, the shift direction 5705, and the shift amount 5706. The shift instruction 5703 derived from log quantized parameter is presented as a 6-bit data, where a sign bit 5704 is the most significant bit of the shift instruction 5703, a shift direction 5705 is the second most significant bit, and a shift amount 5706 are the remaining 4-bits of the shift instruction 5703. The sign bit 5704 having a value of 0 or 1 is based on the sign of the log quantized parameter. For example, the sign bit 5704 having a value of 0 is indicative of positive sign of the log quantized parameter. The sign bit 5704 having a value of 1 would be indicative of negative sign of the log quantized parameter. In the example of FIG. 57, the parameter+3 has a positive sign, such that the sign bit 5704 has a value of 0. The shift direction 5705 having a value of 0 or 1 is based on the sign of the exponent of the log quantized parameter. For example, the shift direction 5705 having a value of 0 is based on the exponent having a positive sign, which corresponds to a left shift direction. The shift direction 5705 having a value of 1 is based on the exponent having a negative sign, which corresponds to a right shift direction. In the example of FIG. 57, the exponent (+2) of the log quantized parameter has a positive sign, such that the shift bit 5705 has a value of 0, which corresponds to a left shift direction. The shift amount 5706 is based on the magnitude of the exponent of the log quantized parameter. In the example of FIG. 57, the exponent has a magnitude of 2, such that the shift amount 5706 is 2. The shift amount 5706 is comprised of the last 4 bits of the shift instruction 5703, such that the shift amount 5706 of 2 corresponds to 0010. With the determination of the shift direction 5705 and the shift amount 5706, the shift may be applied to the scaled data. The scaled data, shift direction, and shift amount are fed into a shifter 5709. The shifter 5709 may be a 16-bit shifter as shown in this example because the scaled data is represented as a 16-bit data. The shifter 5709 applies the shift operation based on the shift direction 5705 (left direction), and on the shift amount 5706 (2), to generate a shifted value 5710 of 0110000000000000, which corresponds to 24,576. The mathematically equivalent operation utilizing multiplication to the shifting operation that has been shown is as follows. The scaled data has a value of 6,144 and the log quantized value of parameter+3 is +4, and the product of 6,144×4=24,576. The shift operation for NN2.0 obtains the same result by shifting, and without a multiplication operation.

At 5803, the flow performs an XOR operation of the data sign bit and the sign bit from the shift instruction to determine a sign bit of a shifted value. In the example of FIG. 57, the data sign bit 5707 has a value of 0 and the sign bit 5704 of from the shift instruction has a value of 0. Both values are inputted into XOR 5708, and 0 XOR 0 results in 0, such that the sign bit 5711, of the shifted value 5710, has a value of 0.

At 5804, the flow sets a sign bit of the shifted value. The sign bit 5711 of the shifted value 5710 is based on the results of the XOR 5708. In the example of FIG. 57, the result of the XOR between the sign bit 5704 and the sign bit 5707 is 0, such that the sign bit 5711 is set to 0.

Figure 59:
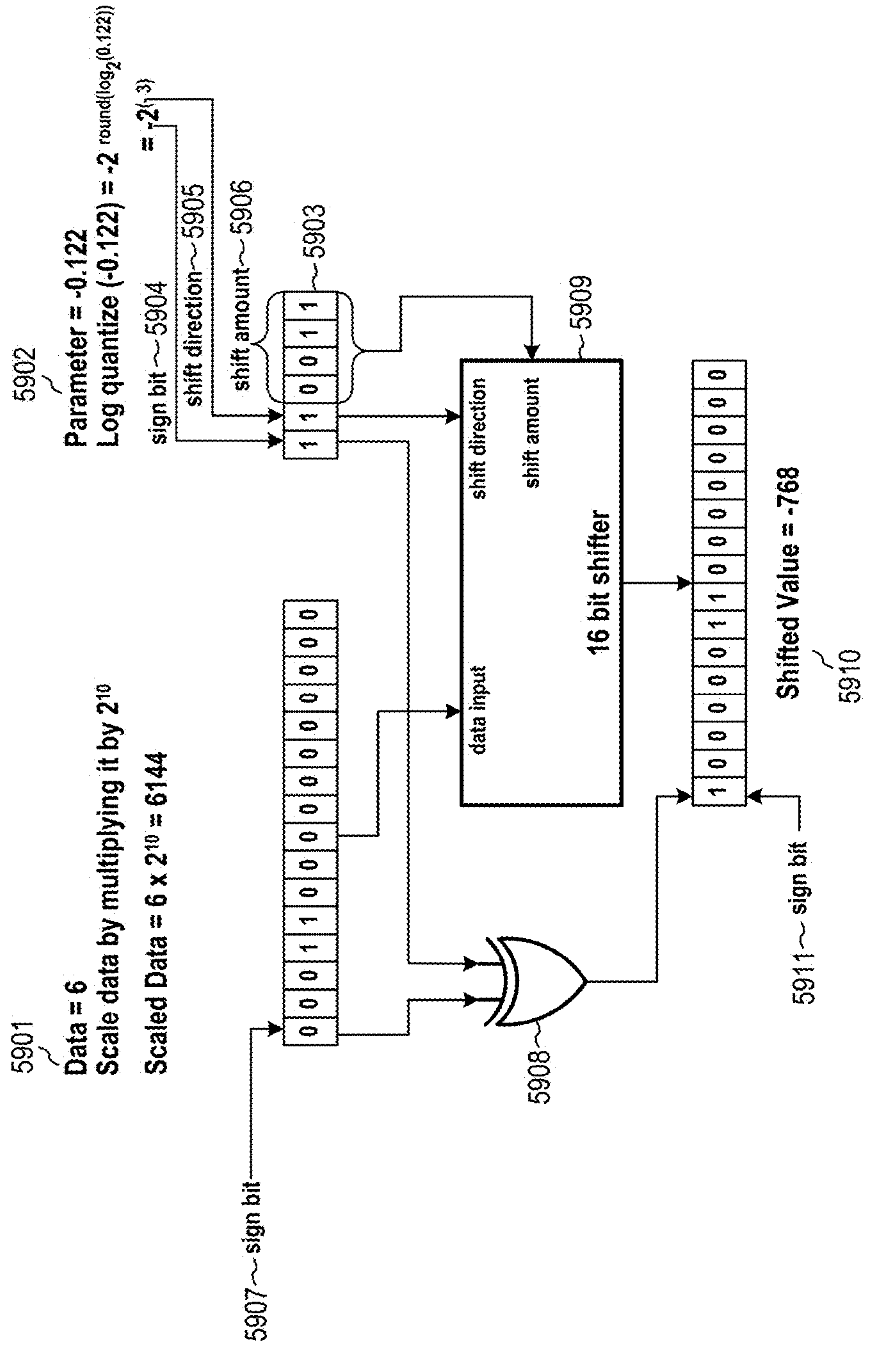
FIG. 59 illustrates an example of a shift operation for NN2.0 to replace multiplication operation, in accordance with an example implementation.

FIG. 59 illustrates an example of a shift operation for NN2.0, in accordance with an example implementation. The flow of the shift operation for NN2.0 of FIG. 59 is consistent with the flow of FIG. 58. The example of FIG. 59 has a different parameter value than that of the parameter in the example of FIG. 57. For example, the parameter 5902 of FIG. 59 has a value of −0.122, which is log quantized as log-quantize(−0.122)=$-2^{round(log_2(0.122))}$=$-2^{round(-3.035)}$=$-2^{(-3)}$=−0.125. As a result, the sign bit 5904 has a value of 1, due to the sign of the log quantized parameter, and the shift direction 5905 has a value of 1, due to the sign of the exponent of the log quantized parameter. The shift amount is 3 due to the exponent number having a magnitude of 3. The shift amount 5906 is in binary form within the last 4 bits of the log quantized parameter 5903. The shift direction 5905, shift amount 5906, and scaled data 5901 are inputted into the shifter 5909 to apply the shift amount and shift direction to the scaled data, which produces a shifted value 5910 of −768. The shifted value 5910 has a negative sign due to the XOR of the sign bit 5904 and the sign bit 5907, which results in a value of 1 for the sign bit 5911. The sign bit 5911 having a value of 1 results in the shifted value 5910 having a negative sign, such that the shifted value 5910 has a value of −768. The scaled data has a value of $6\times2^{10}$-6,144, and the log quantized value of parameter has a value of $-2^{(-3)}$=−0.125. The product of the scaled data and the log quantized parameter is 6,144×−0.125=−768. The shifted value 5910 has a value of −768, obtained using the shifter and not by using multiplication. The shift operation for NN2.0 obtains the same result by shifting, and without a multiplication operation.

Figure 60:
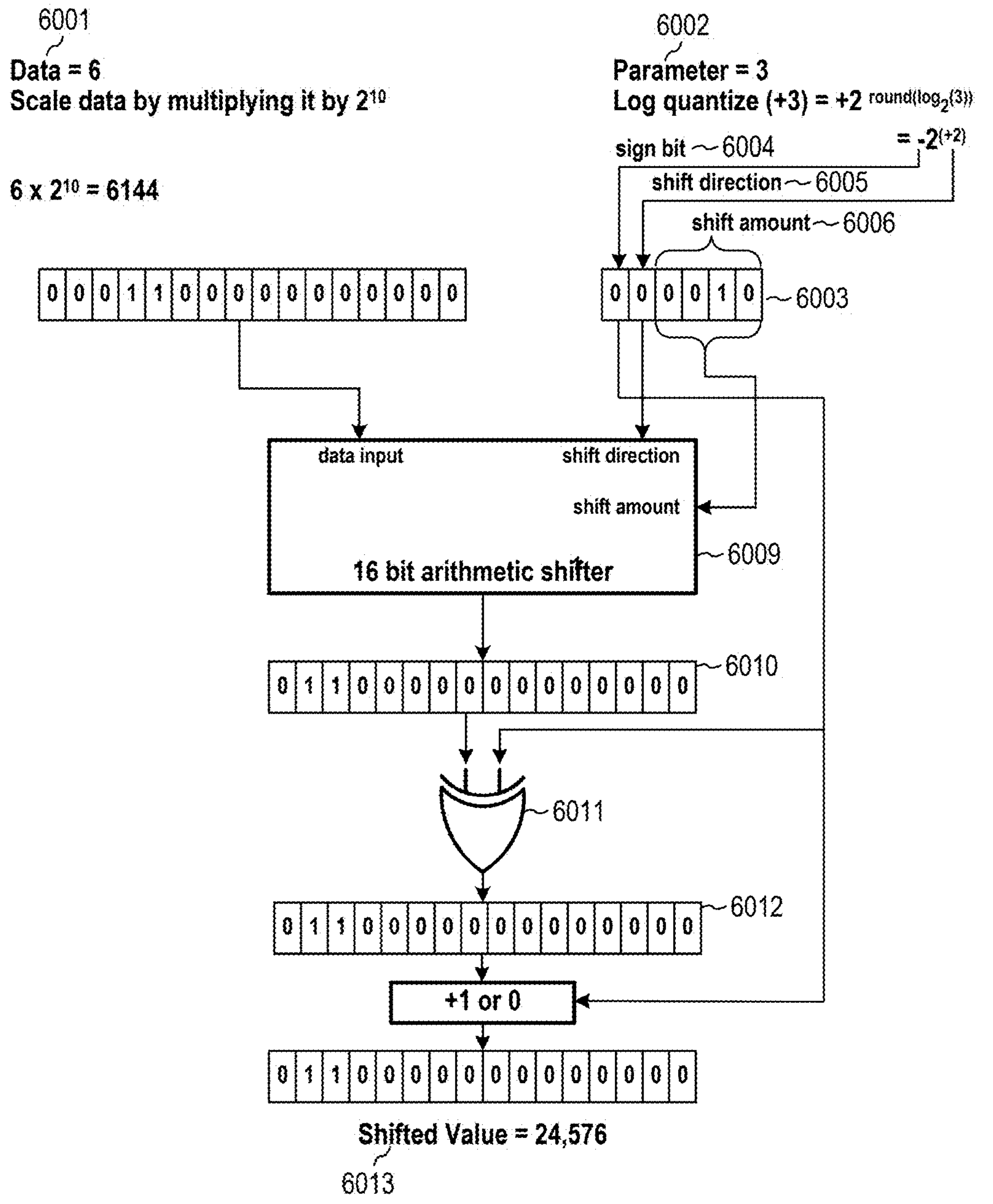
FIGS. 60 and 61 illustrate an example of a shift operation for NN2.0 using two's compliment data to replace multiplication operation, in accordance with an example implementation.
Figure 61:
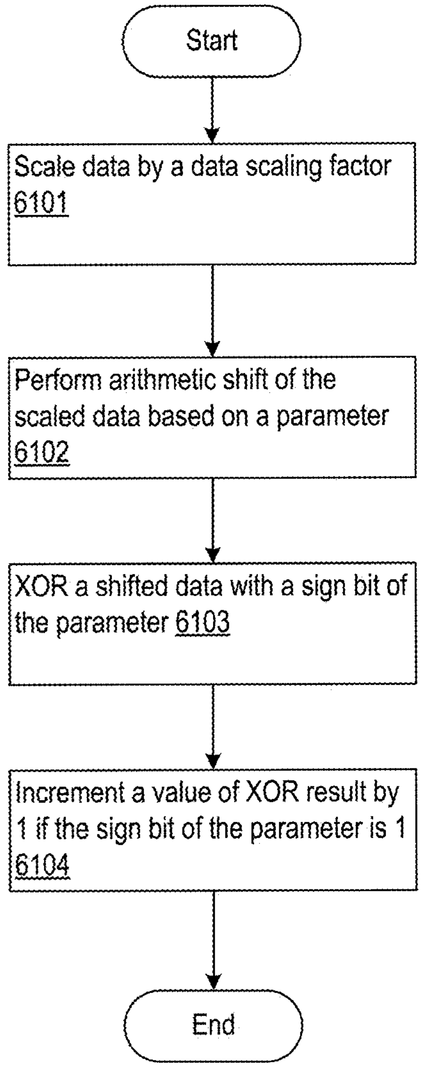

FIGS. 60 and 61 illustrate an example of a shift operation for NN2.0 using two's compliment data, in accordance with an example implementation. Specifically, FIG. 60 illustrates an example of the shift operation for NN2.0 using two's compliment data, and FIG. 61 illustrates an example flow of the shift operation for NN2.0 using two's compliment data.

At 6101, the flow scales data by a data scaling factor. In the example of FIG. 60, input data 6001 may have a value of 6 and the input data is scaled by a scaling factor $2^{10}$. The data scaling factor may produce a data that is represented as a 16-bit data. Other data scaling factors may be used, and the disclosure is not intended to be limited to the examples provided herein. The input data 6001 is scaled by multiplying the input data 6001 by the data scaling factor $2^{10}$, which results in the scaled data having a value of 6,144. The 16-bit scaled data represented as a binary number is 0001100000000000.

At 6102, the flow performs arithmetic shift of the scaled data based on a shift instruction. In the example of FIG. 60, parameter 6002 has a value of 3, and the parameter 6002 is log quantized to produce the shift instruction to shift the scaled data. The parameter 6002 is log quantized, where the method of log quantizing the value of +3 is as follows: log-quantize(+3)=>$+2^{round(log_2(3))}$=$+2^{(+2)}$=+4. The shift instruction 6003 derived from a log quantized parameter is presented as a 6-bit data, where a sign bit 6004 is the most significant bit of the shift instruction 6003, a shift direction 6005 is the second most significant bit, and a shift amount 6006 are the remaining 4-bits of the log quantized parameter. The sign bit 6004 having a value of 0 or 1 is based on the sign of the log quantized parameter. For example, the sign bit 6004 having a value of 0 is indicative of positive sign of the log quantized parameter. The sign bit 6004 having a value of 1 would be indicative of negative sign of the log quantized parameter. In the example of FIG. 60, the parameter+3 has a positive sign, such that the sign bit 6004 has a value of 0. The shift direction 6005 having a value of 0 or 1 is based on the sign of the exponent of the log quantized parameter. For example, the shift direction 6005 having a value of 0 is based on the exponent having a positive sign, which corresponds to a left shift direction. The shift direction 6005 having a value of 1 is based on the exponent having a negative sign, which corresponds to a right shift direction. In the example of FIG. 60, the exponent (2) of the log quantized parameter has a positive sign, such that the shift bit 6005 has a value of 0, which corresponds to a left shift direction. The shift amount 6006 is based on the magnitude of the exponent of the log quantized parameter. In the example of FIG. 60, the exponent has a magnitude of 2, such that the shift amount 6006 is 2. The shift amount 6006 is comprised of the last 4 bits of the shift instruction data 6003, such that the shift amount 6006 of 2 corresponds to 0010. With the determination of the shift direction 6005 and the shift amount 6006, the shift may be applied to the scaled data. The scaled data, shift direction, and shift amount are fed into an arithmetic shifter 6009. The arithmetic shifter 6009 may be a 16-bit arithmetic shifter as shown in this example because the scaled data is represented as a 16-bit data. The arithmetic shifter 6009 applies the shift operation based on the shift direction 6005 (left direction), and on the shift amount 6006 (2), to generate a shifted value 6010 of 0110000000000000.

At 6103, the flow performs an XOR operation of the shifted data with a sign bit from the shift instruction. In the example of FIG. 60, the sign bit 6004 has a value of 0 which is fed into XOR 6011 along with the shifted value 6010 (output of arithmetic shifter 6009). The result of the XOR operation between the sign bit 6004 and the shifted value 6010 results in the shifted value 6012. In the example of FIG. 60, since the sign bit 6004 has a value of 0, the shifted value 6012 is not changed from the shifted value 6010 as a result the XOR operation between the sign bit 6004 and the shifted value 6010.

At 6104, the flow increments a value of the XOR result by 1 if the sign bit from the shift instruction is 1. In the example of FIG. 60, the shifted value 6012 is inputted into an incrementor (e.g., +1 or 0), which is fed with the sign bit 6004. The sign bit 6004 of the shift instruction is 0, such that the flow does not increment the shifted value 6012 of the XOR results and results in the shifted value 6013.

Figure 62:
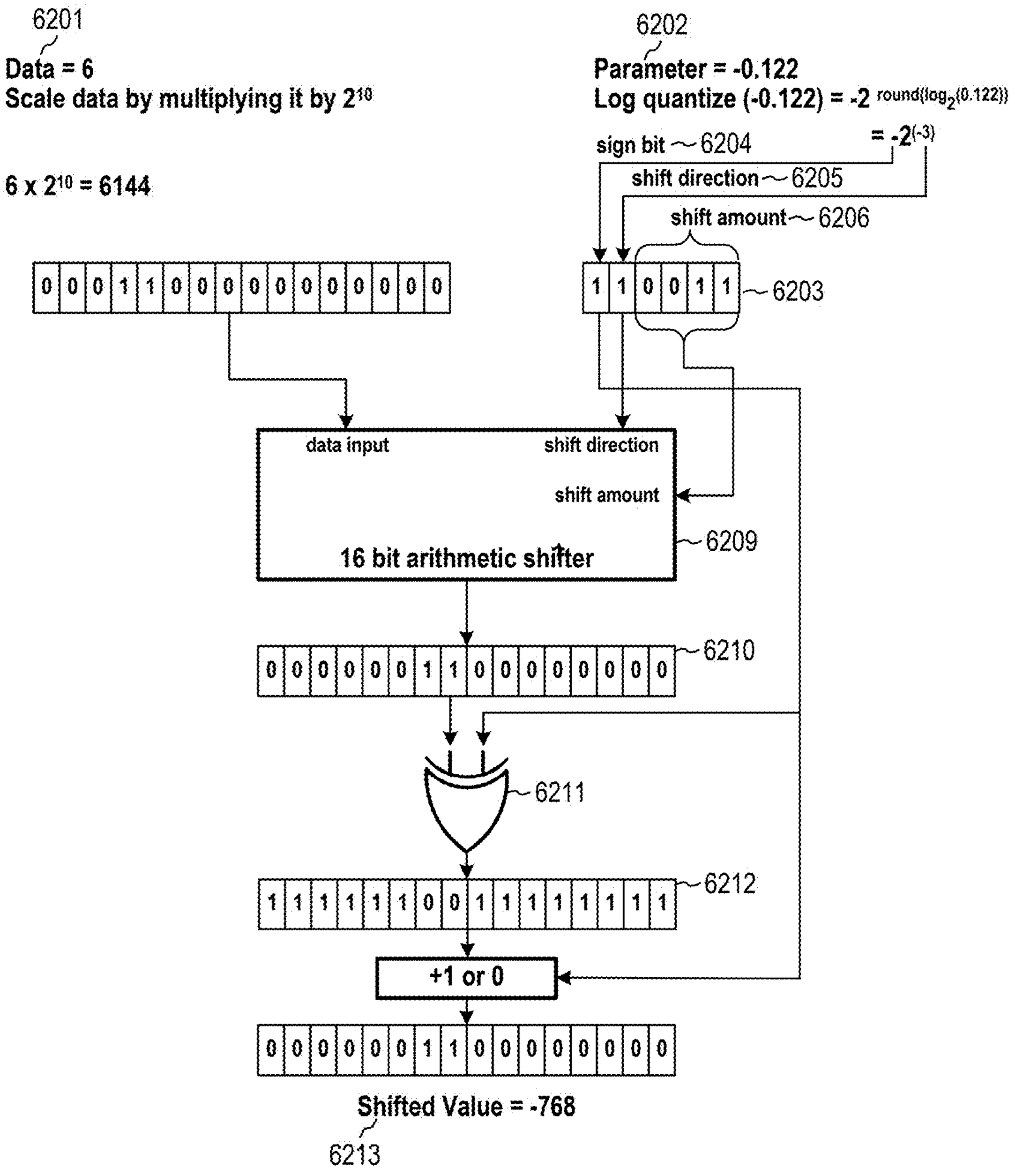
FIG. 62 illustrates an example of a shift operation for NN2.0 using two's compliment data to replace multiplication operation, in accordance with an example implementation.

FIG. 62 illustrates an example of a shift operation for NN2.0 using two's compliment data, in accordance with an example implementation. The flow of the shift operation for NN2.0 of FIG. 62 is consistent with the flow of FIG. 61. The example of FIG. 62 has a different shift instruction than that of the shift instruction in the example of FIG. 60. For example, the parameter 6202 of FIG. 62 has a value of –0.122, which is log quantized to produce the shift instruction to shift the scaled data. The parameter 6202 is log quantized, where the method of log quantizing the value of –0.122 is as follows: log-quantize(–0.122)=>$-2^{round(log_2}$ $^{(0.122)}$$=2^{round(-3.035)}=-2^{(-3)}$=0.125. The shift instruction derived from the log quantized parameter 6203 is presented as a 6-bit data, where a sign bit 6204 is the most significant bit of the shift instruction 6203, a shift direction 6205 is the second most significant bit, and a shift amount 6206 are the remaining 4-bits of the log quantized parameter 6203. The sign bit 6204 has a value of 1, due to the negative sign of the log quantized parameter, and the shift direction 6205 has a value of 1, due to the sign of the exponent of the log quantized parameter. The shift amount is 3 due to the exponent number having a magnitude of 3. The shift amount 6206 is based on the magnitude of the exponent of the log quantized parameter. In the example of FIG. 62, the exponent has a magnitude of 3, such that the shift amount 6206 is 3. The shift amount 6206 is in binary form within the last 4 bits of the shift instruction 6203, such that the shift amount 6206 of 3 corresponds to 0011. The shift direction, shift amount, and scaled data are inputted into the 16-bit arithmetic shifter 6209 to apply the shift amount and shift direction to the scaled data 6201, which produces a shifted value 6210 of 0000001100000000. The shifted value 6210 and the sign bit 6204 from the shift instruction are inputted into XOR 6211. The result of the XOR operation between the sign bit 6204 and the shifted value 6210 results in the shifted value 6212. The output of the XOR result (e.g., shifted value 6212) and the sign bit are inputted into an incrementor (e.g., +1 or 0). The incrementor may increment the shifted value 6212 by 1 if the sign bit of the shift instruction is 1. In the example of FIG. 62, the sign bit 6204 of the shift instruction is 1, such that the shifted value 6212 is incremented by 1 due to the sign bit of the shift instruction having a value of 1. As a result, the shifted value 6212 is incremented to generate the shifted value 6213 of 0000001100000000. The shifted value 6213 has a value of –768. The scaled data has a value of $6\times2^{10}$=6,144, and the log quantized parameter has a value of $-2^{(-3)}$=–0.125. The product of the scaled data and the log quantized parameter is 6,144×-0.125=–768. The shifted value 6212 has a value of –768, obtained using the shifter and not by using multiplication. The shift operation for NN2.0 obtains the same result by shifting, and without a multiplication operation.

Figure 63:
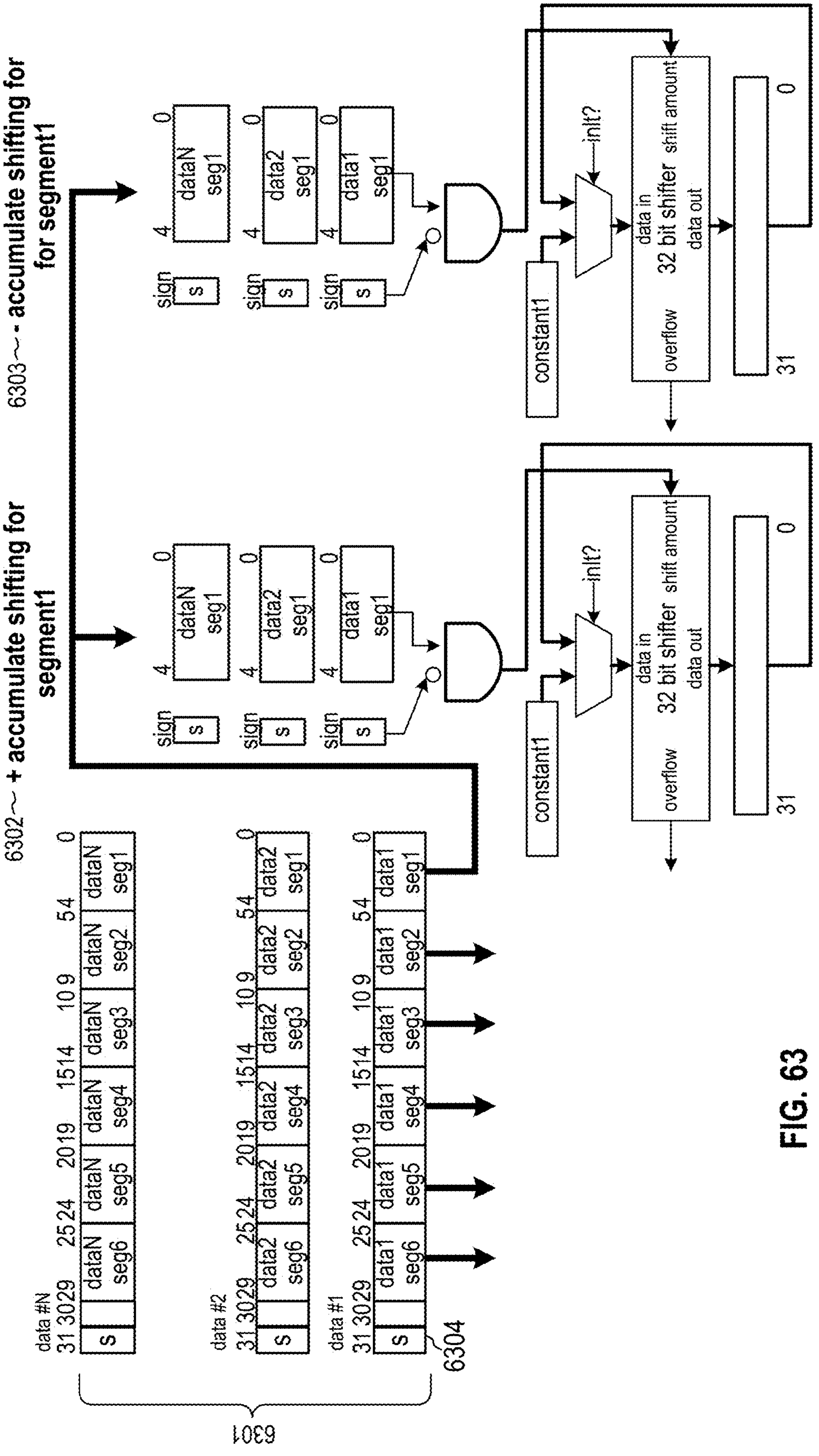
FIGS. 63 and 64 illustrate an example of shift operation for NN2.0 to replace accumulate/add operation, in accordance with an example implementation.
Figure 64:
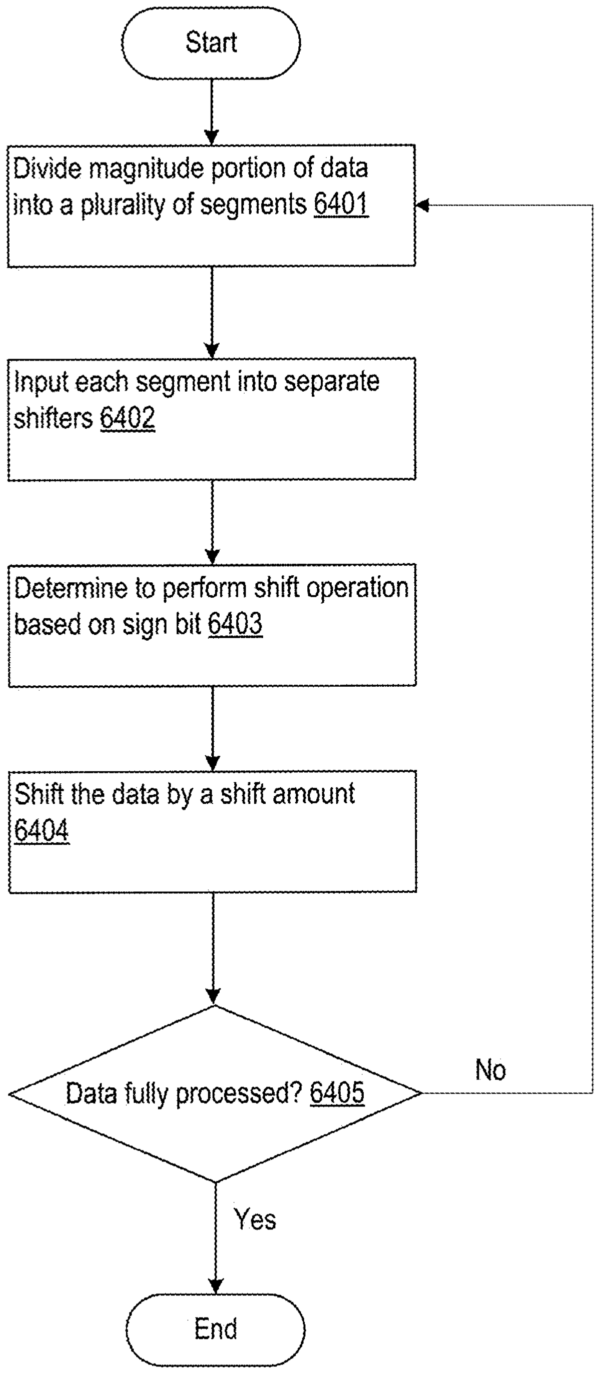

FIGS. 63 and 64 illustrate an example of an accumulate/add operation for NN2.0 where add operation can be replaced with shift operation, in accordance with an example implementation. Specifically, FIG. 63 illustrates an example of the accumulate/add operation for NN2.0, and FIG. 64 illustrates an example flow of the accumulate/add operation for NN2.0. The accumulate operation for NN2.0 may utilize shift operations to perform an accumulation or addition of N numbers of signed magnitude data using two separate sets of shifters, positive accumulate shifters for positive numbers and negative accumulate shifters for negative numbers.

At 6401, the flow divides a magnitude portion of data into a plurality of segments. In the example of FIG. 63, the magnitude portion of the data 6301 is divided into six 5-bit segments specified as seg1—seg6. However, in some instances, the magnitude portion of the data can be divided into a plurality of segments, and the disclosure is not intended to be limited to six segments. The $30^{th}$ bit may be reserved for future use, the $31^{st}$ bit is a sign bit 6304, while remaining bits comprise the six 5-bit segments and the reserved $30^{th}$ bit.

At 6402, the flow inputs each segment into both the positive accumulate shifter and the negative accumulate shifter. In the example of FIG. 63, the first segment (seg1) of the first data string (data #1) is inputted into the positive accumulate shifter 6302 and the negative accumulate shifter 6303. Other segments (seg2~ seg6) have the same structure of positive accumulate and negative accumulate shifter structure as the segment1. Alternatively, one can have an architecture that all 6 segments share the same positive accumulate shifter and negative accumulate shifter with appropriate buffers to store the intermediate results of the shifting operation for all segments.

At 6403, the flow determines to perform a shift operation based on a sign bit. In the example of FIG. 63, the sign bit 6304 is utilized by the shifters 6302 and 6303 to determine the shifting operation. For example, if the sign bit 6304 has a value of 0, which corresponds to a positive number, then the positive accumulate shifting operation will be performed. If the sign bit 6304 has a value of 1, which corresponds to a negative number, then the negative accumulate shifting operation will be performed. Each data (data #1, data #2, . . . data #N) has a corresponding sign bit 6304.

At 6404, the flow shifts the data by a shift amount represented by the segment value. In the beginning of the operation, the shifter receives a constant 1 as the input to the shifter. The shifter then receives the output of the shifter as the input to the shifter for all subsequent operations.

At 6405, the flow continues the process of 6401-6404 for each segment and data string, until all the data has been processed.

Figure 65:
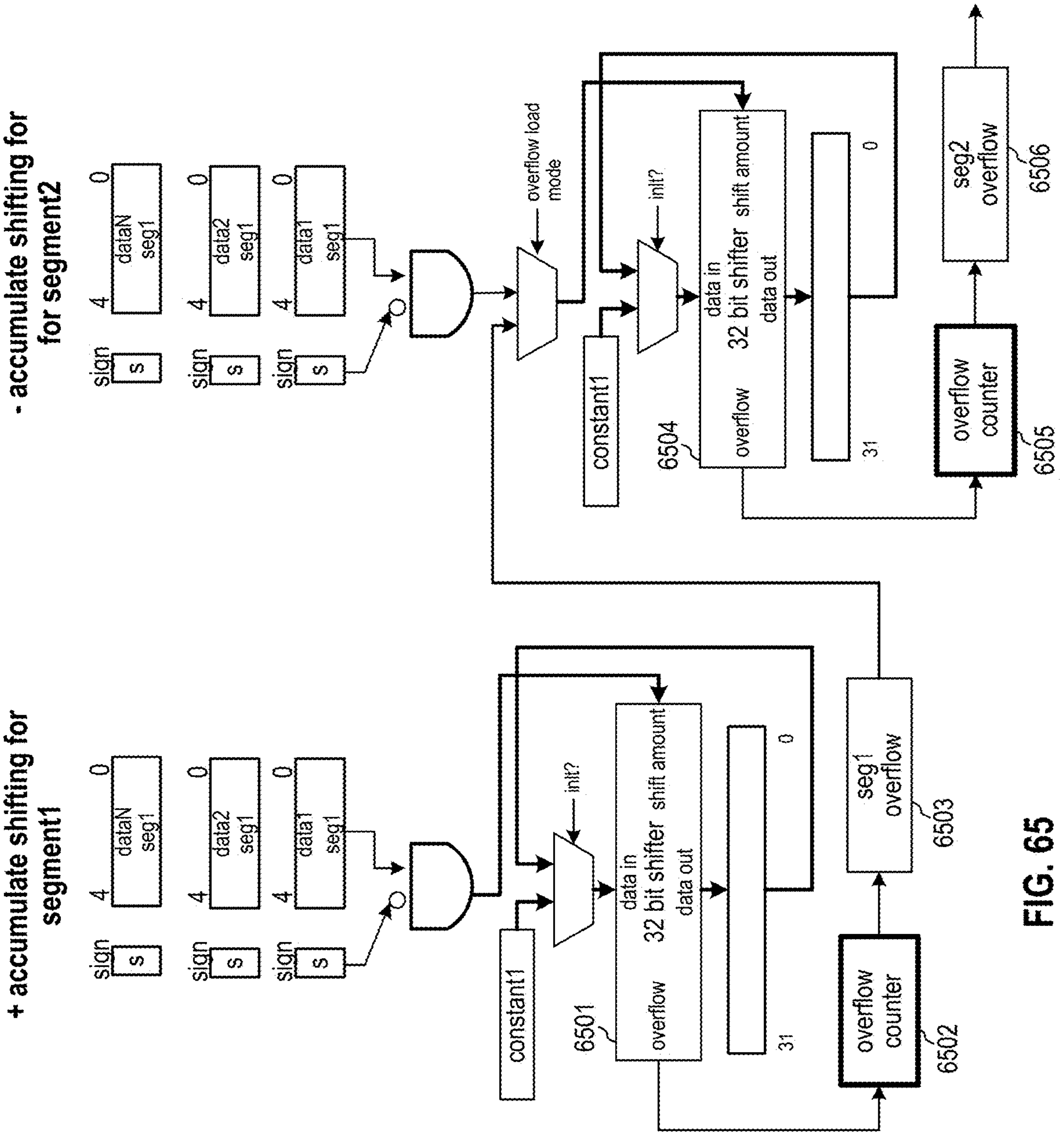
FIGS. 65 and 66 illustrate an example of overflow processing for an add operation for NN2.0 using shift operation, in accordance with an example implementation.
Figure 66:
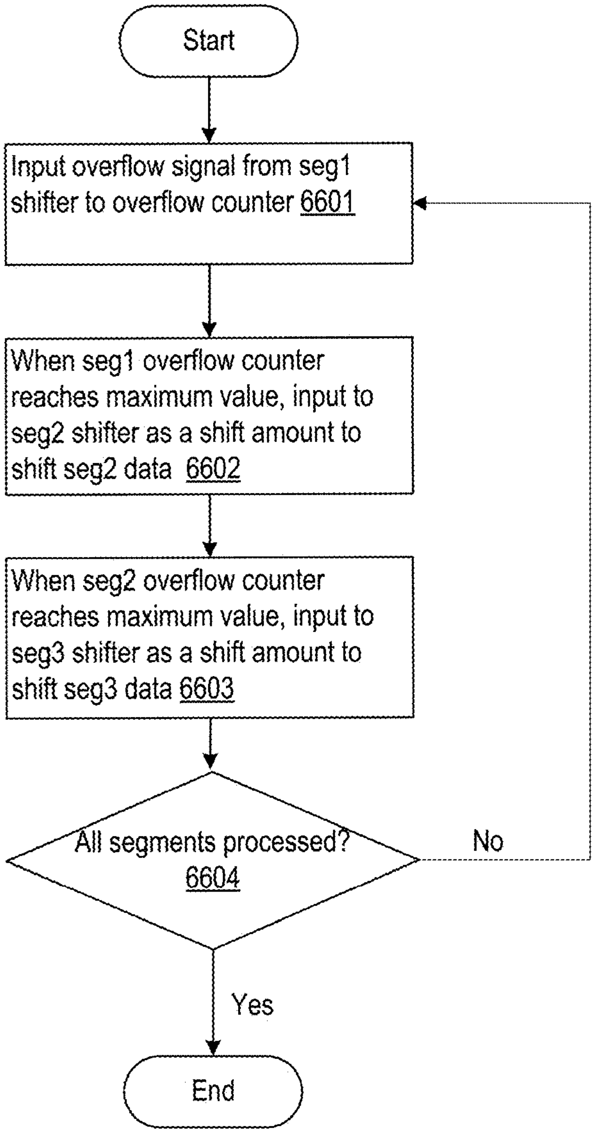

FIGS. 65 and 66 illustrate an example of overflow processing for an add operation for NN2.0 using shift operation, in accordance with an example implementation. Specifically, FIG. 65 illustrates an example of the overflow processing for the add operation for NN2.0 using shifters, and FIG. 66 illustrates an example flow of the overflow processing for the add operation for NN2.0 using shifters.

At 6601, the flow inputs overflow signal from the first segment (seg1) from the shifter into an overflow counter. In the example of FIG. 65, the overflow signal from the shifter 6501 is inputted into the overflow counter 6502.

At 6602, when the seg1 overflow counter reaches a maximum value, the flow inputs an output of the seg1 overflow counter to a seg2 shifter as a shift amount to shift the seg2 data based on the overflow counter value from the seg1 overflow counter. In the example of FIG. 65, data from the overflow counter 6502 is inputted into the seg1 overflow 6503, and when the seg1 overflow 6503 reaches a maximum value, the output of the seg1 overflow 6503 is received as input by shifter 6504. The shifter 6504 will use the input from seg1 overflow 6503 as a shift amount to shift seg2 data by an amount corresponding to an overflow counter value provided by the seg1 overflow 6503.

At 6603, when the seg2 overflow counter reaches a maximum value, the flow inputs an output of the seg2 overflow counter to a seg3 shifter as a shift amount to shift the seg3 data based on the overflow counter value from the seg2 overflow counter. In the example of FIG. 65, data from the overflow counter 6505 is inputted into the seg2 overflow 6506, and when the seg2 over flow 6506 reaches a maximum value, the output of the seg2 overflow 6506 is received as input by a third shifter (not shown). The third shifter will use the input form seg2 overflow 6506 as a shift amount to shift seg3 data by an amount corresponding to an overflow counter value provided by the seg2 overflow 6506.

At 6604, the flow determines if all the data segments have been processed. If no, then the process of 6601-6603 repeats until all the data segments have been processed.

Figure 67:
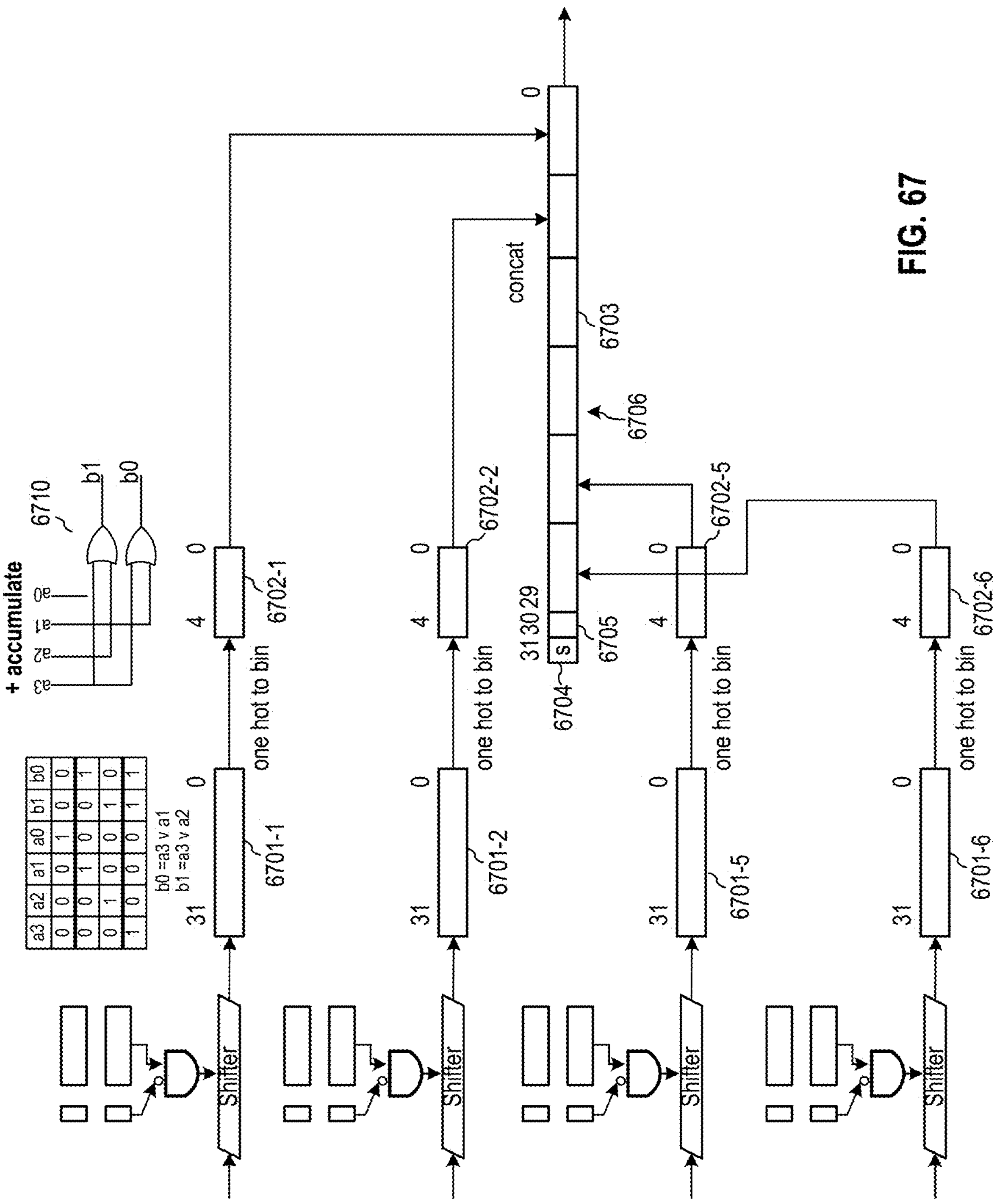
FIGS. 67-69 illustrate an example of a segment assembly operation for NN2.0, in accordance with an example implementation.
Figure 68:
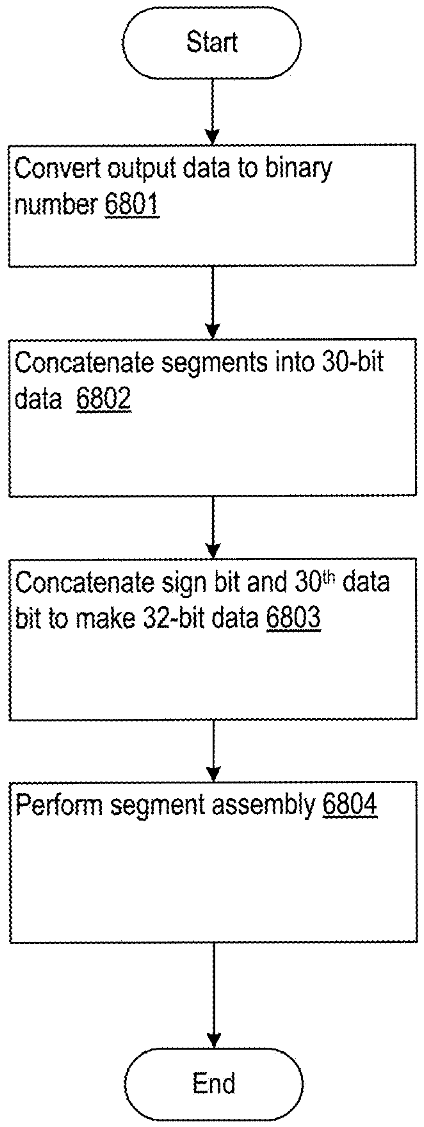
Figure 69:
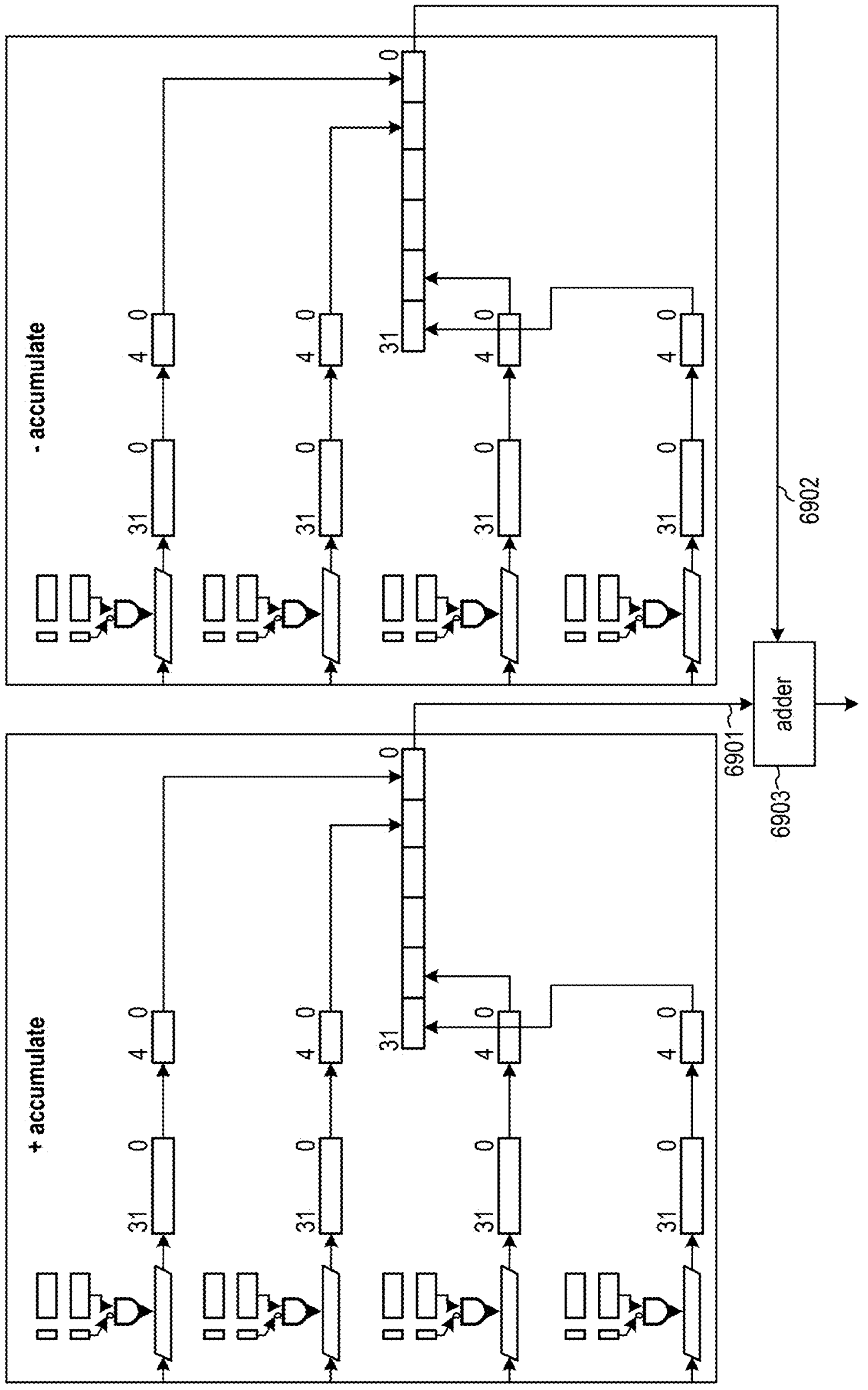

FIGS. 67 and 68 illustrate an example of a segment assembly operation for NN2.0, in accordance with an example implementation. Specifically, FIG. 67 illustrates an example of the segment assembly operation for NN2.0, and FIG. 68 illustrates an example flow of the segment assembly operation for NN2.0. The segment assembly operation may assemble the output of the 6 segment accumulate operations. At 6801, after accumulate shifting is done, the flow converts the output data, which is one-hot binary number, into an encoded binary number. For example, the output data 6701-1 may comprise 32-bit one-hot data that is converted into a 5-bit encoded binary number 6702-1. The output one-hot data of each of the 6 segments are converted into a 5-bit encoded binary number. In the example of FIG. 67, conversion of the first, second, fifth, and sixth segments are shown, while conversion of the third and fourth segments are not shown. At 6802, the flow concatenates the segments into a 30-bit data 6703. The 6 segments are concatenated to form the 30-bit data and their placement within the 30-bit data is ordered based on the segment numbering. For example, the first 5-bit binary number 6702-1 is placed at the 0-4 bit number position, followed by the second 5-bit binary number 6702-2, then the third, then the fourth, then the fifth 6702-5, and ending with the sixth 5-bit binary number 6702-6 at the end of the 30-bit data. At 6803, the flow concatenates a sign bit 6704 and a $30^{th}$ bit 6705 to the 30-bit data 6703. The combination of the sign bit 6704, the $30^{th}$ bit 6705, and the 6 segments that form the 30-bit data 6703 form a 32-bit data 6706. The example of FIG. 67 shows the formation of the 32-bit data 6706 which is for the "+accumulate assembly". A similar procedure occurs for the "−accumulate assembly" but is not shown herein to reduce duplicate explanations. At 6804, the flow performs segment assembly. As shown in FIG. 69, after the segment assembly procedure is performed for "+accumulate" and "−accumulate", the data (6901, 6902) from "+accumulate" and "−accumulate" is inputted to an adder 6903 and are added together to form the final data.

Figure 70:
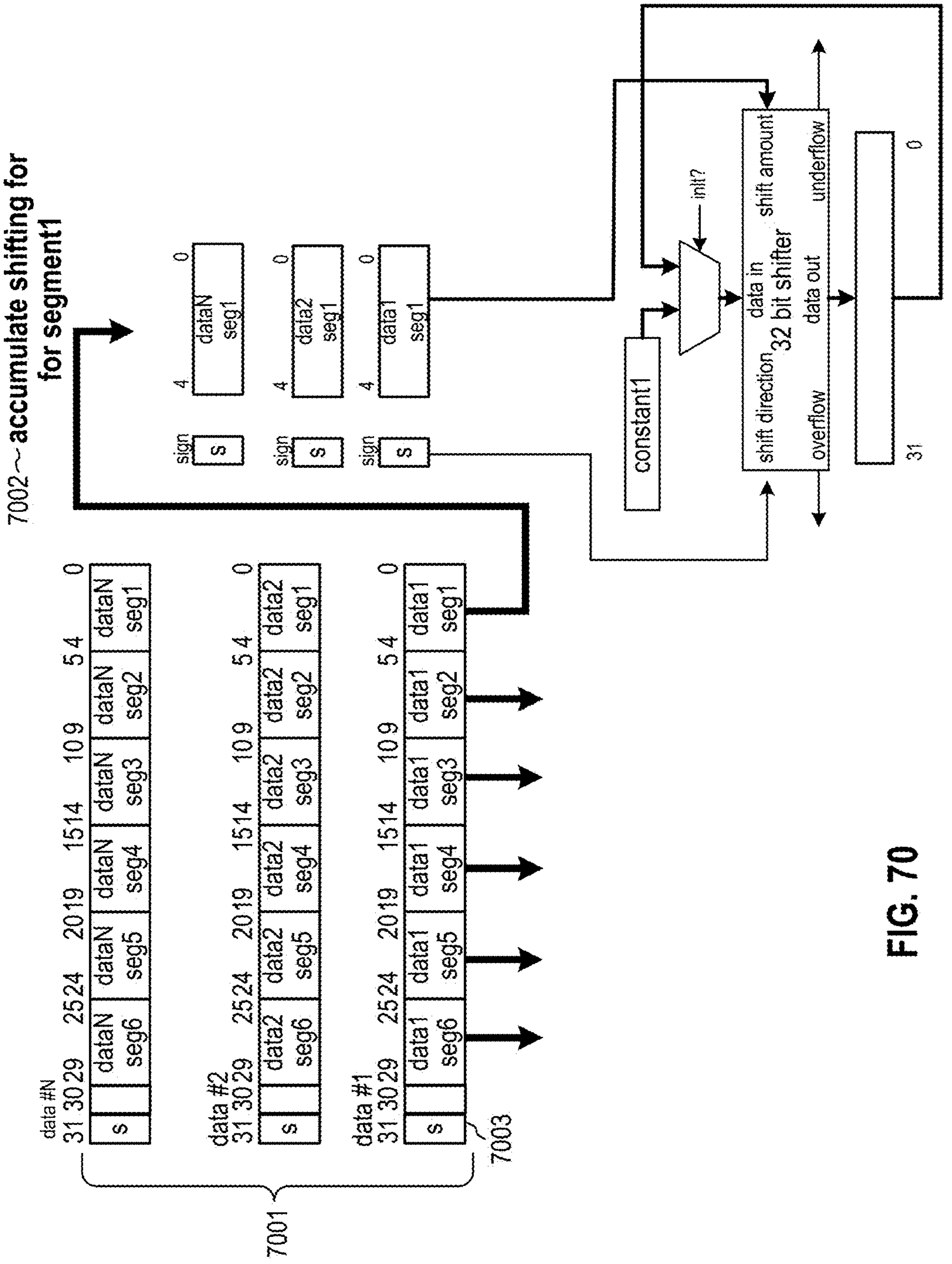
FIGS. 70 and 71 illustrate an example of a shift operation for NN2.0 to replace accumulate/add operation, in accordance with an example implementation.
Figure 71:
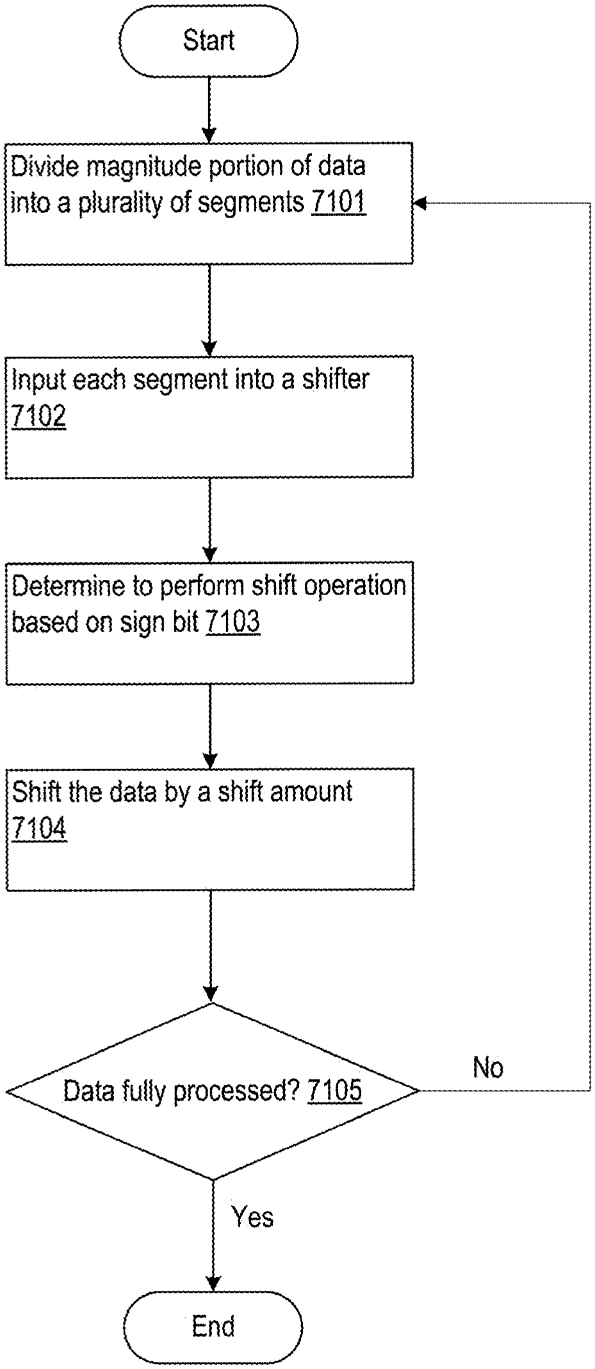

FIGS. 70 and 71 illustrate an example of an accumulate/add operation for NN2.0 where add operation can be replaced with shift operation, in accordance with an example implementation. Specifically, FIG. 70 illustrates an example of the accumulate/add operation for NN2.0, and FIG. 71 illustrates an example flow of the accumulate/add operation for NN2.0. The accumulate operation for NN2.0 may utilize shift operations to perform an accumulation or addition of N numbers of signed magnitude data using one set of shifter that can shift both right and left for both positive and negative data.

At 7101, the flow divides a magnitude portion of data into a plurality of segments. In the example of FIG. 70, the magnitude portion of the data 7001 is divided into six 5-bit segments specified as seg1—seg6. However, in some instances, the magnitude portion of the data can be divided into a plurality of segments, and the disclosure is not intended to be limited to six segments. The $30^{th}$ bit may be reserved for future use, the $31^{st}$ bit is a sign bit 7003, while remaining bits comprise the six 5-bit segments and the reserved $30^{th}$ bit.

At 7102, the flow inputs each segment into a shifter. In the example of FIG. 70, the segments the data 7001 are inputted into a shifter 7002. The other segments (seg2-seg6) have the same structure of shifter structure as the segment1. Alternatively, one can have an architecture that all 6 segments share the same shifter with appropriate buffers to store the intermediate results of the shifting operation for all segments.

At 7103, the flow determines to perform a shift operation based on a sign bit. In the example of FIG. 70, the sign bit 7003 is utilized by the shifter 7002 to determine the shift direction. For example, if the sign bit 7003 has a value of 0, then the data is shifted to the left. If the sign bit 7003 has a value of 1, then the data is shifted to the right.

At 7104, the flow shifts the data by a shift amount represented by the segment value. In the beginning of the operation, the shifter receives a constant 1 as the input to the shifter. The shifter then receives the output of the shifter as the input to the shifter for all subsequent operations.

At 7105, the flow continues the process of 7101-7104 until all the input data is processed.

Figure 72:
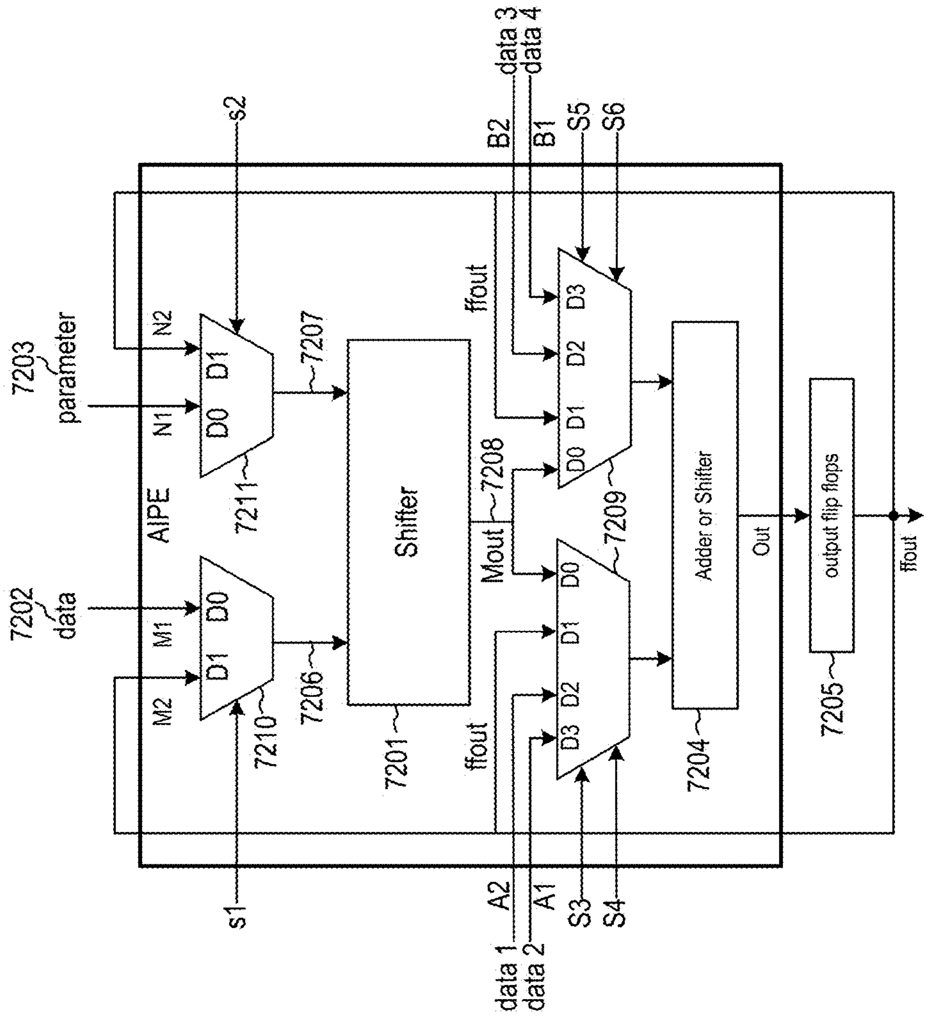
FIG. 72 illustrates an example of a general architecture of AI Processing Element (AIPE), in accordance with an example implementation.

FIG. 72 illustrates an example of a general architecture of AI Processing Element (AIPE), in accordance with an example implementation. The AIPE is configured to process multiple neural network operations, such as but not limited to, convolution, dense layer, ReLU, leaky ReLU, max pooling, addition, and/or multiplication. The AIPE may comprise many different components, such as a shifter circuit 7201 that receives data 7202 and parameter 7203 as inputs. The AIPE may also comprise an adder circuit or shifter circuit 7204 that receives as input the output of the shifter circuit 7201. The AIPE may also comprise a register circuit such as a flip flop 7205 that receives as input the output of the adder circuit or shifter circuit 7204. The output of the register circuit such as flip flop 7205 is fed back into the AIPE and is multiplexed with the data 7202 and the parameter 7203.

As illustrated in FIG. 72, the AIPE can include at least a shifter circuit 7201 which is configured to intake shiftable input 7206 derived from input data (M1, M2) for a neural network operation, intake a shift instruction 7207 derived from a corresponding log quantized parameter 7203 of a neural network or a constant value such as const 0 as shown in FIG. 72; and shift the shiftable input in a left direction or a right direction according to the shift instruction 7207 (e.g. as illustrated in FIGS. 57 to 63) to form shifted output 7208 (Mout) representative of a multiplication of the input data with the corresponding log quantized parameter of the neural network. Such a shifter circuit 7201 can be any shifter circuit as known in the art, such as, but not limited to, a log shifter circuit or a barrel shifter circuit. As described herein, the input data can be scaled to form the shiftable input 7206 through the flows as illustrated in FIGS. 37 and 38. Such flows can be performed by dedicated circuitry, by a computer device, or by any other desired implementation.

In an example implementation as illustrated in FIGS. 57 to 62 based on the architecture of FIG. 72, the shift instruction can comprise a shift direction (e.g., 5705, 5905, 6005, 6205) and a shift amount (e.g., 5706, 5906, 6006, 6206), the shift amount derived from a magnitude of an exponent of the corresponding log quantized parameter (e.g., 5702, 5902, 6002, 6202), the shift direction derived from a sign of the exponent of the corresponding log quantized parameter; wherein the shifter circuit shifts the shiftable input in the left direction or the right direction according to the shift direction and shifts the shiftable input in the shift direction by an amount indicated by the shift amount as shown, for example at 5710, 5910, 6010, and 6210.

Although example implementations utilize a shift instruction as derived from the log quantized parameter as described herein, the present disclosure is not limited thereto and other implementations are also possible. For example, the shift instruction may be derived from data as input to shift a scaled parameter (e.g., scaled from floating point parameter, integer parameter, or otherwise) if desired. In such an example implementation, if log quantized data values are available, then the shift instruction can be similarly derived form the log quantized data value. For example, the shift amount can thereby be derived from a magnitude of an exponent of the corresponding log quantized data value, and the shift direction can be derived from a sign of the exponent of the corresponding log quantized value to generate shift instructions to shift a scaled parameter value. Such implementations are possible due to the operation being equivalent to a multiplication between the data and the parameter from shifting of a value by shift instruction derived from a log quantized value.

In an example implementation based on the architecture of FIG. 72 and the example implementations of FIGS. 57 to 62, the AIPE can further involve a circuit such as an XOR circuit (e.g., 5708, 5908) or any equivalent thereof configured to intake a first sign bit (5707, 5907) of the shiftable input and a second sign bit (e.g., 5704, 5904) of the corresponding log quantized parameter to form a third sign bit (e.g., 5711, 5911) for the shifted output.

Figure 73:
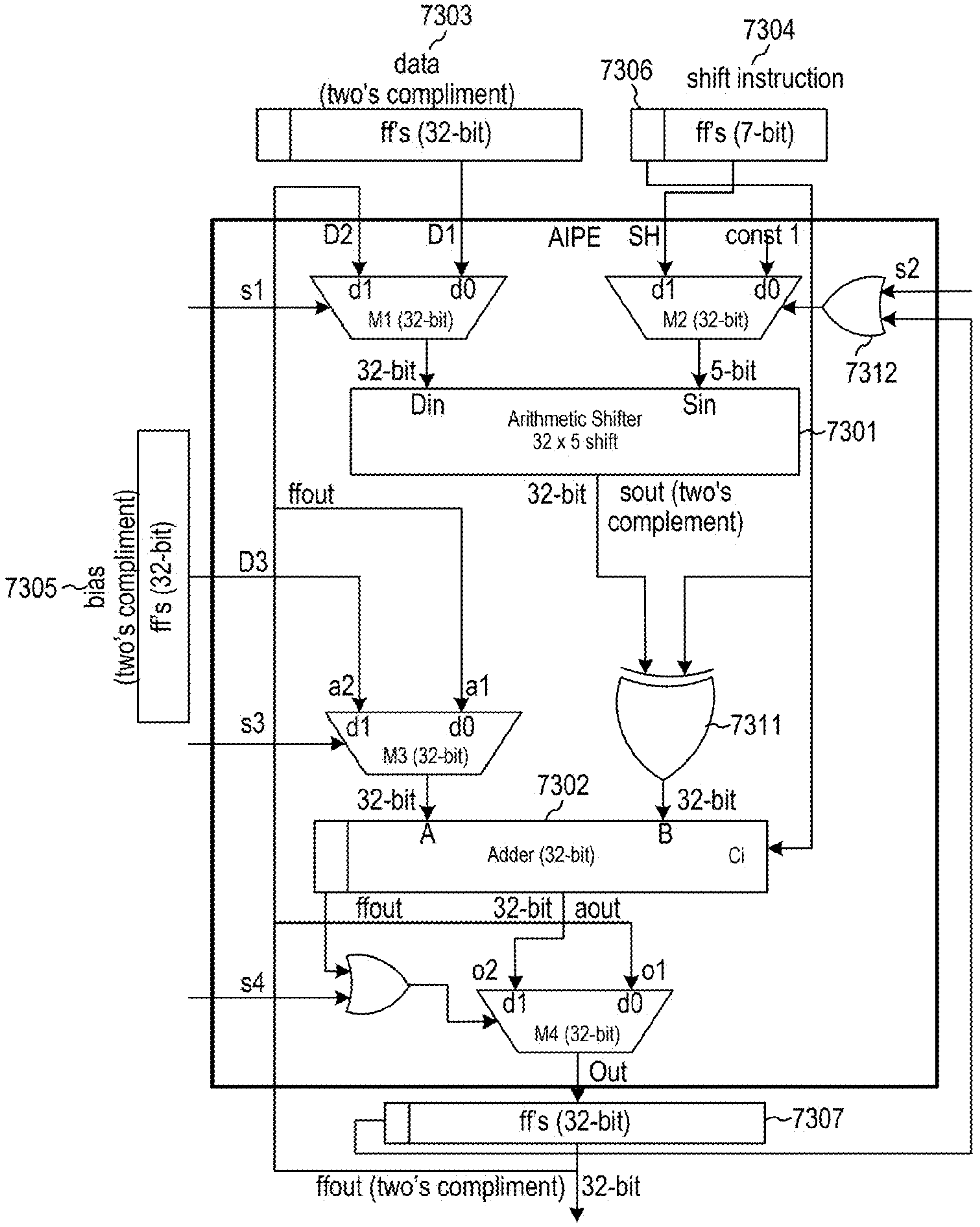
FIG. 73 illustrates an example of an AIPE having an arithmetic shift architecture, in accordance with an example implementation.
Figure 74:
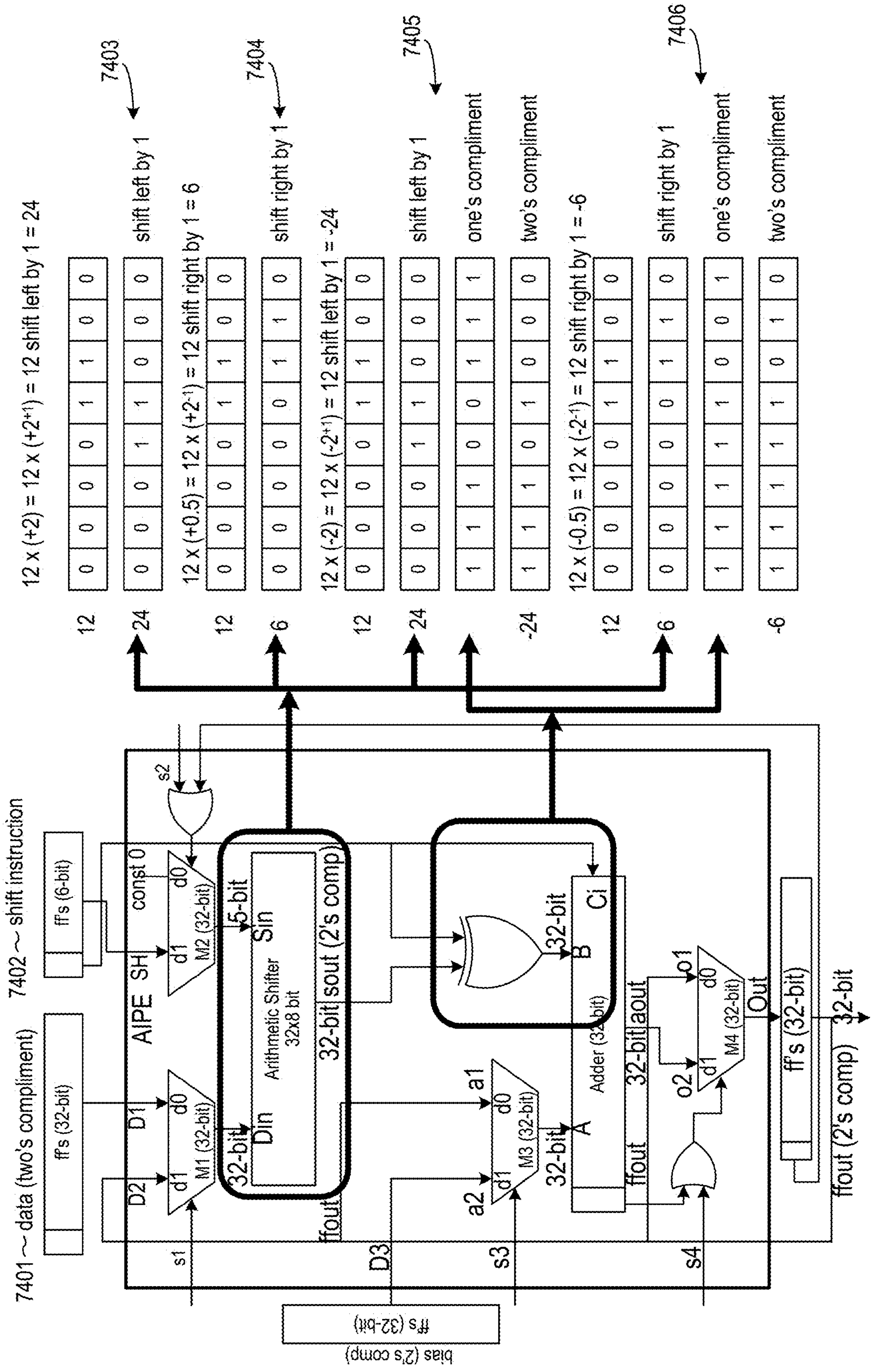
FIG. 74 illustrates examples of an AIPE shift operation to replace multiplication operation, in accordance with an example implementation.

In an example implementation based on the architecture of FIG. 72 as extended in the example of FIGS. 73 and 74, and the example implementations of FIGS. 57 to 64, the AIPE can further comprise a first circuit such as an XOR circuit (e.g., 6011, 6211, 7311) or equivalent thereof configured to intake the shifted output (e.g., 6010, 6210, 7310) and a sign bit (e.g., 6004, 6204, 7306) of the corresponding one of the log quantized parameters to form one's complement data (e.g., 7405, 7406); and a second circuit such as an incrementor/adder circuit (7204, 7302) configured to increment the one's complement data by the sign bit of the corresponding log quantized parameter to change the one's compliment data into two's complement data (e.g., 7405, 7406) that is representative of the multiplication of the input data with the corresponding log quantized parameter.

In an example implementation based on the architecture of FIG. 72 and as extended in the examples of FIGS. 73 to 82, the AIPE can comprise a circuit such as multiplexer 7210 or any equivalent thereof, configured to intake output of the neural network operation, wherein the circuit provides the shiftable input from the output (e.g., M2) of the neural network operation or from scaled input data (e.g., 7202, M1) generated from the input data for the neural network operation according to a signal input (s1) to the shifter circuit 7201. Such a circuit (e.g., multiplexer 7210) can intake a control signal (s1) to control which of the inputs to the circuit is provided to shifter circuit 7201.

In an example implementation based on the architecture of FIG. 72 and as extended in the examples of FIGS. 73 to 82, the AIPE can comprise a circuit such as a multiplexer 7211 configured to provide the shift instruction derived from the corresponding log quantized parameter of the neural network (e.g., K) or the constant value (e.g., const 0) according to a signal input (s2).

In an example implementation based on the architecture of FIG. 72 and as extended in the examples of FIGS. 73 to 82, the AIPE can comprise an adder circuit 7204, 7302 coupled to the shifter circuit, the adder circuit 7204, 7302, 7608 configured to add based on the shifted output to form output (e.g., Out, aout) for the neural network operation. Such an adder circuit 7204, 7302, 7608 can take the form of one or more shifters, an integer adder circuit, a floating point adder circuit, or any equivalent circuit thereof in accordance with the desired implementation.

In an example implementation based on the architecture of FIG. 72 and as extended in the examples of FIGS. 73 to 82, the adder circuit 7204, 7302, 7608 is configured to add the shifted output with a corresponding one of a plurality of bias parameters 7305 of the trained neural network to form the output (aout) for the neural network operation.

In an example implementation based on the architecture of FIG. 72 and as extended in the example implementations of FIGS. 62 to 72, the AIPE can comprise another shifter circuit 7204; and a register circuit such as output flip flops 7205 and/or multiplexer 7209, or equivalents thereof coupled to the another shifter circuit 7204 that latches output (Out) from the another shifter circuit. As illustrated, for example, in FIG. 70, the another shifter circuit 7204 is configured to intake a sign bit S associated with the shifted output and each segment of the shifted output to shift another shifter circuit input left or right based on the sign bit to form the output from the another shifter circuit.

In an example implementation based on the architecture of FIG. 72 and as extended in the example implementations of FIGS. 62 to 72, the AIPE can comprise a counter such as an overflow counter (e.g., 6502, 6505) configured to intake an overflow or underflow (e.g., 6503, 6506) from the another shifter circuit resulting from the shift of the another shifter circuit input by the shifter circuit; wherein the another shifter circuit is configured to intake the overflow or the underflow from each segment to shift a subsequent segment left or right by an amount of the overflow or the underflow as illustrated in FIGS. 65 and 70. Such a counter can be implemented in accordance with the desired implementation with any circuit as known in the art.

In an example implementation based on the architecture of FIG. 72, the AIPE can comprise a one-hot to binary encoding circuit such as the circuit 6710 or any equivalent thereof that provides the functions of FIG. 67 and FIG. 70. The one-hot to binary encoding circuit is configured to intake the latched output to generate an encoded output, and concatenate the encoded output from all segments and a sign bit from a result of an overflow or an underflow operation to form the output for the neural network operation (6701 to 6706).

In an example implementation based on the architecture of FIG. 72, the AIPE can comprise a positive accumulate shifter circuit 6302 comprising a second shifter circuit configured to intake each segment of the shifted output to shift positive accumulate shifter circuit input left for a sign bit associated with the shift instruction being indicative of a positive sign; the second shifter circuit coupled to a first register circuit configured to latch the shifted positive accumulate shifter circuit input from the second shifter circuit as first latched output, the first register circuit configured to provide the first latched output as the positive accumulate shifter circuit input for receipt of a signal indicative of the neural network operation not being complete; a negative accumulate shifter circuit 6303 comprising a third shifter circuit configured to intake the each segment of the shifted output to shift negative accumulate shifter circuit input left for the sign bit associated with the shift instruction being indicative of a negative sign; the third shifter circuit coupled to a second register circuit configured to latch the shifted negative accumulate shifter circuit input from the from the third shifter circuit as second latched output, the second register circuit configured to provide the second latched output as the negative accumulate shifter circuit input for receipt of a signal indicative of the neural network operation not being complete; and an adder circuit 6903 configured to add based on the first latched output 6901 from the positive accumulator shifter circuit and the second latched output 6902 from the negative accumulator shifter circuit to form output of the neural network operation for receipt of the signal indicative of the neural network operation being complete.

Figure 81:
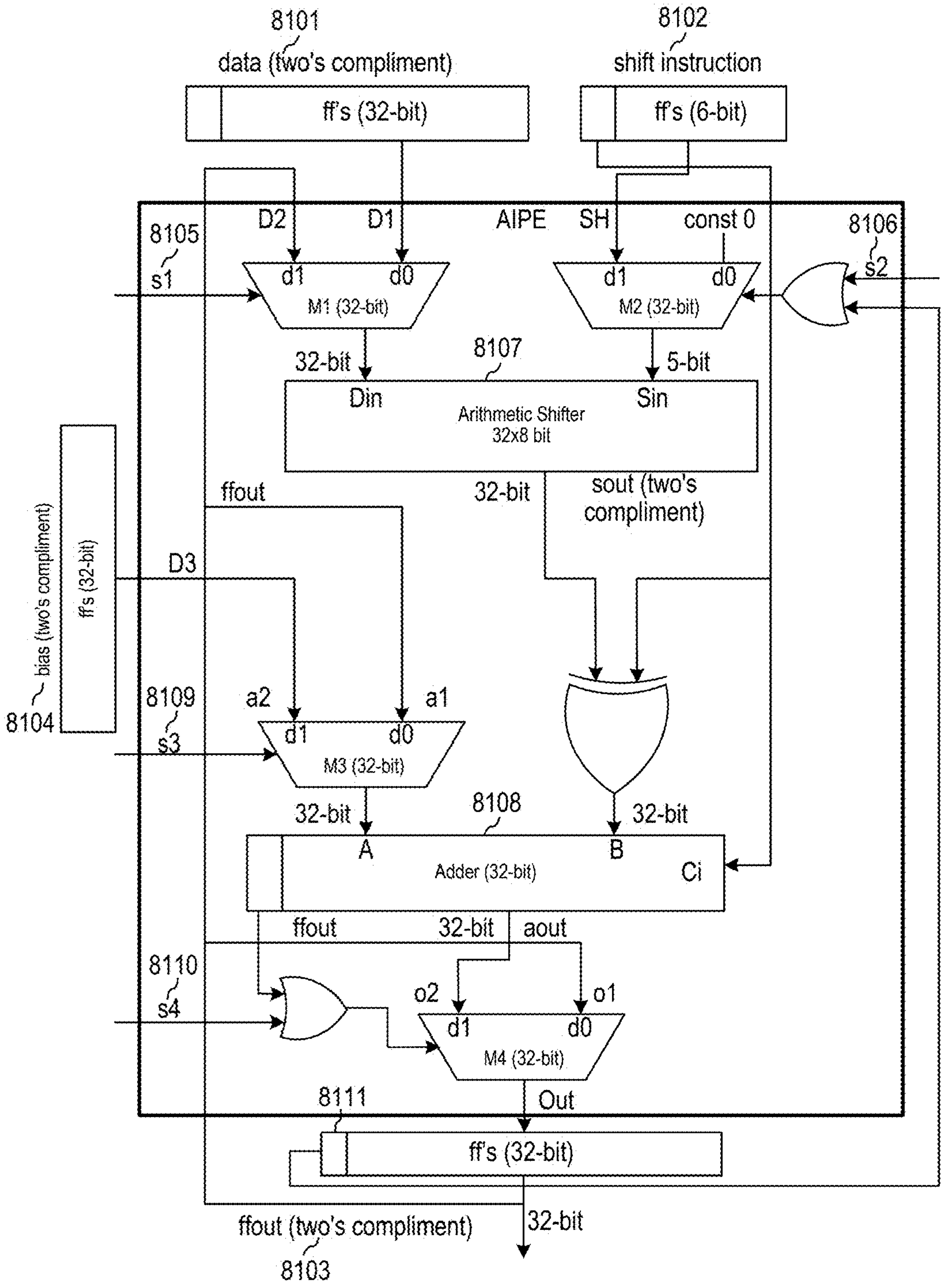
FIGS. 81 and 82 illustrate an example of an AIPE performing a Parametric ReLU operation, in accordance with an example implementation.

In an example implementation based on the architecture of the FIG. 72 and as extended in the example of FIG. 81, for the neural network operation being a parametric ReLU operation, the shifter circuit 8107 is configured to provide the shiftable input as the shifted output without executing a shift for a sign bit of the shiftable input being positive.

FIG. 73 illustrates an example of an AIPE having an arithmetic shift architecture, in accordance with an example implementation. The AIPE of FIG. 73 utilizes an arithmetic shifter 7301 and an adder 7302 to process neural network operations, such as but not limited to convolution, dense layer, ReLU, parametic ReLU, batch normalization, max pooling, addition, and/or multiplication. The arithmetic shifter 7301 receives, as input, data 7303 and shift instruction 7304 derived from log quantizing parameter. The data 7303 may comprise 32-bit data based in two's compliment, while the shift instruction 7304 may comprise 7-bit data. The arithmetic shifter 7301 may comprise a 32-bit arithmetic shifter. The arithmetic shifter 7301 shifts the data 7303 based on the shift instruction 7304. The output of the arithmetic shifter 7301 goes through a circuit that makes the output into a two's compliment data and then is added with a bias 7305. The bias 7305 may comprise a 32-bit bias. The adder 7302 receives three inputs, output of multiplexor (mux) M3 and the output of the XOR 7311, and one carry in input (Ci) from the sign bit 7306 of the shift instruction 7304. The adder adds the two inputs and the carry-in input together to form the output, aout that goes into the mux M4. The output of mux M4 is latched by the flip flop 7307. The output of the flip flop 7307 then can be fed back into the mux M1 for another neural network operation, and the sign bit of the ffout from the flip flop 7307 can be used for the OR circuit 7312 to control the mux M2 to choose between the shift instruction 7304 or a constant 1.

FIG. 74 illustrates an example of an AIPE operation using a shifter and an adder, in accordance with an example implementation. The AIPE uses the shift operation to replace multiplication. For example, if data 7401 has a value of 12 and shift instruction 7402, derived from log quantized parameter, has a value of +2, the multiplication of the data and shift instruction is 12×(+2), which may be written as $12\times(+2^{+1})$ where $(+2^{+1})$ is the log quantized parameter. The sign of the exponent of the parameter is positive (+) which means the shift direction is left, and the magnitude of the exponent is 1 which means that the shift amount is 1. As such, the data 12 is shifted to the left by 1. Shifting the data 12 to the left by 1, results in 24, as shown in 7403 of FIG. 74. In another example, the data 7401 has a value of 12, while the shift instruction 7402 has a value of +0.5. The multiplication of the data and shift instruction is 12×(+0.5), which may be written as $12\times(+2^{+1})$ where $(+2^{+1})$ is the log quantized parameter. The sign of the exponent of the parameter is negative (−) which means the shift direction is right, and the magnitude of the exponent is 1 which means that the shift amount is 1. As such, the data 12 is shifted to the right by 1. Shifting the data 12 to the right by 1, results in 6, as shown in 7404 of FIG. 74. In another example, the data 7401 has a value of 12 and the shift instruction 7402 has a value of −2, the multiplication of the data and shift instruction is 12×(−2), which may be written as $12\times(-2^{+1})$ where $(-2^{+1})$ is the log quantized parameter. The sign of the exponent of the parameter is positive (+) which means the shift direction is left, and the magnitude of the exponent is 1 which means that the shift amount is 1. As such, the data 12 is shifted to the left by 1. However, the base of the parameter has a negative value, as such the shifted value encounters a two's compliment procedure to result in −24, as shown in 7405 of FIG. 74. In another example, the data 7401 has a value of 12 and the shift instruction 7402 has a value of −0.5. The multiplication of the data and shift instruction is 12×(−0.5), which may be written as 12×(−0.5-1) where (−0.5-1) is the log quantized parameter. The sign of the exponent of the parameter is negative (−) which means the shift direction is right, and the magnitude of the exponent is 1 which means that the shift amount is 1. As such, the data 12 is shifted to the right by 1. However, the base of the parameter has a negative value, as such the shifted value encounters a two's compliment procedure to result in −6, as shown in 7406 of FIG. 74.

Figure 75:
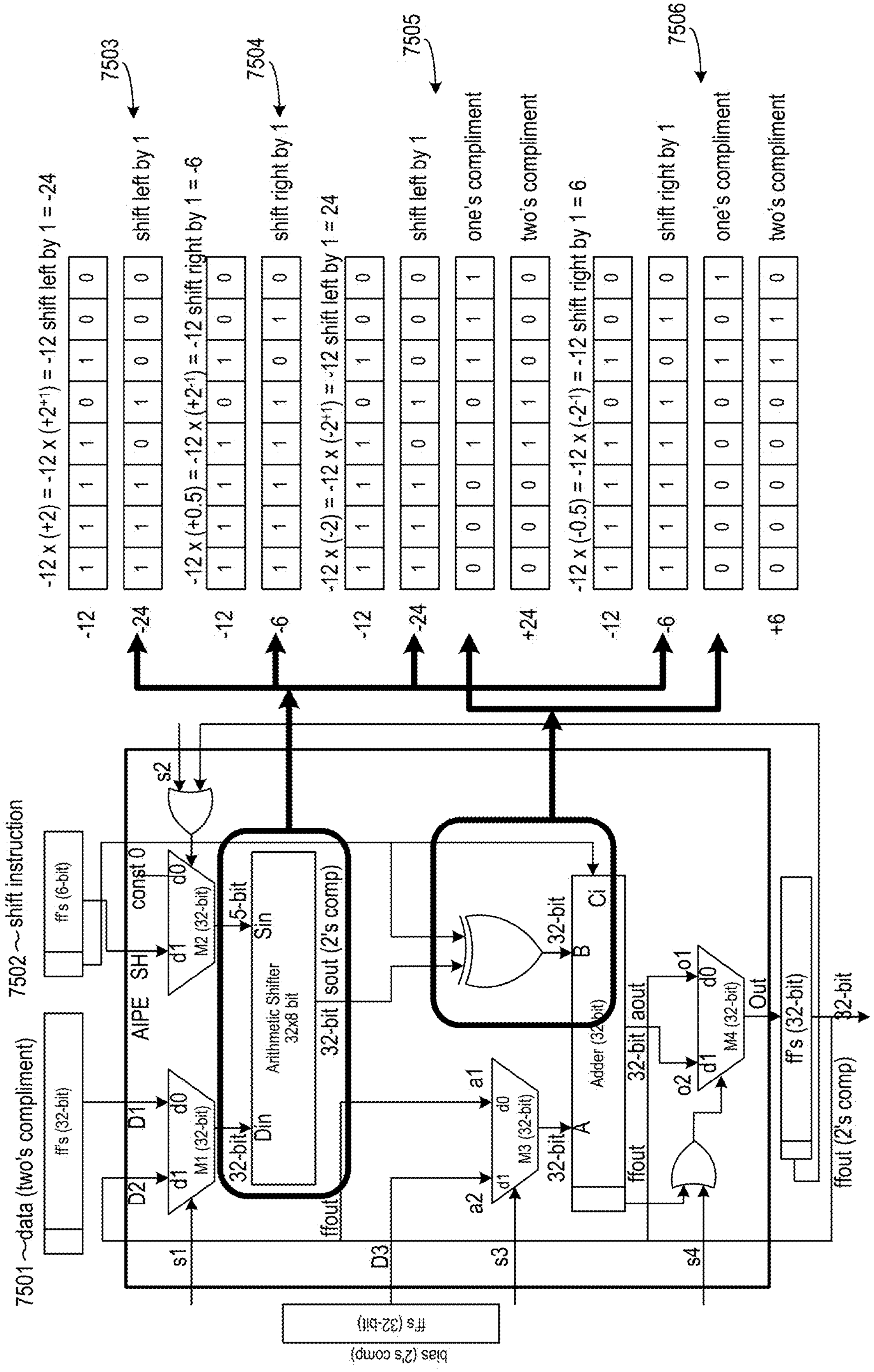
FIG. 75 illustrates examples of an AIPE shift operation to replace multiplication operation, in accordance with an example implementation.

FIG. 75 illustrates an example of an AIPE operation using a shifter and an adder, in accordance with an example implementation. The AIPE uses the shift operation to replace multiplication. For example, if data 7501 has a value of −12 and shift instruction 7502, derived from log quantized parameter, has a value of +2, the multiplication of the data and shift instruction is −12×(+2), which may be written as $-12\times(+2^{+1})$ where $(+2^{+1})$ is the log quantized parameter. The sign of the exponent of the parameter is positive (+) which means the shift direction is left, and the magnitude of the exponent is 1 which means that the shift amount is 1. As such, the data −12 is shifted to the left by 1. Shifting the data−12 to the left by 1, results in −24, as shown in 7503 of FIG. 75. In another example, the data 7501 has a value of −12, while the shift instruction 7502 has a value of +0.5. The multiplication of the data and shift instruction is −12×(+0.5), which may be written as $-12\times(+2^{+1})$ where $(+2^{+1})$ is the log quantized parameter. The sign of the exponent of the parameter is negative (−) which means the shift direction is right, and the magnitude of the exponent is 1 which means that the shift amount is 1. As such, the data−12 is shifted to the right by 1. Shifting the data−12 to the right by 1, results in −6, as shown in 7504 of FIG. 75. In another example, the data 7501 has a value of −12 and the shift instruction 7502 has a value of −2, the multiplication of the data and shift instruction is −12×(−2), which may be written as $-12\times(-2^{+1})$ where $(-2^{+1})$ is the log quantized parameter. The sign of the exponent of the parameter is positive (+) which means the shift direction is left, and the magnitude of the exponent is 1 which means that the shift amount is 1. As such, the data−12 is shifted to the left by 1. However, the base of the parameter has a negative value, as such the shifted value encounters a two's compliment procedure to result in +24, as shown in 7505 of FIG. 75. In another example, the data 7501 has a value of −12 and the shift instruction 7502 has a value of −0.5. The multiplication of the data and shift instruction is −12×(−0.5), which may be written as −12×(−0.5-1) where (−0.5-1) is the log quantized parameter. The sign of the exponent of the parameter is negative (−) which means the shift direction is right, and the magnitude of the exponent is 1 which means that the shift amount is 1. As such, the data−12 is shifted to the right by 1. However, the base of the parameter has a negative value, as such the shifted value encounters a two's compliment procedure to result in +6, as shown in 7506 of FIG. 75.

Figure 76:
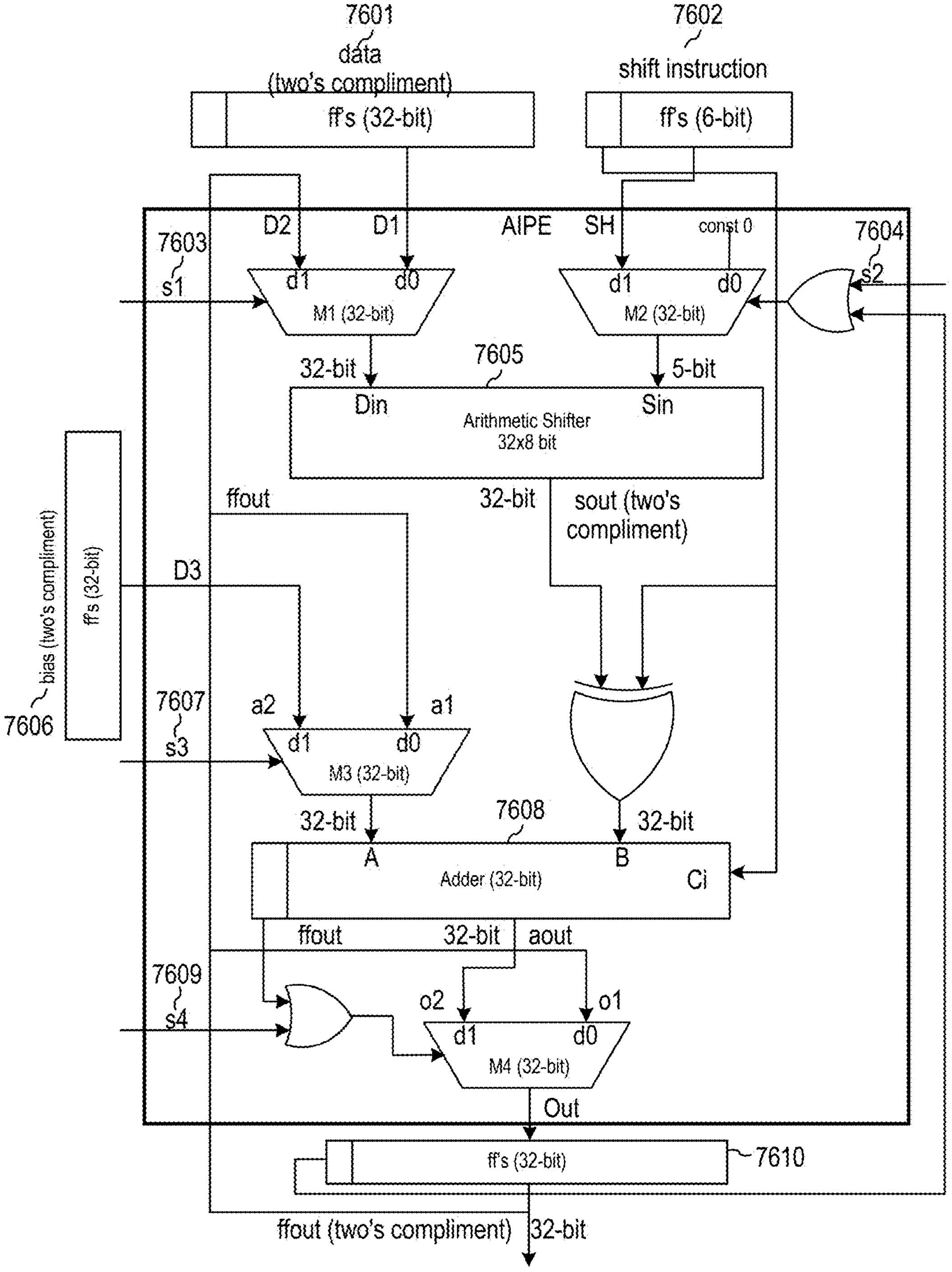
FIGS. 76-78 illustrate an example of an AIPE performing a convolution operation, in accordance with an example implementation.
Figure 77:
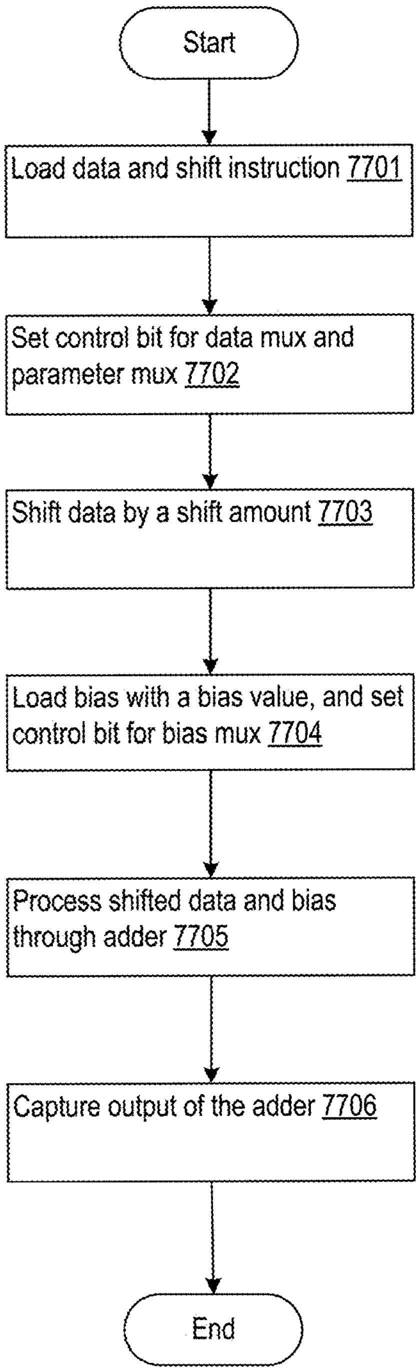
Figure 78:
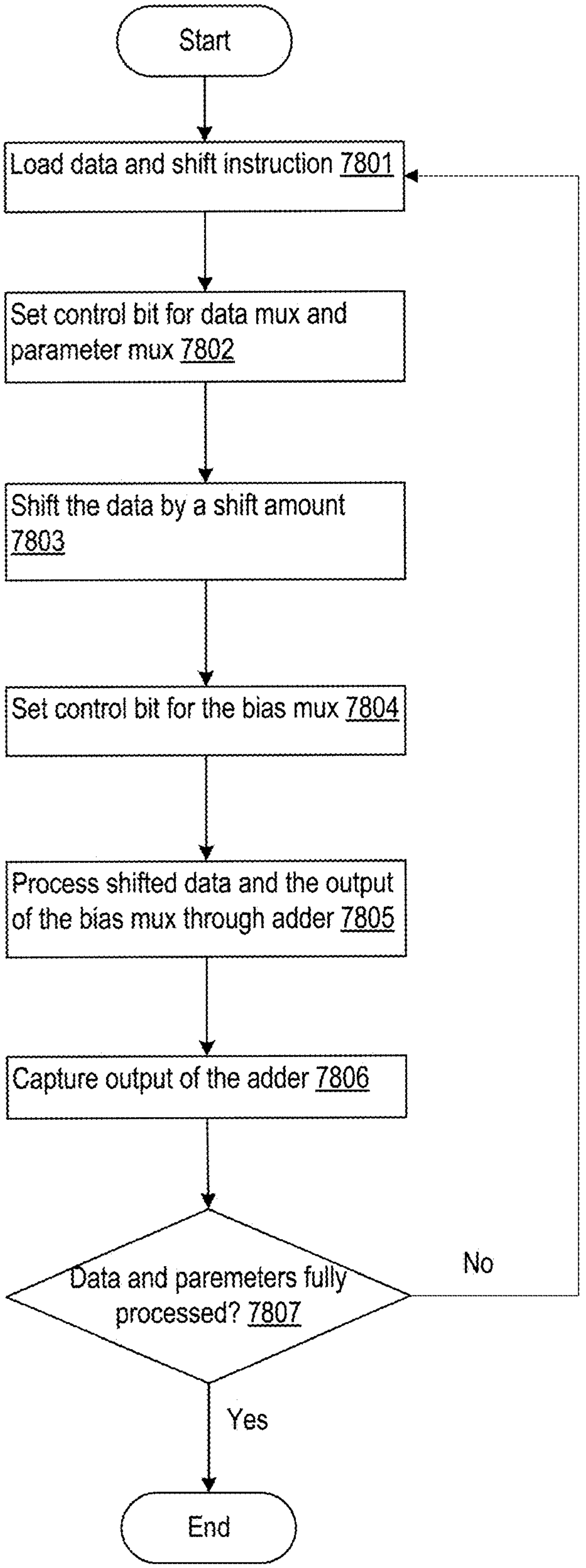

FIGS. 76, 77, and 78 illustrate an example of an AIPE performing a convolution operation, in accordance with an example implementation. Specifically, FIG. 76 illustrates an example of the AIPE architecture configured to perform the convolution operation, FIG. 77 illustrates an example flow of an initial cycle of the convolution operation, and FIG. 78 illustrates an example flow of subsequent cycles of the convolution operation. The AIPE may perform the convolution operation using an arithmetic shifter.

At 7701, for the initial cycle of the convolution operation, the flow loads the data 7601 and the shift instruction 7602 derived from log quantizing the corresponding parameter. The data 7601 may include a plurality of data values (X1, X2, . . . X9) as an example. The shift instruction SH 7602 may be derived from parameter values (K1, K2, . . . K9) to form shift instructions (SH1, SH2, . . . SH9) corresponding to each such parameter values. In the example of FIG. 76, the data 7601 and shift instruction 7602 have 9 values, but the disclosure is not intended to be limited to the examples disclosed herein. The data 7601 and shift instruction 7602 may have one or more values. In the initial cycle of the convolution operation the flow loads X1 into data 7601 and SH1 into shift instruction 7602.

At 7702, the flow sets a control bit for the data mux M1 and a control bit for the parameter mux M2. The control bit 7603 for the data 7601 may be set to 0. The control bit 7604 for the parameter may be set to 1.

At 7703, the flow shifts the data by the shift instruction. The data 7601 and the shift instruction 7602, derived from the log quantized parameter, are fed into an arithmetic shifter 7605, and the arithmetic shifter 7605 shifts the data 7601 by the shift amount based on the shift instruction 7602. Then the output of the arithmetic shifter 7605 is converted to two's complement data. The output of the arithmetic shifter 7605 is fed into an adder 7608. At this point, the output of the arithmetic shifter 7605 comprises the value (X1*K1) of the first cycle of the convolution process. However, the value of the first cycle of the convolution process is obtained using the arithmetic shifter 7605, and not by using a multiplication operation. The convolution process is the sum of the product of each data and parameter (X1*K1+X2*K2+ . . . +X9*K9).

At 7704, the flow loads a bias with a bias value, and sets a control bit for the bias mux M2. The bias 7606 is loaded with the bias value, and the bias control bit 7607 is set to 1. The bias 7606 loaded with the bias value is fed into the adder 7608.

At 7705, the flow processes the shifted data and the bias through the adder. The output of the arithmetic shifter 7605 or shifted data is added with the bias 7606 by the adder 7608. In the first cycle of the convolution process, the bias is added.

At 7706, the flow captures the output of the adder. The output of the adder 7608 is sent to a flip flop 7610 and is captured.

At 7801, for subsequent cycles of the convolution operation, the flow loads the data and the shift instruction derived from log quantizing parameter. For example, after the initial cycle, the flow loads the data 7601 with X2 and the shift instruction 7602 with SH2 for the second cycle. In subsequent cycles, the output of the previous cycle is fed back into the bias mux M3 for the subsequent cycle. For example, in the second cycle, the captured output of the adder of the first cycle is sent by the flip flop 7610 to the bias mux M3 for the input to the adder 7608.

At 7802, the flow sets the control bit for the data mux and the control bit for the parameter mux. The control bit 7603 for the data 7601 may be set to 0. The control bit 7604 for the parameter may also be set to 1.

At 7803, the flow shifts the data by a shift instruction. The data 7601 and the shift instruction 7602 derived from the log quantized parameter of the subsequent cycle are fed into an arithmetic shifter 7605, and the arithmetic shifter 7605 shifts the data 7601 by the shift amount based on the shift instruction 7602. Then the output of the arithmetic shifter 7605 is converted to two's complement. The output of the arithmetic shifter 7605 is fed into an adder 7608. At this point, the output of the arithmetic shifter 7605 comprises the value (X2*K2) of the second cycle of the convolution process. However, the value of the second cycle and subsequent cycles of the convolution process is obtained using the arithmetic shifter 7605, and not by using a multiplication operation.

At 7804, the flow sets a control bit for the bias mux. In the second cycle (and in subsequent cycles), the bias control bit 7607 is set to 0 so that the bias mux M3 selects the output of the previous operation that is fed back.

At 7805, the flow processes the shifted data and the output of the bias mux through the adder. The output of the arithmetic shifter 7605 or shifted data is added with the output of the bias mux by the adder 7608. However, in the second and subsequent cycles of the convolution process, the bias control bit 7609 being set to 0 allows the feedback from the flip flop 7610 (the output of the adder of the previous cycle) to pass through the multiplexor M4. As such, at this point of the second cycle, the output of the adder of the first cycle is added with the output of the arithmetic shifter 7605 of the second cycle to have the sum of the product of the data and shift instruction for the first and second cycles of the convolution process (b+X1*SH1+X2*SH2).

At 7806, the flow captures the output of the adder. The output of the adder 7608 is sent to a flip flop 7610 and is captured.

At 7807, the flow continues the process of 7801-7806 for each data and shift instruction, until all of the data and shift instructions have been processed.

Figure 79:
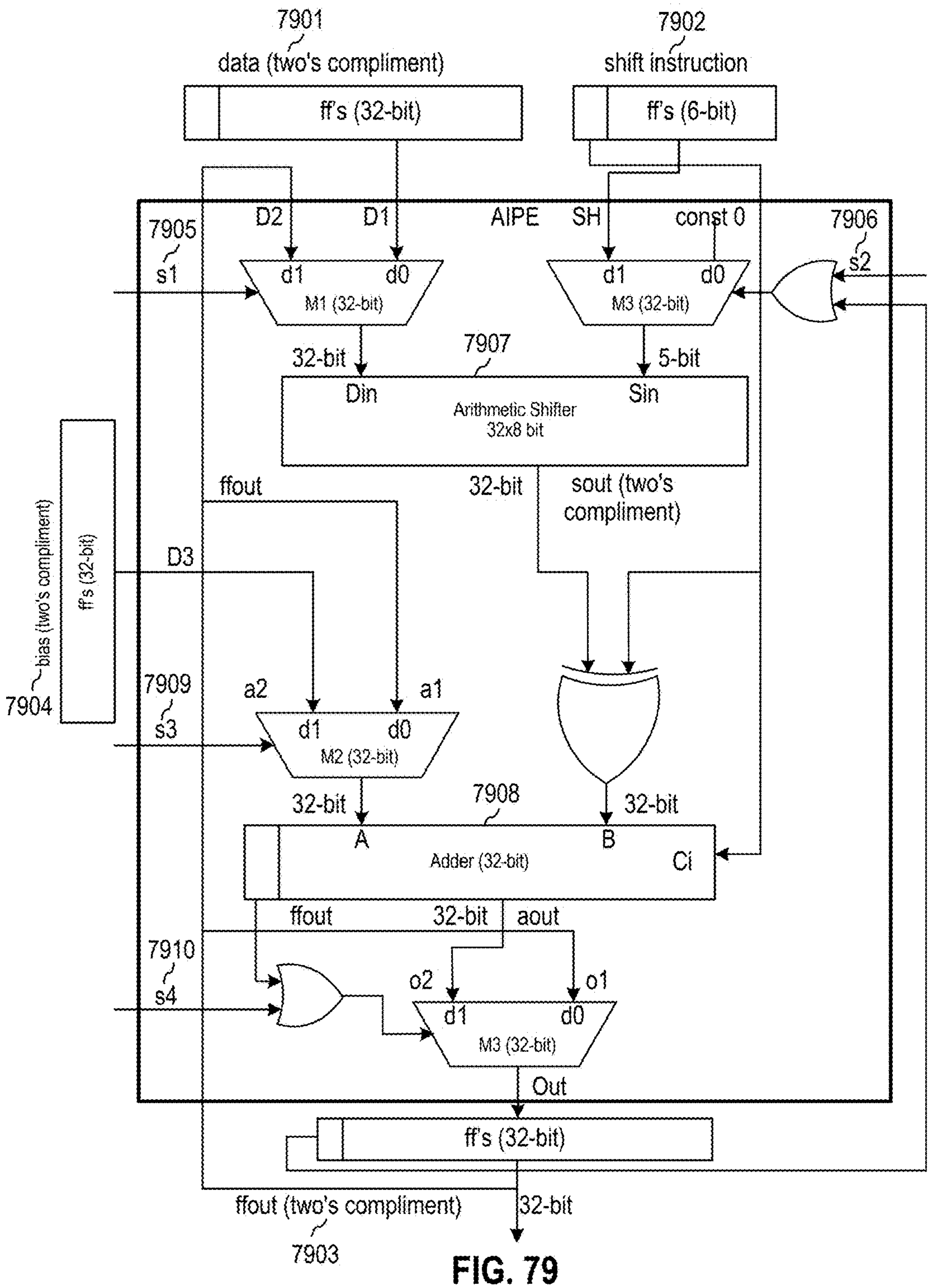
FIGS. 79 and 80 illustrate an example of an AIPE performing a batch normalization operation, in accordance with an example implementation.
Figure 80:
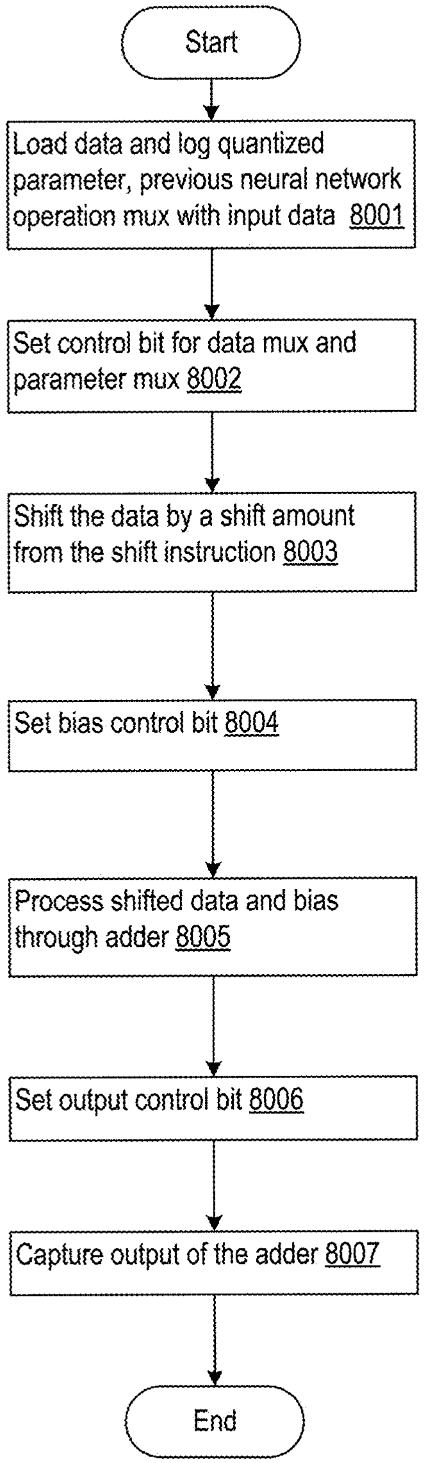

FIGS. 79 and 80 illustrate an example of an AIPE performing a batch normalization operation, in accordance with an example implementation. Specifically, FIG. 79 illustrates an example of the AIPE architecture configured to perform the batch normalization operation, and FIG. 80 illustrates an example flow of the AIPE performing the batch normalization operation. The AIPE may perform the batch normalization operation using an arithmetic shifter. In the example of FIG. 79, the data=X, the parameter=γ,β, and the batch normalization may correspond to:

$$\text{batch\_norm} = \gamma\frac{(X-n)}{\sigma+\varepsilon} - \beta$$

-continued $$\text{batch\_norm} = \frac{\gamma}{\sigma+\varepsilon}X - \frac{\gamma}{\sigma+\varepsilon}n - \beta$$

$$\text{batch\_norm} = aX + b, \text{ where } a = \frac{\gamma}{\sigma+\varepsilon} \text{ and } b = -\frac{\gamma}{\sigma+\varepsilon}n - \beta$$

At 8001, the flow loads the data and the log quantized parameter. The data 7901 and shift instruction 7902 derived from the log quantized parameter are loaded, while the output of the previous neural network operation is also available and multiplexed with the input data 7901. The flow may also load the bias. In the example of FIG. 79, the $$a = \frac{\gamma}{\sigma+\varepsilon}$$

may be log quantized and loaded to SH of the shift instruction 7902, and $$b = -\frac{\gamma}{\sigma+\varepsilon}n - \beta$$

may be loaded to D3 of bias 7904. The data and the log quantized parameter are fed into an arithmetic adder 7907.

At 8002, the flow sets a control bit for the data mux and a control bit for the parameter mux. The control bit 7905 for the data mux 7901 may be set to 0 if the loaded data 7901 is used, and set to 1 if the output of the previous neural net operation is used. The control bit 7906 for the parameter may also be set to 1.

At 8003, the flow shifts the data by the shift instruction. The data 7901 multiplexed with the feedback from the flip flop 7903 and the shift instruction 7902, derived from log quantized parameter, are fed into the arithmetic shifter 7907. The arithmetic shifter 7907 shifts the data by the shift instruction based on the log quantized parameter. Then the output of the arithmetic shifter 7907 is converted to two's complement. The output of the arithmetic shifter 7907 is fed into an adder 7908.

At 8004, the flow sets a control bit for the bias mux. The bias control bit 7909 may be set to 1. Setting the bias sign bit 7909 to 1 allows the bias loaded value at D3 to be provided to the adder 7908.

At 8005, the flow processes the shifted data and the bias through the adder. The output of the arithmetic shifter 7907 or shifted data is added with the bias 7904 by the adder 7908 to complete the batch normalization operation. The output of the adder 7908 is sent to the flip flop 7903.

At 8006, the flow sets an output control bit. The output control bit 7910 may be set to 1. The output control bit 7910 being set to 1 allows the output of the adder 7908 to be sent to the flip flop to be captured.

At 8007, the flow captures the output of the adder. The output of the adder 7908 is captured by the flip flop 7903 based in part on the output control bit 7910 being set to 1.

Figure 82:
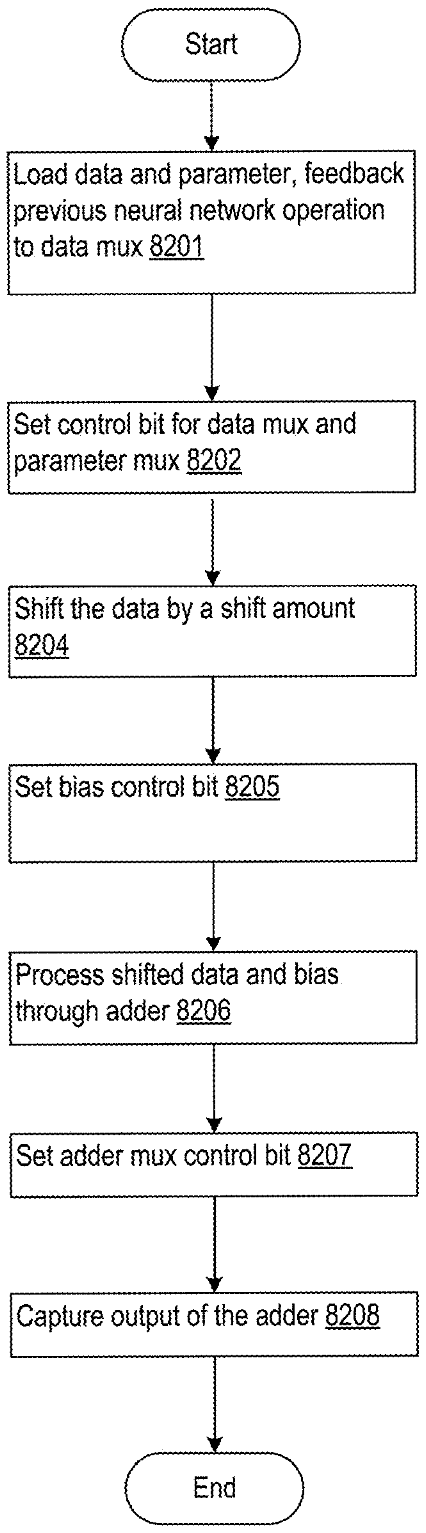

FIGS. 81 and 82 illustrate an example of an AIPE performing a Parametric ReLU operation, in accordance with an example implementation. Specifically, FIG. 81 illustrates an example of the AIPE architecture configured to perform the Parametric ReLU operation, and FIG. 82 illustrates an example flow of the AIPE performing the Parametric ReLU operation. The AIPE may perform the Parametric ReLU operation using an arithmetic shifter. In the example of FIG. 81, the data=X, the log quantized parameter=a. The Parametric ReLU's function is Y=X, if X>0, or Y=a*X if X<0.

At 8201, the flow loads the data and the log quantized parameter, and the feedback from the previous neural network operation is also available as D2 which inputs to the data mux M1. The data 8101 and shift instruction 8102, derived from log quantized parameter, are loaded, while the output of the previous neural network operation within the flip flop 8103 is fed back into the AIPE and multiplexed with the data 8101. The flow may also load the bias. The bias 8104 may be loaded with constant 0 at D3 for this example.

At 8202, the flow sets a control bit for the data mux and a control bit for the parameter mux. The control bit 8105 for the data 8101 may be set to 1. The control bit 8106 for the shift instruction 8102 may be set to 1. The control bit 8105 being set to 1 allows the feedback from flip flop 8103 to be chosen as the input to the shifter. The control bit 8106 being set to 1 allows the shift instruction 8102 to be chosen as the input to the arithmetic shifter 8107.

At 8204, the flow shifts the data by a shift instruction. The arithmetic shifter 8107 shifts the data 8101 by the shift instruction 8102 based on the log quantized parameter. Then, the output of the arithmetic shifter 8107 is converted to two's complement. The output of the arithmetic shifter 8107 is fed into an adder 8108.

At 8205, the flow sets a bias control bit. The bias control bit 8109 may be set to 1. Setting the bias control bit 8109 to 1 allows the bias loaded value at D3 to be provided to the adder 8108.

At 8206, the flow processes the shifted data and bias through the adder. The output of the arithmetic shifter 8107 or shifted data is added with the bias 8104 by the adder 8108 to complete the Parametric ReLU operation. The output of the adder 8108 is sent to the flip flop 8103.

At 8207, the flow sets an adder mux control bit. The adder mux control bit 8110 may be set to 1. Setting the adder mux control bit 8110 to 1 allows the output of the adder 8108 to pass through a multiplexor associated with the adder 8108 and fed into the flip flop 8103.

At 8208, the flow captures the output of the adder. The output of the adder 8108 passes through the multiplexor due to the adder mux control bit being set to 1, such that the flip flop 8103 is allowed to receive and capture the output of the adder 8108. The sign bit 8111 of the flip flop 8103 may be fed into an OR circuit for comparison against control bit 8106.

Figure 83:
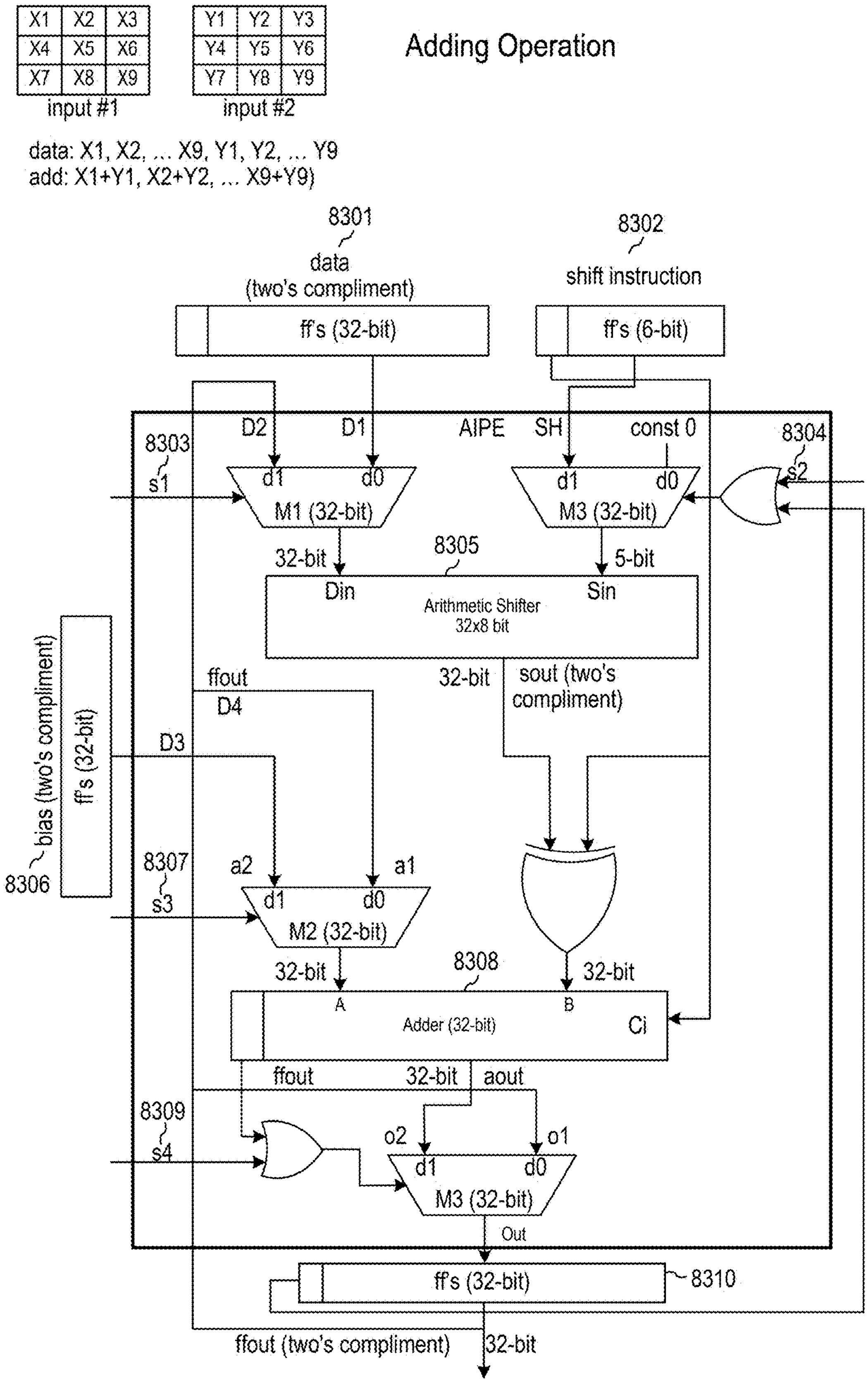
FIGS. 83 and 84 illustrate an example of an AIPE performing an addition operation, in accordance with an example implementation.
Figure 84:
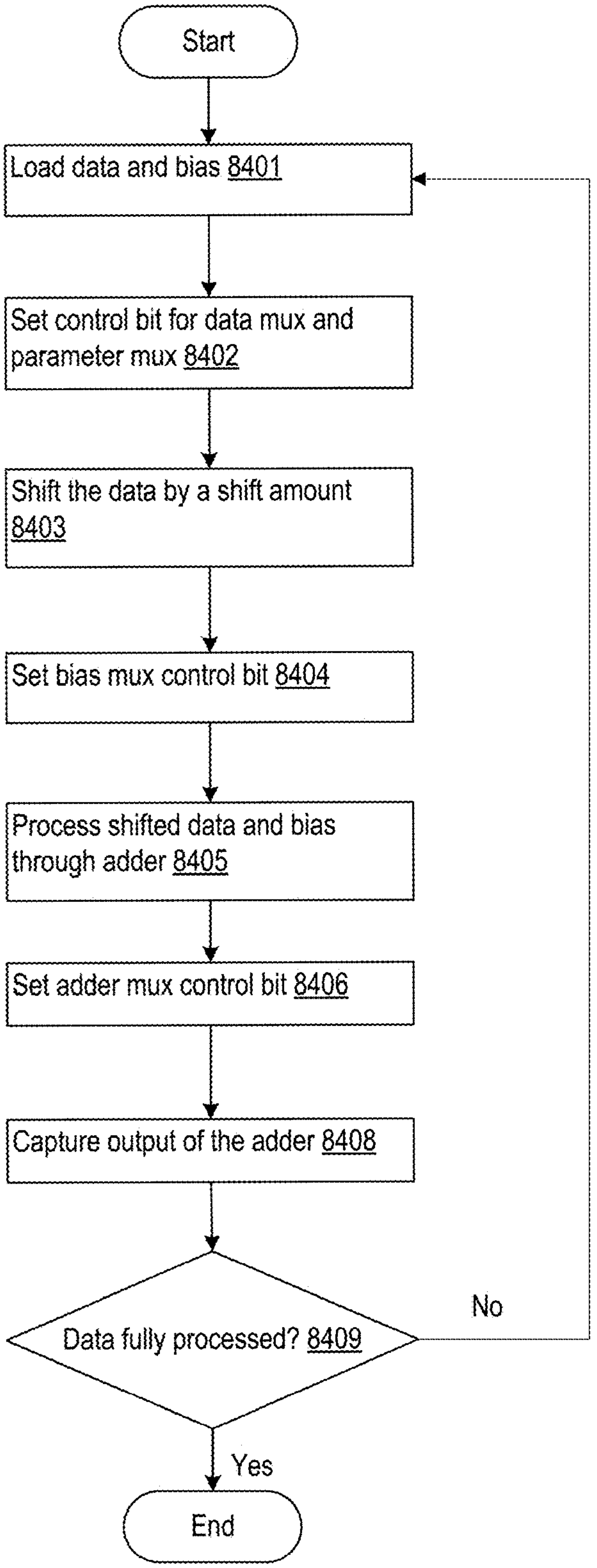

FIGS. 83 and 84 illustrate an example of an AIPE performing an addition operation, in accordance with an example implementation. Specifically, FIG. 83 illustrates an example of the AIPE architecture configured to perform the addition operation, and FIG. 84 illustrates an example flow of the AIPE performing the addition operation. In the example of FIG. 83, the data may comprise a first input comprising X1-X9 and a second input comprising Y1-Y9. The addition operation may add the first and second inputs such that the addition operation=X1+Y1, X2+Y2, X9+Y9.

At 8401, the flow loads data and bias. The data 8301 may be loaded with X1 at D1, while the bias 8306 may be loaded with Y1 at D3.

At 8402, the flow sets a control bit for data mux and a parameter mux. The control bit 8303 for the data 8301 may be set to 0. The control bit 8304 for the parameter 8302 may also be set to 0. The control bit 8303 being set to 0 allows the data 8301 (D1) to be fed to arithmetic shifter 8305. The control bit 8304 being set to 0 allows the constant 0 is fed into the arithmetic shifter 8305.

At 8403, the flow shifts the data by a shift instruction. The data 8301 and the parameter 8302 are fed into the arithmetic shifter 8305. The arithmetic shifter 8305 shifts the data by the shift amount based on the parameter 8302 which is the constant 0. Therefore, the output of the shifter is the same as the input data 8301 since the shifter shifted the data by among 0 which is same as no shifting. The output of the arithmetic shifter 8305 is fed into an adder 8308.

At 8404, the flow sets a bias mux control bit. The bias mux control bit 8307 may be set to 1. The bias mux control bit 8307 being set to 1 may allow for the bias 8306 at D3 to be provided to the adder 8308.

At 8405, the flow processes the shifted data and bias through the adder. The output of the arithmetic shifter 8305 or shifted data is added with the bias 8306 by the adder 8308 to perform the addition operation. The output of the adder 8308 is sent to the flip flop 8310.

At 8406, the flow sets an adder mux control bit. The adder mux control bit 8309 may be set to 1. The adder mux control bit 8309 being set to 1 allows the output of the adder 8308 to be provided to the flip flop 8310.

At 8407, the flow captures the output of the adder. The output of the adder 8308 is provided to the flip flop 8310, due in part to the adder mux control bit 8309 being set to 1. The flip flop 8310 captures the output of the adder 8308 at 8408.

At 8409, the flow continues the process of 8401-8408 for the remaining data, until all of the data has been processed.

Figure 85:
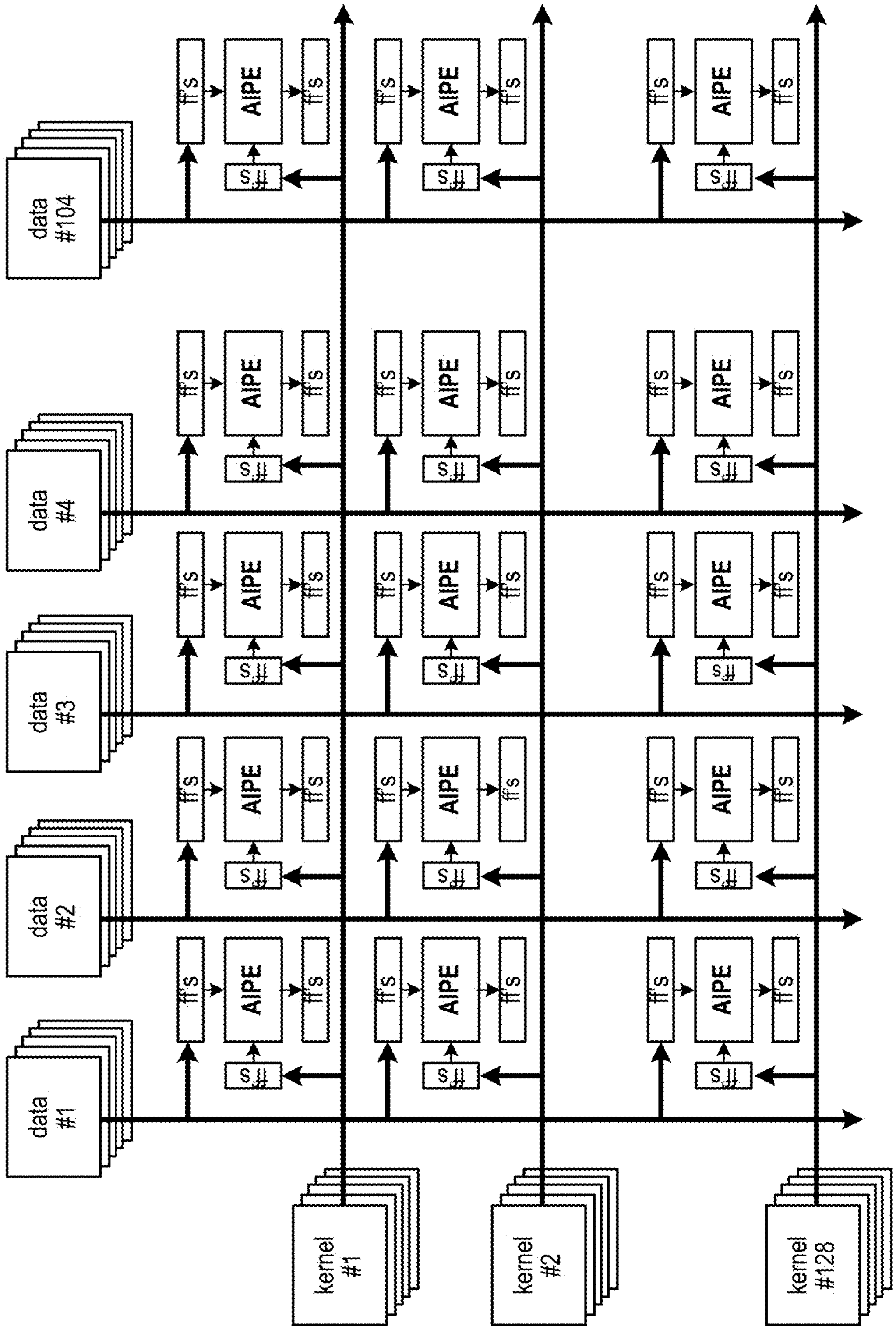
FIG. 85 illustrates an example of a NN2.0 array, in accordance with an example implementation.

FIG. 85 illustrates an example of a neural network array, in accordance with an example implementation. In the example of FIG. 85, the neural network array comprises a plurality of AI Processing Element (AIPEs) where data and log quantized parameters (kernels) are inputted into the AIPEs to perform the various operations, as disclosed herein. The AIPE architecture is configured to utilize shifters and logic gates. Examples disclosed herein comprise 32-bit data with 7-bit log quantized parameter, where data can be from 1-bit to N-bit and the log quantized parameter can be from 1-bit to M-bit parameter, where N and M are any positive integer. Some examples include a 32-bit shifter, however the number of shifters may be more than one and may vary from one shifter to O number of shifters where O is a positive integer. In some instances, the architecture comprises data 128-bit, log quantized parameter 9-bit, and 7 shifters connected in series—one after another. Also the logic gates that are shown in herein are a typical set of logic gates which can change depending on a certain architecture.

In some instances, the AIPE architecture may utilize shifters, adders, and/or logic gates. Examples disclosed herein comprise 32-bit data with 7-bit log quantized parameter, data can be from 1-bit to N-bit and the log quantized parameter can be from 1-bit to M-bit parameter, where N and M are any positive integer. Some examples include one 32-bit shifter, and one 32-bit two input adder, however the number of shifters and adders may be more than one and may vary from one shifter to O number of shifters and one adder to P number of adders where O and P are a positive integer. In some instances, the architecture comprises data 128-bit, parameter 9-bit, and 2 shifters connected in series, and 2 adders connected in series—one after another.

Figure 86A:
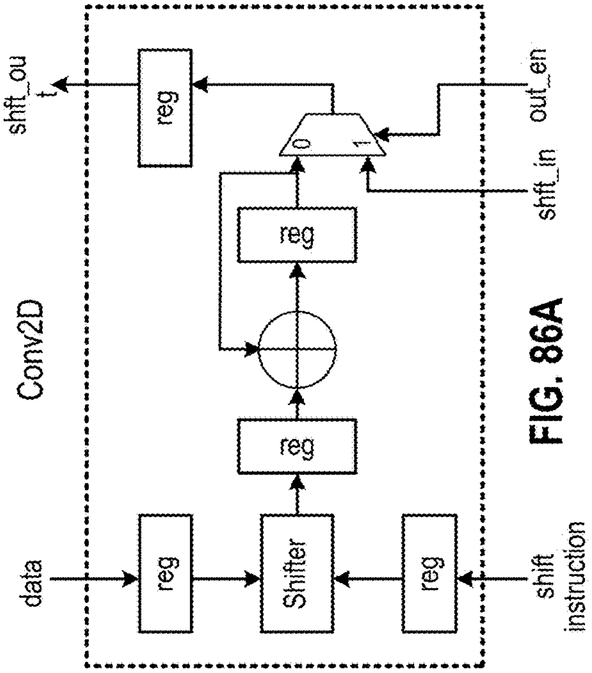
FIGS. 86A-86D illustrate examples of AIPE structures dedicated to each neural network operation, in accordance with an example implementation.
Figure 86B:
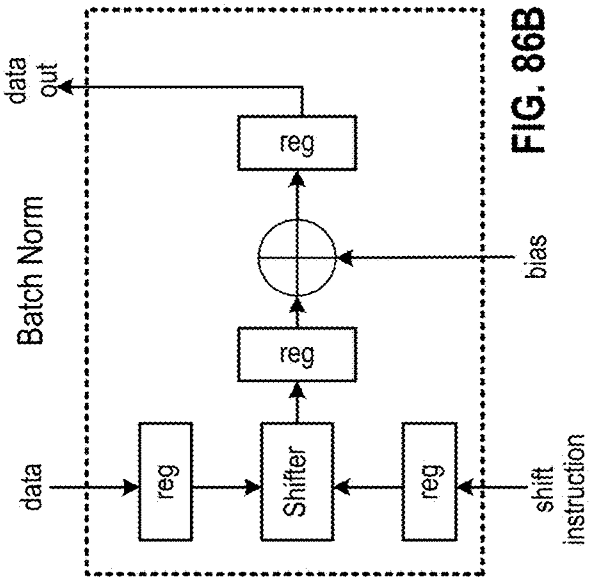
Figure 86C:
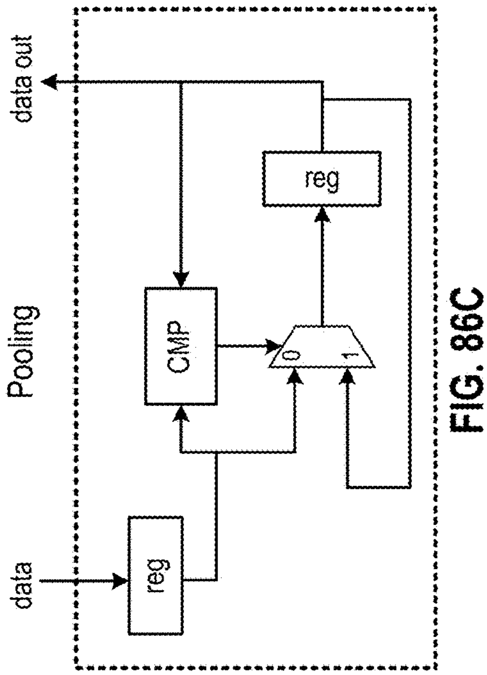
Figure 86D:
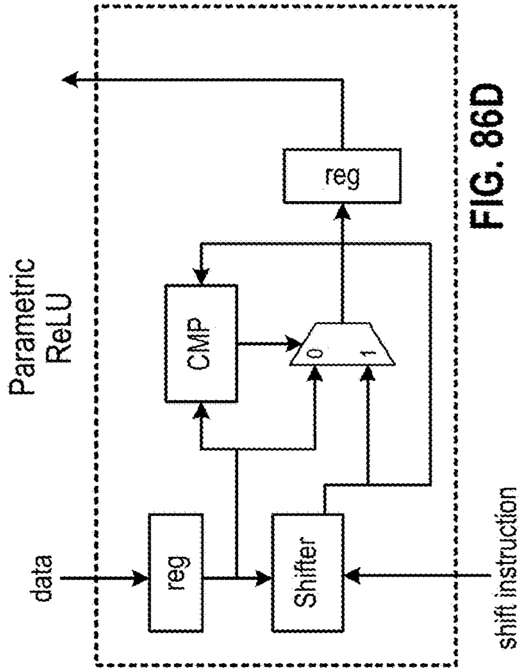

FIGS. 86A, 86B, 86C, and 86D illustrate examples of AIPE structures dedicated to each specific neural network operation, in accordance with an example implementation. Specifically, FIG. 86A illustrates an example of an AIPE structure configured to perform a convolution operation, FIG. 86B illustrates an example of an AIPE structure configured to perform a batch normalization operation, FIG. 86C illustrates an example of an AIPE structure configured to perform a pooling operation, and FIG. 86D illustrates an example of an AIPE structure configured to perform a Parametric ReLU operation. The AIPE structure comprises four different circuits, where each circuit is dedicated to perform the convolution operation, the batch normalization operation, the pooling operation, and the parametric ReLU operation. In some instances, the AIPE structure may comprise more or less than four different circuits, and is not intended to be limited to the examples disclosed herein. For example, the AIPE structure may comprise multiple circuits where each circuit is dedicated to perform a respective neural network operation.

The circuit of FIG. 86A, in order to perform the convolution operation, has data coming in and gets registered in a register. The circuit also receives the kernel, which is a shift instruction derived from the log quantized parameter, and also gets registered. Then the first shift operation is performed by the shifter, based on the shift instruction, and the output from the shifter gets registered. After shifting the data, the output is added with feedback of the output of the register that receives the output from the shifter from the previous operation. In the initial cycle, the feedback has zeros, but in subsequent cycles, the output of the previous cycle is added to the output of the following cycle. This combined output is then multiplexed and provided to a register as the shifted output.

The circuit of FIG. 86B, in order to perform the batch normalization operation, has data coming in and gets registered in a register. The circuit also receives the kernel, which is a shift instruction derived from the log quantized parameter, and also gets registered. Then the first shift operation is performed by the shifter, based on the shift instruction, and the output from the shifter gets registered. After shifting the data, the data is added by an adder that receives a bias. The output of the added shifted data and bias is provided to a register as the output data.

The circuit of FIG. 86C, in order to perform the pooling operation, has data coming in and gets registered in a register. The data is provided to a comparator that compares the input data as well as the output data. If the result of the comparison indicates that the output data is greater than the input data, then the output data is selected. If the result of the comparison indicates that the input data is greater than the output data, then the input data is selected. The input data is provided to a multiplexor that receives a signal bit from the comparator that indicates the result of the comparison. The multiplexor feeds into a second register, and the output of the second register is feed back into the multiplexor, such that the signal bit from the comparator indicates which data from the multiplexor is to be fed into the second register. The output of the second register is fed back into the comparator to allow the comparator to perform the comparison. The output of the second register is the data output.

The circuit of FIG. 86D, in order to perform the parametric ReLU operation, has data coming in and gets registered in a register. The data is provided to a shifter, to a comparator, and to a multiplexor. The circuit also receives the shift instruction derived from the log quantized ReLU parameter that is provided to the shifter. The shift operation is performed by the shifter, based on the shift instruction, and the output from the shifter is provided to the multiplexor. The comparator compares the original input data and the output of the shifter (shifted data). If the result of the comparison indicates that the shifted data is greater than the original input data, then the shifted data is selected. If the result of the comparison indicates that the original input data is greater than the shifted data, then the original input data is selected. The comparator provides an instruction to the multiplexor which data to choose, the original input data or the shifted data. The multiplexor then provides the original input data or the shifted data, based on the instruction from the comparator, to a register. The output of the register is the output of the ReLU operation.

Figure 87:
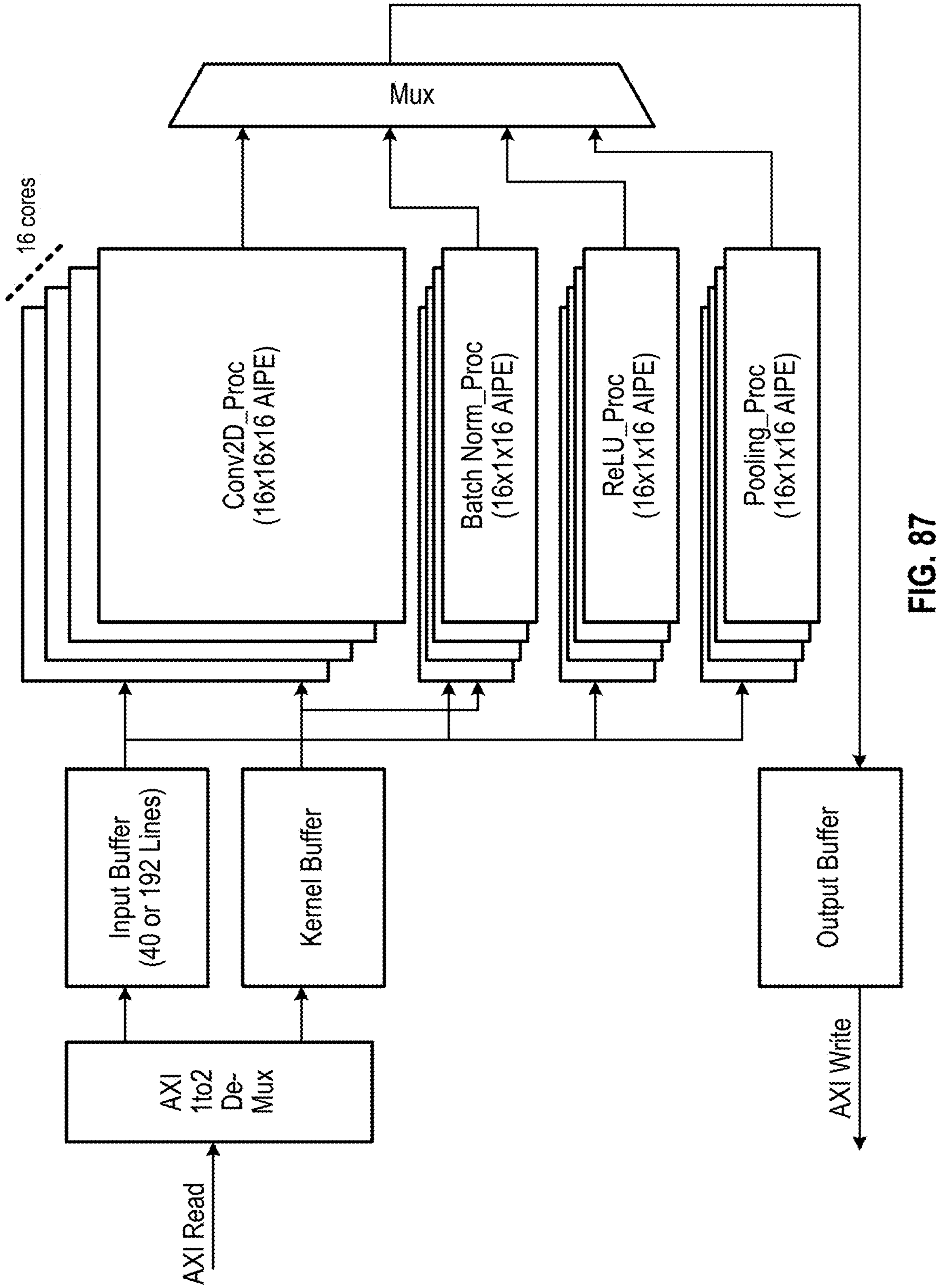
FIG. 87 illustrates an example of NN2.0 array using the AIPE structures in FIG. 86A-86D, in accordance with an example implementation.

FIG. 87 illustrates an example of array using the AIPE structures, in accordance with an example implementation. The array structure may comprise a plurality of AIPE structures, where the array structure is configured to perform the neural network operations. The array structure comprises an array of AIPE structures that perform the convolution operations. The array of AIPE structures that perform convolution may comprise a 16×16×16 AIPE's as an example. The array structure comprises an array of AIPE structures that perform the batch normalization operations. The array of AIPE structures that perform the batch normalization may comprise a 16×1×16 AIPE's as an example. The array structure comprises an array of AIPE structures that perform the Parametric ReLU operations. The array of AIPE structures that perform the Parametric ReLU operation may comprise a 16×1×16 AIPE's as an example. The array structure comprises an array of AIPE structures that perform the pooling operations. The array of AIPE structures that perform the pooling operations may comprise 16×1×16 AIPE's as an example. The respective outputs of the arrays are provided to a multiplexor, where the output of the multiplexor is provided to an output buffer. The array receives an input from an input buffer and receives the shift instruction derived from the log quantized parameter, from the kernel buffer. The input buffer and kernel buffer may receive input from an AXI 1to2 demultiplexor. The demultiplexor receives an AXI read input.

Accordingly, as illustrated in FIGS. 86A to 87, variations of the example implementations described herein can be modified to provide dedicated circuits to be directed to specific neural network operations. A system can be composed of dedicated circuits, such as a first circuit for facilitating convolution by shifter circuit as illustrated in FIG. 86A, a second circuit for facilitating convolution by shifter circuit as illustrated in FIG. 86B, a third circuit for facilitating max pooling by comparator as illustrated in FIG. 86C, and a fourth circuit for facilitating parametric ReLU as illustrated in FIG. 86D. Such circuits can be used in any combination or as standalone functions, and can also be used in conjunction with the AIPE circuits as described herein to facilitate desired implementations.

Figure 88:
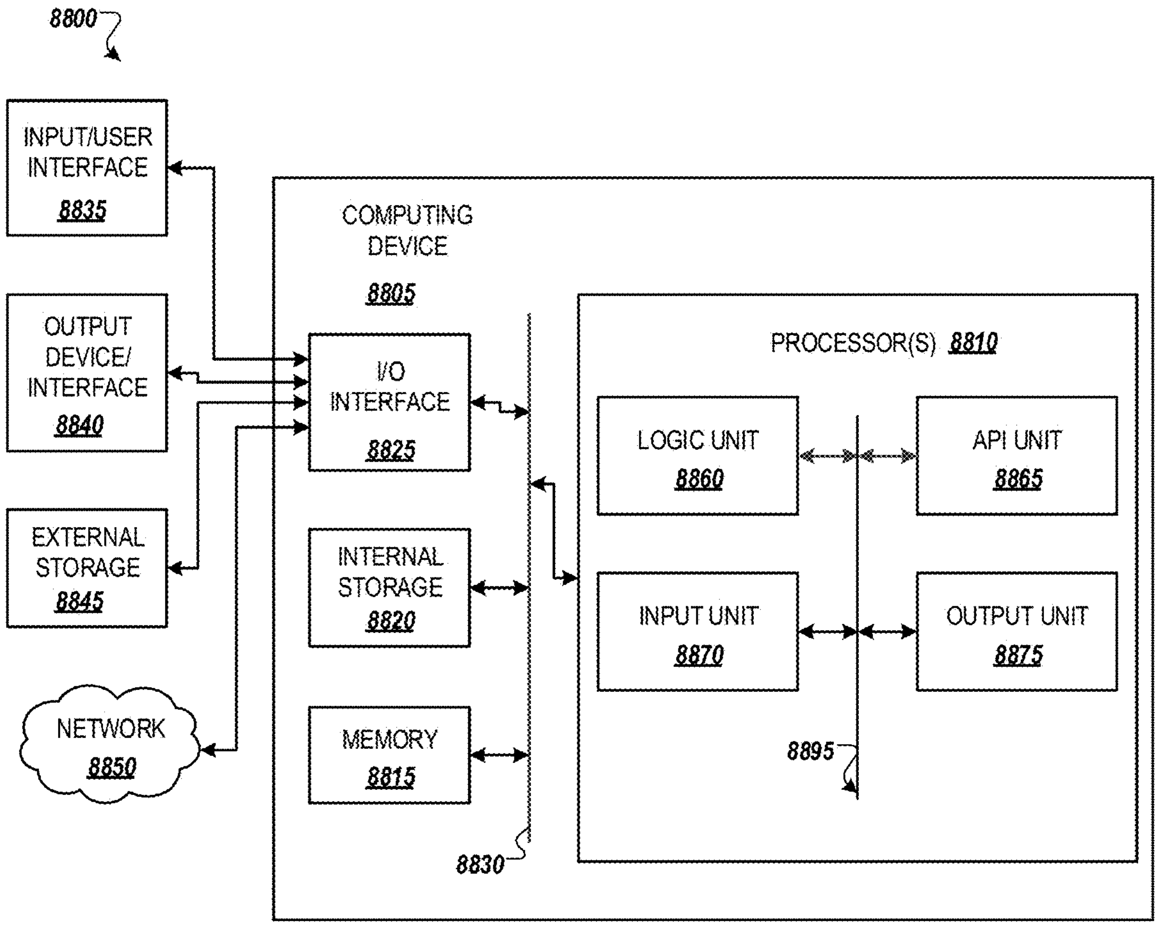
FIG. 88 illustrates an example computing environment upon which some example implementations may be applied.

FIG. 88 illustrates an example computing environment with an example computer device suitable for use in some example implementations, such as an apparatus for generating and/or log-quantizing parameters, training AI/NN networks, or for executing the example implementations described herein in algorithmic form. Computer device 8805 in computing environment 8800 can include one or more processing units, cores, or processors 8810, memory 8815 (e.g., RAM, ROM, and/or the like), internal storage 8820 (e.g., magnetic, optical, solid state storage, and/or organic), and/or I/O interface 8825, any of which can be coupled on a communication mechanism or bus 8830 for communicating information or embedded in the computer device 8805. I/O interface 8825 is also configured to receive images from cameras or provide images to projectors or displays, depending on the desired implementation.

Computer device 8805 can be communicatively coupled to input/user interface 8835 and output device/interface 8840. Either one or both of input/user interface 8835 and output device/interface 8840 can be a wired or wireless interface and can be detachable. Input/user interface 8835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 8840 may include a display, television, monitor, printer, speaker, braille, or the like. In some example implementations, input/user interface 8835 and output device/interface 8840 can be embedded with or physically coupled to the computer device 8805. In other example implementations, other computer devices may function as or provide the functions of input/user interface 8835 and output device/interface 8840 for a computer device 8805.

Examples of computer device 8805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 8805 can be communicatively coupled (e.g., via I/O interface 8825) to external storage 8845 and network 8850 for communicating with any number of networked components, devices, and systems, including one or more computer devices of the same or different configuration. Computer device 8805 or any connected computer device can be functioning as, providing services of, or referred to as a server, client, thin server, general machine, special-purpose machine, or another label.

I/O interface 8825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 8800. Network 8850 can be any network or combination of networks (e.g., the Internet, local area network, wide area network, a telephonic network, a cellular network, satellite network, and the like).

Computer device 8805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 8805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 8810 can execute under any operating system (OS) (not shown), in a native or virtual environment. One or more applications can be deployed that include logic unit 8860, application programming interface (API) unit 8865, input unit 8870, output unit 8875, and inter-unit communication mechanism 8895 for the different units to communicate with each other, with the OS, and with other applications (not shown). The described units and elements can be varied in design, function, configuration, or implementation and are not limited to the descriptions provided. Processor(s) 8810 can be in the form of hardware processors such as central processing units (CPUs) or in a combination of hardware and software units.

In some example implementations, when information or an execution instruction is received by API unit 8865, it may be communicated to one or more other units (e.g., logic unit 8860, input unit 8870, output unit 8875). In some instances, logic unit 8860 may be configured to control the information flow among the units and direct the services provided by API unit 8865, input unit 8870, output unit 8875, in some example implementations described above. For example, the flow of one or more processes or implementations may be controlled by logic unit 8860 alone or in conjunction with API unit 8865. The input unit 8870 may be configured to obtain input for the calculations described in the example implementations, and the output unit 8875 may be configured to provide output based on the calculations described in example implementations.

Figure 89:
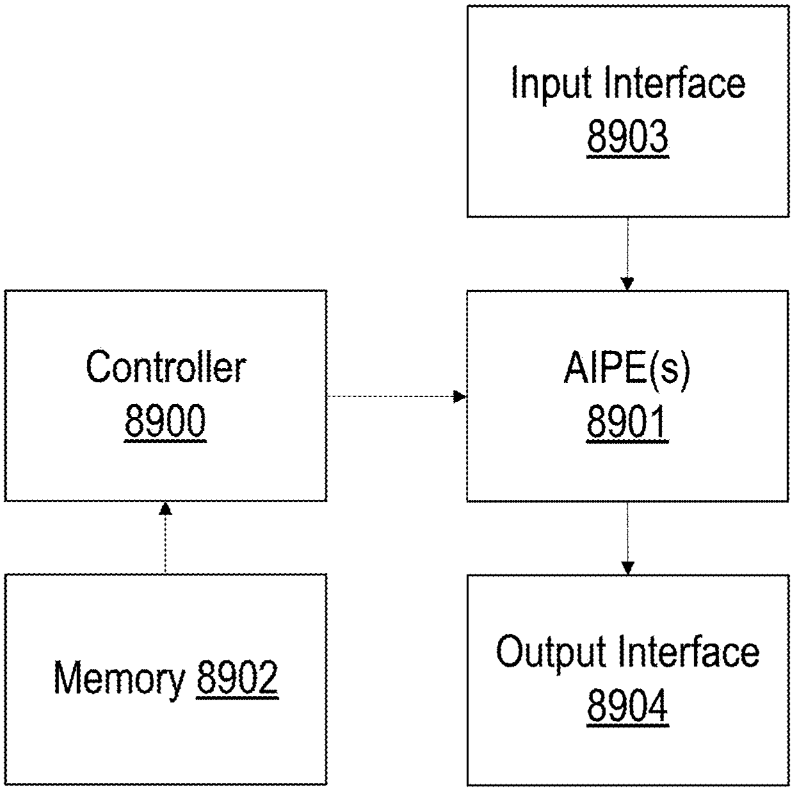
FIG. 89 illustrates an example system for AIPE control, in accordance with an example implementation.

Depending on the desired implementation, processor(s) 8810 can be configured to convert data values or parameters of an AI/neural network model into log quantized data values or log quantized values to be provided to a memory of a system as illustrated in FIG. 89. The log quantized data values or log quantized parameters can then be used by a controller of the system of FIG. 89 to be converted into shift instructions for shifting the counterpart parameters or data values to facilitate a neural network or AI operation. In such example implementations, processor(s) 8810 can be configured to execute the processes as illustrated in FIGS. 9A and 9B to conduct the training of the machine learning algorithm and result in log quantized parameters, which can be stored in a memory for use by a controller. In other example implementations, processor(s) 8810 can also be configured to execute a method or process to convert input data into log quantized data for providing into AIPEs.

FIG. 89 illustrates an example system for AIPE control, in accordance with an example implementation. In an example implementation, controller 8900 can control one or more AIPE(s) 8901 as described herein via control signals (e.g., s1, s2, s3, s4 as illustrated in FIGS. 72 to 85) to execute the desired neural network operation. Controller 8900 is configured with controller logic that can be implemented as any logic circuit or any type of hardware controller as known in the art, such as a memory controller, a central processing unit, and so on in accordance with the desired implementation. In example implementations, controller 8900 may retrieve log quantized parameters from memory 8902 and convert them into shift instructions involving the sign bit, shift direction, and shift instruction derived from the log quantized parameter. Such shift instructions and control signals can be provided from controller 8900 to the AIPE(s) 8901. Depending on the desired implementation, input data can be provided directly to the AIPE(s) 8901 by any input interface 8903 in accordance with the desired implementation (e.g., a data stream as processed by a transform circuit configured to scale the data stream up by a 2× factor, an input preprocessing circuit, FPGA, a hardware processor, etc.), or can also be provided by the controller 8900 as retrieved from memory 8902. Output of the AIPE(s) 8901 can be processed by an output interface 8904 which can present the output of the neural network operation to any desired device or hardware in accordance with the desired implementation. Output interface 8904 can be implemented as any hardware (e.g., FPGA, hardware, dedicated circuit) in accordance with the desired implementation. Further, any or all of the controller 8900, AIPE(s) 8901, memory 8902, input interface 8903, and/or output interface 8904, can be implemented as one or more hardware processor(s) or FPGAs in accordance with the desired implementation.

Memory 8902 can be any form of physical memory in accordance with the desired implementation, such as, but not limited to, Double Data Rate Synchronous Dynamic Random-Access Memory (DDR SDRAM), magnetic random access memory (MRAM), and so on. In an example implementation, if the data is log quantized and stored in memory 8902, then the data can be used to derive the shift instruction to shift neural network parameters as retrieved from memory 8902 instead of utilizing log quantized neural network parameters to derive the shift instruction. The deriving of the shift instruction from log quantized data can be conducted in a similar manner to that of the log quantized parameter.

In example implementations, there can be a system as illustrated in FIG. 89 in which memory 8902 can be configured to store a trained neural network represented by one or more log quantized parameter values associated with one or more neural network layers, each of the one or more neural network layers representing a corresponding neural network operation to be executed. Such a system can involve one or more one or more hardware elements (e.g., AIPE(s) 8901 as described herein, hardware processors, FPGAs, etc.) configured to shift or add shiftable input data; and controller logic (e.g., as implemented as a controller 8900, as a hardware processor, as logic circuits, etc.,) configured to control the one or more hardware elements (e.g., via control signals s1, s2, s3, s4, etc.) to, for the each of the one or more neural network layers read from the memory, shift the shiftable input data left or right based on a shift instruction derived from the corresponding log quantized parameter values to form shifted data; and add or shift the formed shifted data (e.g. via adder circuit or shifter circuit as described herein), according to the corresponding neural network operation to be executed.

Depending on the desired implementation, the system can further involve a data scaler configured to scale input data to form the shiftable input data. Such a data scaler can be implemented in hardware (e.g., via dedicated circuit logic, hardware processor, etc.) or in software in accordance with the desired implementation. Such a data scaler can be configured to scale bias parameters from the one or more neural network layers read from the memory 8902 for adding with shifted data via an adder or shifter circuit, or scale the input data (e.g., by a factor of $2^x$ to form shiftable input data, where x is an integer).

As illustrated in the example implementations described herein, the AIPE(s) 8901 or equivalent hardware elements thereof can involve one or more shifter circuits (e.g., barrel shifter circuits, logarithmic shifter circuits, arithmetic shifter circuits, etc.) configured to execute the shift. It can further involve one or more adder circuits (e.g., arithmetic adder circuits, integer adder circuits, etc.) configured to execute the add as described herein. If desired, the add operations can involve one or more shifting circuits configured to execute the add as described herein (e.g., via segments, positive/negative accumulators, etc.)

Controller 8900 can be configured to generate a shift instruction to be provided to AIPE(s) 8901 or equivalent hardware elements. Such a shift instruction can involve a shift direction and a shift amount to control/instruct the AIPE(s) or equivalent hardware elements to shift the shiftable input data left or right. As described herein (e.g., as illustrated in FIGS. 59 to 62) the shift amount can be derived from a magnitude of an exponent of the corresponding log quantized weight parameter (e.g., 22 has a magnitude of 2, thereby making the shift amount 2), and the shift direction can be derived from a sign of the exponent of the corresponding log quantized weight parameter (e.g., 22 has a positive sign, thereby indicating a shift to the left).

Depending on the desired implementation, the AIPE(s) 8901 or equivalent hardware elements can be configured to provide a sign bit for the formed shifted data based on a sign bit of the corresponding log quantized weight parameter and a sign bit of the input data as shown in FIG. 60 or 62. The shift instruction can include the sign bit of the corresponding log quantized weight parameter for use in an XOR circuit or for twos complement purposes in accordance with the desired implementation.

As described in the various example implementations herein, the computing environment of FIG. 88 and/or the system of FIG. 89 can be configured to execute a method or computer instructions for processing a neural network operation, which can include multiplying input data with a corresponding log quantized parameter associated with the operation for a neural network (e.g., to facilitate convolution, batch norm, etc.). Such methods and computer instructions for the multiplying can involve intaking shiftable input derived from the input data (e.g., as scaled by a factor); shifting the shiftable input in a left direction or a right direction according to a shift instruction derived from the corresponding log quantized parameter to generate an output representative of the multiplying the input data with the corresponding log quantized parameter for the neural network operation as described herein. As described herein, the shift instruction associated with the corresponding log quantized parameter can involve a shift direction and a shift amount, the shift amount derived from a magnitude of an exponent of the corresponding log quantized parameter, the shift direction derived from a sign of the exponent of the corresponding log quantized parameter; wherein the shifting the shiftable input involves shifting the shiftable input in the left direction or the right direction according to the shift direction and by an amount indicated by the shift amount. Although the following is described with respect to the systems illustrated in FIGS. 88 and 89, other implementations to facilitate the methods or computer instructions are also possible, and the present disclosure is not limited thereto. For example, the method can be executed by a field programmable gate array (FPGA), by an integrated circuit (e.g., ASIC) or by one or more hardware processors.

As described herein in the computer environment of FIG. 88 and/or a system as described in FIG. 89, there can be a method or computer instructions for processing an operation for a neural network, which can involve intaking shiftable input data derived from input data of the operation for the neural network; intaking input associated with a corresponding log quantized weight parameter for the input data of the operation for the neural network, the input involving a shift direction and a shift amount, the shift amount derived from a magnitude of an exponent of the corresponding log quantized weight parameter, the shift direction derived from a sign of the exponent of the corresponding log quantized weight parameter; and shifting the shiftable input data according to the input associated with the corresponding log quantized weight parameter to generate output for the processing of the operation for the neural network.

As illustrated in example implementations described herein the methods and computer instructions can involve determining a sign bit of the output of the multiplying the input data with the corresponding log quantized parameter for the neural network operation based on the sign bit of the corresponding log quantized parameter and a sign bit of the input data (e.g., via XOR circuit or equivalent function in software or circuitry).

As illustrated in example implementations described herein, the methods and computer instructions for multiplying can involve, for a sign bit of the corresponding log quantized parameter being negative, converting the output of the multiplying the input data with the corresponding log quantized parameter for the neural network operation into one's complement data; incrementing the one's complement data to form two's complement data as the output of the multiplying the input data with the corresponding log quantized parameter for the neural network operation.

As illustrated in example implementations described herein, the methods and computer instructions can involve adding a value associated with the neural network operation to the generated output of the multiplying of the input data with the corresponding log quantized parameter to form output for the processing of the neural network operation. Such adding can be conducted by an adder circuit (e.g., an integer adder circuit or a floating point adder circuit), or by one or more shifter circuits (e.g., barrel shifter circuits, log shifter circuits, etc.) depending on the desired implementation. Such one or more shifter circuits can be the same or separate from the one or more shifter circuits that manage the shifting depending on the desired implementation. The value associated with the neural network operation can be a bias parameter, but is not limited thereto.

As described in example implementations herein, the methods and computer instructions can involve, for the neural network being a convolution operation, the input data involves a plurality of input elements for the convolution operation; the shiftable input involves a plurality of shiftable input elements, each of which corresponds to one of the plurality of input elements to be multiplied by the corresponding log quantized parameter from a plurality of log quantized parameters; the output of the multiplying the input data with the corresponding log quantized parameter for the neural network operation involves a plurality of shiftable outputs, each of the plurality of shiftable outputs corresponding to a shift of each of the shiftable input elements according to the input associated with the corresponding log quantized parameter from the plurality of log quantized parameters; wherein the plurality of shiftable outputs is summed by add operations or shifting operations.

As described in example implementations herein, the methods and computer instructions can involve, for the neural network operation being a parametric ReLU operation, the shifting the shiftable input according to the shift instruction to generate the output of the multiplying the input data with the corresponding log quantized parameter for the neural network operation is done only for when a sign bit of the input data is negative, and the shiftable input is provided as the output of the multiplying the input data with the corresponding log quantized parameter for the neural network operation without shifting for when the sign bit of the input data is positive.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result.

In example implementations, the steps carried out require physical manipulations of tangible quantities for achieving a tangible result.

Unless specifically stated otherwise, as apparent from the discussion, it is appreciated that throughout the description, discussions utilizing terms such as “processing,” “computing,” “calculating,” “determining,” “displaying,” or the like, can include the actions and processes of a computer system or other information processing device that manipulates and transforms data represented as physical (electronic) quantities within the computer system’s registers and memories into other data similarly represented as physical quantities within the computer system’s memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. An artificial intelligence processing element (AIPE), the AIPE comprising:

a shifter circuit configured to:

intake shiftable input derived from input data for a neural network operation;

intake a shift instruction derived from a corresponding log quantized parameter of a neural network or a constant value; and shift the shiftable input in a left direction or a right direction according to the shift instruction to form shifted output representative of a multiplication of the input data with the corresponding log quantized parameter of the neural network;

wherein, for the neural network operation being a parametric ReLU operation, the shifter circuit is configured to provide the shiftable input as the shifted output without executing a shift for a sign bit of the shiftable input being positive.

2. The AIPE of claim 1, wherein the shift instruction comprises a shift direction and a shift amount, the shift amount derived from a magnitude of an exponent of the corresponding log quantized parameter, the shift direction derived from a sign of the exponent of the corresponding log quantized parameter;

wherein the shifter circuit shifts the shiftable input in the left direction or the right direction according to the shift direction and shifts the shiftable input in the shift direction by an amount indicated by the shift amount.

3. The AIPE of claim 1, further comprising a circuit configured to intake a first sign bit for the shiftable input and a second sign bit of the corresponding log quantized parameter to form a third sign bit for the shifted output.

4. The AIPE of claim 1, further comprising a first circuit configured to intake the shifted output and a sign bit of the corresponding one of the log quantized parameters to form one’s complement data for when the sign bit of the log quantized parameters is indicative of a negative sign; and a second circuit configured to increment the one’s complement data by the sign bit of the corresponding log quantized parameter to change the shifted output into two’s complement data that is representative of the multiplication of the input data with the corresponding log quantized parameter.

5. The AIPE of claim 1, wherein the shifter circuit is a log shifter circuit or a barrel shifter circuit.

6. The AIPE of claim 1, further comprising a circuit configured to intake output of the neural network operation, wherein the circuit provides the shiftable input from the output of the neural network operation or from scaled input data generated from the input data for the neural network operation according to a signal input to the shifter circuit.

7. The AIPE of claim 1, further comprising a circuit configured to provide the shift instruction derived from the corresponding log quantized parameter of the neural network or the constant value according to a signal input.

8. The AIPE of claim 1, further comprising an adder circuit coupled to the shifter circuit, the adder circuit configured to add based on the shifted output to form output for the neural network operation.

9. The AIPE of claim 8, wherein the adder circuit is an integer adder circuit.

10. The AIPE of claim 8, wherein the adder circuit is configured to add the shifted output with a corresponding one of a plurality of bias parameters of the neural network to form the output for the neural network operation.

11. The AIPE of claim 1, further comprising:
another shifter circuit; and
a register circuit coupled to the another shifter circuit that latches output from the another shifter circuit;
wherein the another shifter circuit is configured to intake a sign bit associated with the shifted output and each segment of the shifted output to shift another shifter circuit input left or right based on the sign bit to form the output from the another shifter circuit;
wherein the register circuit is configured to provide the latched output from the another shifter circuit as the another shifter circuit input to the another shifter circuit for receipt of a signal indicative of the neural network operation not being complete and provide the latched output as output for the neural network operation for receipt of the signal indicative of the neural network operation being complete.

12. The AIPE of claim 11, wherein the each segment has a size of a binary logarithm of a width of the another shifter circuit input.

13. The AIPE of claim 11, further comprising a counter configured to intake an overflow or underflow from the another shifter circuit resulting from the shift of the another shifter circuit input by the shifter circuit;
wherein the another shifter circuit is configured to intake the overflow or the underflow from the each segment to shift a subsequent segment left or right by an amount of the overflow or the underflow.

14. The AIPE of claim 11, further comprising a one-hot to binary encoding circuit configured to intake the latched output to generate an encoded output, and concatenate the encoded output from all segments and a sign bit from a result of an overflow or an underflow operation to form the output for the neural network operation.

15. The AIPE of claim 1, further comprising:
a positive accumulate shifter circuit comprising a second shifter circuit configured to intake each segment of the shifted output to shift positive accumulate shifter circuit input left for a sign bit associated with the shift instruction being indicative of a positive sign; the second shifter circuit coupled to a first register circuit configured to latch the shifted positive accumulate shifter circuit input from the second shifter circuit as first latched output, the first register circuit configured to provide the first latched output as the positive accumulate shifter circuit input for receipt of a signal indicative of the neural network operation not being complete;
a negative accumulate shifter circuit comprising a third shifter circuit configured to intake the each segment of the shifted output to shift negative accumulate shifter circuit input left for the sign bit associated with the shift instruction being indicative of a negative sign; the third shifter circuit coupled to a second register circuit configured to latch the shifted negative accumulate shifter circuit input from the from the third shifter circuit as second latched output, the second register circuit configured to provide the second latched output as the negative accumulate shifter circuit input for receipt of a signal indicative of the neural network operation not being complete; and
an adder circuit configured to add based on the first latched output from the positive accumulator shifter circuit and the second latched output from the negative accumulator shifter circuit to form output of the neural network operation for receipt of the signal indicative of the neural network operation being complete.

16. The AIPE of claim 15, further comprising:
a first counter configured to intake a first overflow from the positive accumulate shifter circuit resulting from the shift of the positive accumulate shifter circuit input, wherein the second shifter circuit is configured to intake the first overflow from the each segment to shift a subsequent segment left by an amount of the first overflow; and
a second counter configured to intake a second overflow from the negative accumulate shifter circuit resulting from the shift of the negative accumulate shifter circuit input, wherein the third shifter circuit is configured to intake the second overflow from the each segment to shift a subsequent segment left by an amount of the second overflow.

17. The AIPE of claim 15, further comprising:
a first one-hot to binary encoding circuit configured to intake the first latched output to generate a first encoded output, and concatenate the first encoded output from all segments and a positive sign bit to form first adder circuit input;
a second one-hot to binary encoding circuit configured to intake the second latched output to generate a second encoded output, and concatenate the second encoded output from all segments and a negative sign bit to form second adder circuit input;
wherein the adder circuit conducts the add based on the first latched output and the second latched output by adding the first adder circuit input with the second adder circuit input to form the output for the neural network operation.

18. The AIPE of claim 1, wherein the input data is scaled to form the shiftable input.

19. The AIPE of claim 1, further comprising:
a register circuit configured to latch the shifted output;
wherein for receipt of a control signal indicative of an addition operation:
the shifter circuit is configured to intake each segment of the shiftable input to shift the shifted output left or right based on a sign bit associated with the shifted output to form another shifted output representative of an addition operation of the shifted output and the shiftable input.

* * * * *